US012227103B1

(12) United States Patent
Lerner

(10) Patent No.: US 12,227,103 B1
(45) Date of Patent: Feb. 18, 2025

(54) ENERGY SUPPLY STATUS INDICATION FOR A VEHICLE

(71) Applicant: William S. Lerner, Litchfield, CT (US)

(72) Inventor: William S. Lerner, Litchfield, CT (US)

( * ) Notice: Subject to any disclaimer, the term of this patent is extended or adjusted under 35 U.S.C. 154(b) by 0 days.

(21) Appl. No.: 17/970,474

(22) Filed: Oct. 20, 2022

Related U.S. Application Data

(63) Continuation-in-part of application No. 17/319,039, filed on May 12, 2021, now Pat. No. 11,760,258.

(60) Provisional application No. 63/270,531, filed on Oct. 21, 2021, provisional application No. 63/024,500, filed on May 13, 2020.

(51) Int. Cl.
*B60L 58/12* (2019.01)
*B60W 50/14* (2020.01)

(52) U.S. Cl.
CPC ............. *B60L 58/12* (2019.02); *B60W 50/14* (2013.01); *B60W 2050/146* (2013.01)

(58) Field of Classification Search
None
See application file for complete search history.

(56) References Cited

U.S. PATENT DOCUMENTS

| | | | | |
|---|---|---|---|---|
| 4,574,269 A * | 3/1986 | Miller | .................. | B60Q 1/5035 345/82 |
| 5,394,138 A * | 2/1995 | Stephens | .................. | B60Q 1/52 340/471 |
| 7,476,013 B2 * | 1/2009 | Gergets | .................. | F21S 41/00 362/543 |
| 7,559,316 B2 * | 7/2009 | Matsushita | .............. | B60Q 1/44 701/104 |
| 7,905,640 B2 * | 3/2011 | Gergets | ................ | B60Q 1/2611 362/543 |
| 8,487,752 B2 * | 7/2013 | Stillfried | ................ | B60Q 1/543 340/425.5 |

(Continued)

FOREIGN PATENT DOCUMENTS

| | | | | |
|---|---|---|---|---|
| CA | 2648123 A1 | * | 10/2007 | ........... B60Q 1/2611 |
| CN | 1362923 A | * | 8/2002 | .............. B62J 27/00 |

(Continued)

OTHER PUBLICATIONS

Alternative Fuel Vehicles and High Occupancy Vehicle Lanes, downloaded from https://afdc.energy.gov/laws/HOV on Nov. 24, 2021.

(Continued)

*Primary Examiner* — Kevin R Steckbauer
(74) *Attorney, Agent, or Firm* — Appleton Luff

(57) ABSTRACT

A vehicle provides an indication of status of an energy source that provides power for the vehicle. The vehicle includes an indicator, positioned on the vehicle at a location determined to be among a plurality of locations to most likely be intact during and after an accident. The indicator provides a predetermined indication that identifies status of an energy source that provides power for the vehicle. The indicator may provide a visual or acoustical indication or may provide a wireless message. The indication may provide an indication of one or more of make/model of the vehicle, battery charge level, type, danger condition, danger condition reoccurrence, danger condition suppression technique and a warning to not approach the vehicle.

20 Claims, 48 Drawing Sheets

(56) References Cited

U.S. PATENT DOCUMENTS

| | | | | |
|---|---|---|---|---|
| 8,581,716 | B2* | 11/2013 | Wright | B60Q 1/52 340/436 |
| 8,636,395 | B2* | 1/2014 | Gergets | F21S 45/47 362/499 |
| 9,007,193 | B2* | 4/2015 | Boston | G08G 1/017 705/14.62 |
| 9,340,119 | B2* | 5/2016 | Chen | B60Q 1/2661 |
| 9,346,397 | B2* | 5/2016 | Gergets | B60Q 1/2611 |
| 9,487,125 | B2* | 11/2016 | Geller | B60Q 1/543 |
| 9,550,453 | B2* | 1/2017 | Gergets | F21S 43/31 |
| 9,663,028 | B2* | 5/2017 | Parkes | G08G 1/017 |
| 9,873,375 | B2* | 1/2018 | Matsubara | G10K 11/17855 |
| 9,878,656 | B2* | 1/2018 | Gergets | F21V 23/04 |
| 10,061,326 | B2* | 8/2018 | Gordon | B60W 30/09 |
| 10,186,089 | B2* | 1/2019 | Garcia | B60Q 1/5037 |
| 10,209,158 | B2* | 2/2019 | Cho | G01M 3/3281 |
| 10,210,732 | B2* | 2/2019 | Kim | B60Q 1/52 |
| 10,399,484 | B2* | 9/2019 | Parkes | G09F 27/005 |
| 10,598,564 | B2* | 3/2020 | Cho | G01M 3/3281 |
| 10,644,387 | B2* | 5/2020 | Shiina | H01Q 3/04 |
| 10,836,307 | B2* | 11/2020 | Parkes | B60Q 1/509 |
| 11,283,163 | B2* | 3/2022 | Thoday | H01Q 1/3275 |
| 11,580,798 | B2* | 2/2023 | Weber | B60L 58/12 |
| 11,642,873 | B2* | 5/2023 | Masuyama | B32B 17/10788 359/453 |
| 11,760,258 | B1* | 9/2023 | Lerner | B60W 30/08 701/1 |
| 2007/0242472 | A1* | 10/2007 | Gergets | F21S 41/321 340/815.4 |
| 2008/0000457 | A1* | 1/2008 | Matsushita | F02D 41/00 701/104 |
| 2009/0141511 | A1* | 6/2009 | Gergets | F21V 23/04 362/493 |
| 2011/0156589 | A1* | 6/2011 | Gergets | B60Q 1/52 315/77 |
| 2011/0291822 | A1* | 12/2011 | Boston | B60Q 1/50 340/425.5 |
| 2011/0295697 | A1* | 12/2011 | Boston | G06Q 30/0272 340/466 |
| 2012/0062373 | A1* | 3/2012 | Wright | B60Q 1/52 340/436 |
| 2012/0201041 | A1* | 8/2012 | Gergets | F21S 43/195 362/544 |
| 2012/0242466 | A1* | 9/2012 | Stillfried | B60L 58/12 340/425.5 |
| 2014/0125476 | A1* | 5/2014 | Gergets | F21V 23/04 340/471 |
| 2015/0175052 | A1* | 6/2015 | Gergets | F21S 43/195 307/9.1 |
| 2015/0283939 | A1* | 10/2015 | Parkes | B60Q 1/544 340/468 |
| 2015/0314697 | A1* | 11/2015 | Chen | B60L 58/10 340/455 |
| 2015/0379844 | A1* | 12/2015 | Kim | G08B 17/00 340/468 |
| 2016/0144778 | A1* | 5/2016 | Tucker | B60Q 1/52 340/471 |
| 2017/0010178 | A1* | 1/2017 | Cho | G01M 3/26 |
| 2017/0096099 | A1* | 4/2017 | Matsubara | G10K 11/17855 |
| 2017/0168502 | A1* | 6/2017 | Gordon | B60W 40/08 |
| 2017/0305336 | A1* | 10/2017 | Parkes | G09F 27/005 |
| 2018/0033274 | A1* | 2/2018 | Kim | B60Q 1/52 |
| 2018/0158255 | A1* | 6/2018 | Garcia | B60Q 1/5037 |
| 2018/0186309 | A1* | 7/2018 | Batten | B60Q 1/543 |
| 2019/0178748 | A1* | 6/2019 | Cho | G01M 3/3281 |
| 2019/0359126 | A1* | 11/2019 | Parkes | G08B 5/36 |
| 2020/0287278 | A1* | 9/2020 | Thoday | B60R 11/04 |
| 2020/0290507 | A1* | 9/2020 | Cobb | H05B 47/105 |
| 2021/0009032 | A1* | 1/2021 | Parkes | G08B 5/36 |
| 2022/0347976 | A1* | 11/2022 | Masuyama | B32B 17/10568 |
| 2024/0109480 | A1* | 4/2024 | Lerner | B60Q 1/0035 |

FOREIGN PATENT DOCUMENTS

| | | | | |
|---|---|---|---|---|
| CN | 1140434 C | * | 3/2004 | B62J 27/00 |
| CN | 102741084 A | * | 10/2012 | B60L 50/16 |
| CN | 104158580 A | | 11/2014 | |
| CN | 102741084 B | * | 7/2016 | B60L 50/16 |
| CN | 106240445 A | * | 12/2016 | |
| CN | 104158580 B | * | 8/2017 | |
| CN | 206818606 U | * | 12/2017 | |
| CN | 110182091 A | * | 8/2019 | B60G 9/00 |
| CN | 110706443 A | * | 1/2020 | B60Q 1/52 |
| CN | 210221397 U | * | 3/2020 | |
| CN | 112644371 A | * | 4/2021 | B60Q 1/52 |
| CN | 113920686 A | * | 1/2022 | |
| CN | 114340894 A | * | 4/2022 | B32B 17/10036 |
| DE | 102017207225 A1 | * | 10/2018 | |
| DE | 102019203307 | | 1/2020 | |
| DE | 102019203307 B3 | * | 1/2020 | |
| DE | 102019219261 A1 | * | 6/2021 | |
| EP | 1878896 A2 | * | 1/2008 | B60Q 1/44 |
| EP | 2848448 A2 | | 3/2015 | |
| EP | 2019763 B1 | * | 7/2017 | B60Q 1/2611 |
| EP | 2848448 B1 | * | 10/2018 | B60K 35/00 |
| EP | 4011848 A1 | * | 6/2022 | B32B 17/10036 |
| ES | 2637915 T3 | * | 10/2017 | B60Q 1/2611 |
| JP | 3853704 B2 | * | 12/2006 | |
| JP | 2014050291 A | * | 3/2014 | |
| JP | 6040643 B2 | * | 12/2016 | |
| JP | 2014050291 B | | 12/2016 | |
| JP | 2020055354 A | * | 4/2020 | B60K 20/02 |
| JP | 2019152886 B | | 6/2020 | |
| JP | 6715377 B2 | * | 7/2020 | G02F 1/136213 |
| JP | 6745316 B2 | * | 8/2020 | B60K 20/02 |
| TW | 202130513 A | * | 8/2021 | B32B 17/10036 |
| WO | WO-2007117854 A2 | * | 10/2007 | B60Q 1/2611 |
| WO | WO-2012161818 A1 | * | 11/2012 | B60L 11/1861 |
| WO | WO-2021107062 A1 | * | 6/2021 | B32B 17/10036 |

OTHER PUBLICATIONS

Amon, F., et al., Fire effluent contaminants, predictive models, and gap analysis, Technical Report, Jan. 2014.

Cirron, D. et al, Pre-normative research for safety of hydrogen driven vehicles and transport through tunnels and similar confined spaces, Fuel Cells and Hydrogen Joint Undertaking (Aug. 2019).

Clarity Fuel Cell, 2017-18 Honda Clarity Fuel Cell Emergency Response Guide, American Honda Motor Co. (2018).

Clean Pass Stickers for High-Occupancy Vehicle Lanes on the Long Island Expressway, NY State Dept of Motor Vehicles, downloaded from internet on Nov. 24, 2021.

Gehandler, J., et al., Risks associated with alternative fuels in road tunnels and underground garages, SP Technical Research Institute of Sweden, SP Report 2017:14.

Groethe, M. et al., Large-Scale Hydrogen Deflagrations and Detonations, International Journal of Hydrogen Energy 32(13):2125-2133 (Sep. 2007).

Gurel, M. et al., LPG explosion damage of a reinforced concrete building: A case study in Sanliurfa, Turkey, Engineering Failure Analysis (Sep. 2013).

X35 FCEV Emergency Response Guide, Hyundai Motor Company (2013).

Kumar, S. et al., Hytunnel Project to Investigate the Use of Hydrogen Vehicles in Road Tunnels (2009).

Li, Ring Zhen, Fire and explosion hazards of alternative fuel vehicles in tunnels, RISE Research Institutes of Sweden (2018).

Lonnermark, A., New Energy Carriers in Tunnels, Fourth International Symposium on Tunnel Safety and Security, Frankfurt am Main, Germany, Mar. 17-19, 2010.

Mellert, L. D., et al., Electric Mobility and Road Tunnel Safety Hazards of Electric Vehicle Fires, 9th International Conference 'Tunnel Safety and Ventilation' 2018, Graz.

Methods to Identify Alternative Fuel Vehicles, National Alternative Fuels Training Consortium, West Virginia University (Oct. 2019).

Module 6: Fuel Cell Engine Safety, College of the Desert, Rev. 0, Dec. 2001.

(56) References Cited

OTHER PUBLICATIONS

Natural Gas Systems: Suggested Changes to Truck and Motorcoach Regulations and Inspection Procedures, U.S. Dept. of Transportation (Mar. 2013).

News from SP Fire Research, brandposten, English edition (2015).

Perrette, L., et al., CNG buses fire safety : learnings from recent accidents in France and Germany, HAL open science, https://hal-ineris.archives-ouvertes.fr/ineris-00976180 (Apr. 2014).

Proceedings from the Seventh International Symposium on Tunnel Safety and Security, Montréal, Canada Mar. 16-18, 2016, Edited by Anders Lonnermark and Haukur Ingason.

Purchase and affixing of the E-Badge on the vehicle, Green-Zones.eu (2020), downloaded from the internet on Nov. 24, 2021.

The On-Board Rescue Sheet, FIA Foundation for the Automobile and Society (Apr. 2010).

Tucson Fuel Cell Emergency Response Guide, Hyundai Motor Company (2014).

Venetsanos, A.G., et al., CFD modelling of hydrogen release, dispersion and combustion for automotive scenarios, Journal of Loss Prevention in the Process Industries 21 (2008) 162-184.

Y. Xu, Y. Huang and G. Ma, A review on effects of different factors on gas explosions in underground structures, Underground Space, https://doi.org/10.1016/j.undsp.2019.05.002 (2019).

\* cited by examiner

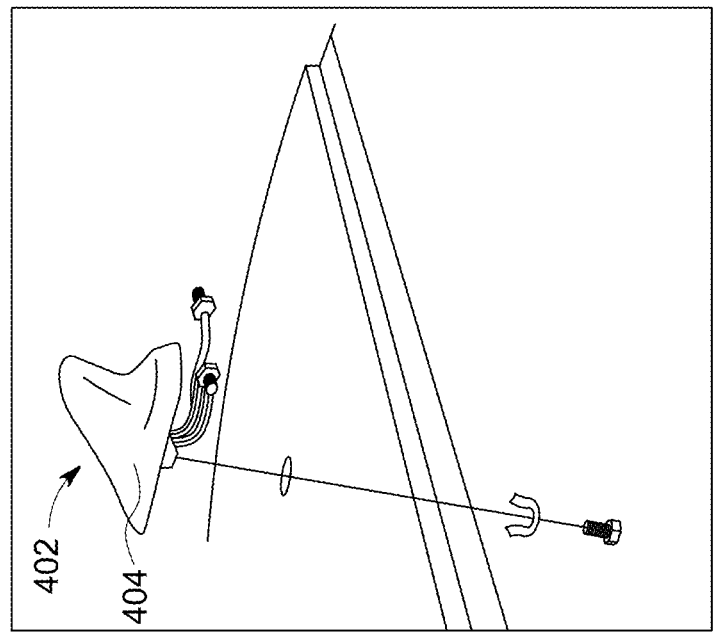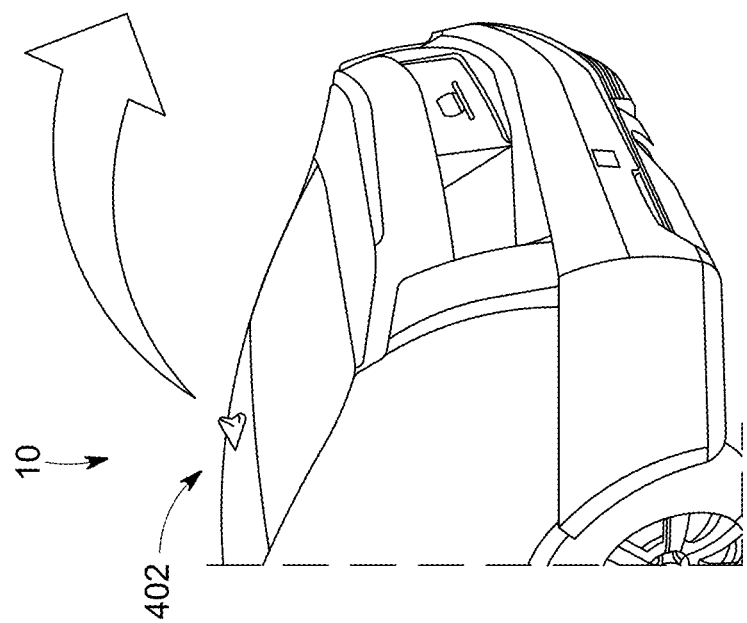
FIG. 4

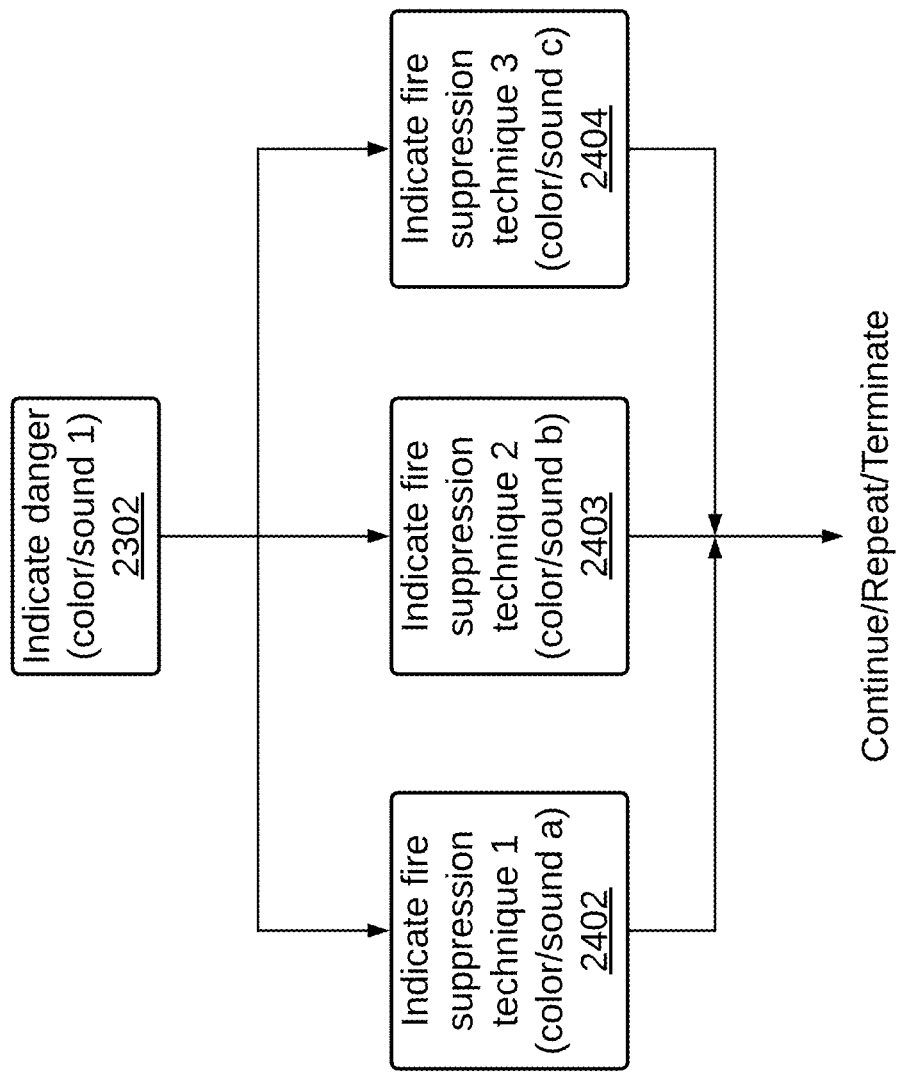

ENERGY SUPPLY STATUS INDICATION FOR A VEHICLE

RELATED APPLICATIONS

This application is a continuation-in-part of and claims priority to U.S. patent application Ser. No. 17/319,039 filed on May 12, 2021, entitled "INDICATORS TO IDENTIFY STATUS AND SAFETY OF VEHICLES," which application is hereby incorporated by reference in its entirety and which application claims priority to U.S. provisional patent application 63/024,500 filed on May 13, 2020, which application is hereby incorporated by reference in its entirety. This application also claims priority to U.S. provisional patent application 63/270,531 filed on Oct. 21, 2021, which application is hereby incorporated by reference in its entirety.

FIELD OF THE DISCLOSURE

This disclosure relates generally to identification of vehicles and more particularly to electronic systems for identifying vehicles and the status of such vehicles.

BACKGROUND

Historically, vehicles have been largely powered by petroleum-based fuels. Vehicles, fueling stations, parking structures, tunnels and emergency response have consequently been developed around the usage of petroleum-based fuels. For example, fueling of petroleum-based fuels is well understood by the general public and safety systems have been designed to permit safe re-fueling of petroleum-based vehicles. Moreover, emergency response measures are well understood given the ubiquity of petroleum-based vehicles.

The development of power sources for vehicles other than petroleum-based sources, such as batteries and hydrogen, and combinations thereof, and the increasing usage of vehicles powered by such different power sources introduces new challenges to the safe usage of powered vehicles, both in normal usage and in emergency situations.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques.

FIG. 4 is an illustration of a "sharks fin" type roof mounting that may be used in an energy supply status indicator.

FIG. 24A is a flow diagram illustrating another embodiment of indications that may be provided.

DETAILED DESCRIPTION

Figure 1:
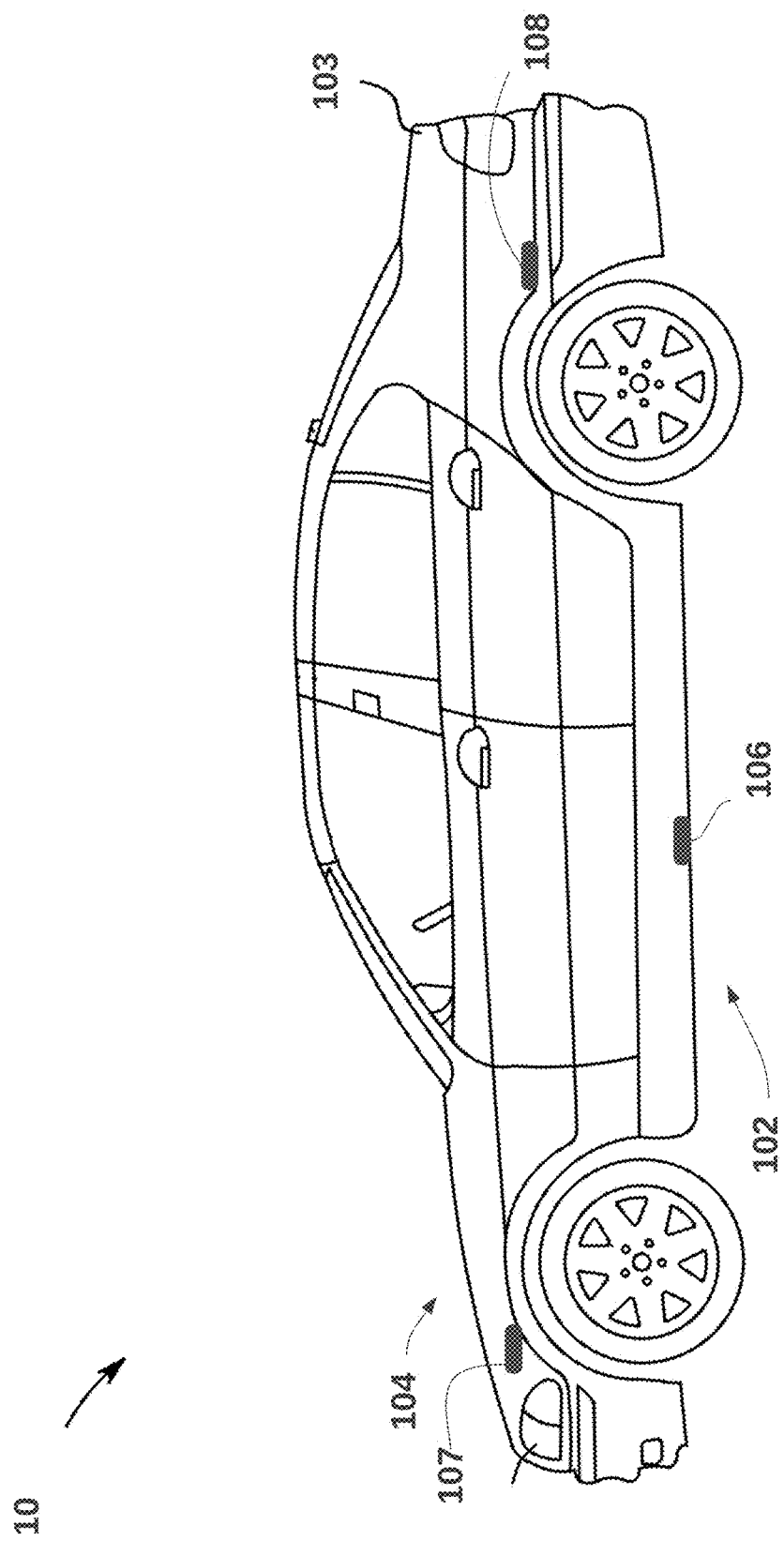
FIG. 1 is a view of an exemplary vehicle employing an embodiment of an energy supply status indicator.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Disclosed herein are devices, systems, methods and products that address many of the challenges posed by the increasing heterogeneity of the manner in which vehicles are powered. As used herein, the term "vehicle" includes a thing or device with a self-contained motor or similar apparatus that causes movement of the thing or device, where the motor operates with a source of energy, stored in or upon the vehicle. The vehicle may be used for transporting people or goods, such as those that move on land or water (on water or underwater), in the air, within the earth's atmosphere or in outer space or the vehicle may not necessarily transport anything other than the vehicle itself, such as a satellite, or a car or flying drone equipped with cameras or other sensors. The term "vehicle" includes but is not limited to cars, trucks, buses, trains, ships, jet skis, riding lawn mowers, ATVs, motorcycles, e-scooters, various industrial equipment such as tractors and other farming equipment and rides such as at amusement parks, and include vehicles driven by humans as well as fully autonomous vehicles. The source of energy may be, by way of example, petroleum-based fuel, other type of liquid or solid fuel, such as liquified hydrogen, propane, compressed natural gas, ammonia or may be one or more batteries, or may be a combination thereof.

Currently there is a lack of data and there are not sufficient standards, regulations or knowledge of how non-gasoline vehicles will act during emergency situations. Moreover, as different types of energy sources are employed in vehicles (such as for example, liquified hydrogen, batteries), and the different types of energy sources are combined (multiple batteries, petroleum and batteries, hydrogen and batteries) it becomes more difficult to quickly identify the source(s) of energy employed by a vehicle. This increasing heterogeneity of vehicle energy sources increases the complexity of discerning the energy source of a particular vehicle in an emergency situation. It also results in increased complexity in regulating usage by certain vehicles in certain structures, such as a Hydrogen Fuel Cell (HFC) vehicle in a tunnel or enclosed parking structure.

Responder information, used by first responders in an accident or emergency situation, is based on data sheets and a symbol, or small sticker (ISO Standard) on a vehicle. These are not commonly used but if used may address the issue of identifying a non-gasoline engine vehicle (light or heavy duty) in daylight, assuming the vehicle is intact, and the rescue team can clearly see the marking. Moreover, such printed information does not address the situation where the marking cannot be clearly seen, such as in the dark, or if the vehicle has been heavily damaged. Also, most vehicles are not explicitly marked as to the type of power source(s) contained in the vehicle. The Allgemeiner Deutscher Automobil-Club (ADAC) has noted with respect to rescuers that "Quite often, in what little time they have, they are unable to positively identify the type or year of manufacture of the smashed vehicle. An ADAC survey has shown that rescuers incorrectly identify or fail to identify 64% of all crash vehicles." See, *The On-Board Rescue Sheet, Helping the rescuers*, FIA Foundation for the Automobile and Society, April 2010. It is well understood that delay in providing assistance to victims of major trauma can dramatically affect outcomes and speed in identifying the type of fuel source(s) used by a vehicle can therefore be a critical factor in safely attending to injured persons.

Currently alternatively fueled vehicles have ERGs (Emergency Response Guides). These guides are instructive and assist the first responder as to the efficient ways to deal with a fire, cut power or any other helpful information the first responder needs, such as cut points, battery location, wiring, etc. The ERGs may be available at the scene on a first responder's tablet or laptop. As good as an ERG may be or as helpful as it can be, will ONLY be useful if the first responder can recognize the vehicle and search for the applicable ERG. Moreover, ERGs and rescue sheets have no standardized form, and are not required. Many electric vehicles look alike but have completely different cut loops (sometimes also called a "maintenance disconnect") and battery architecture. Moreover, even if a vehicle has an ISO sticker on its rear, it may be crushed, scraped or otherwise rendered unreadable in an accident or may not be easily readable at night or in low visibility. This application discloses devices, systems and methods that permit rapid identification of a vehicle's energy source(s) and their status, including from a distance to keep vehicle occupants, bystanders and first responders safe and to rapidly prepare for a rescue. This application and described technologies also give the first responder the ability to know which ERG they need to use. An ERG is useless if a first responder doesn't know the make, model or year. Additionally, there are battery powered buses, etc., that do not have ERGs.

Approximately 3.4 million cars are sold in the United States per year, and the lifecycle of a vehicle style is shorter than in the past. Styling changes from year to year, or during MCR (mid cycle refresh) can dramatically alter a cars appearance in the day, and especially at night due to the popularity of radical headlight and taillight changes. For example, the 2021 BMW 540i had a refresh from the 2020 model, even though the vehicle is virtually identical to the 2020 in every way, shape and form.

Turning to emerging energy sources, hydrogen as a fuel source has a number of advantages and is being implemented in consumer and commercial settings. Being highly explosive, characterized by leakage issues, and requiring storage at extremely cold temperatures and/or high storage pressure however poses a number of dangers to vehicle users, first responders and the public in general. Gasoline has a distinct smell that anyone can detect, and be alerted of a leak, and potential fire or explosion. Hydrogen is odorless and colorless. Currently, odorants are not used with hydrogen because there are no known odorants light enough to "travel with" hydrogen at the same dispersion rate. Current odorants also can contaminate the HFC, leaving no way to "mark" hydrogen for identification due to a unique or known warning smell. So, if a tank which is designed to vent its hydrogen contents, does so in an enclosed area, there is no way to detect its presence. Hydrogen is a very small molecule with low viscosity; as a result, it is prone to leakage. Additionally, hydrogen gas is highly flammable and will burn in air at a very wide range of concentrations between 4% and 75% by volume. The mixture may be ignited by spark or heat, or static. Pure hydrogen-oxygen flames emit ultraviolet light and are invisible to the naked eye. As such, the detection of burning hydrogen requires a flame detector. Hydrogen is also colorless, odorless, and tasteless, which further makes detection of a leak impossible to detect, and upon ignition, the flames will be invisible, unless they mix with a contaminant such as burning plastic, rubber, debris etc. Liquid and gaseous hydrogen also tends to cause cracking (by causing embrittlement) in certain enclosures (such as tanks, cylinder liners, hoses and fittings), particularly those made of metal. The foregoing characteristics can present a grave danger to the public, responders, and to property. First responders (about two-third of whom are volunteer), and amateur good Samaritans who know nothing about vehicles but see an injured person or persons in a vehicle, will tend to run to the vehicle, and try to comfort, remove or assist. While admirable, these good Samaritans will tend to assume the vehicle is petroleum powered or will not think of the power source given the historic homogeneity of power sources and will therefore not appreciate the dangers of a non-gasoline vehicle.

The National Alternative Fuels Training Consortium notes the difficulty in identifying an alternative fuel vehicle:

A first responder has the important responsibility of identifying whether the vehicle(s) at the scene of an incident is an alternative fuel vehicle.

This task may be difficult if the vehicle has experienced extensive body damage or has major panels blocked by obstructions, as this could make it difficult to identify the vehicle through badging. The first responder should be prepared with alternative methods of identifying an alternative fuel vehicle other than vehicle badges and labels.

These methods may include:

badging and labels (primary means of identification but are not only recommended and are not required);

non-standard dashboard layout and/or gauges (it should be noted that battery vehicles tend to have distinctive dashboards but hydrogen vehicles do not);

multiple or non-standard fueling ports (hydrogen fueling nozzles are behind a fuel door and there is no visual indication unless the filling door is opened);

special underhood cables, warning labels, or equipment; and external fuel tanks (usually on heavy duty vehicles and light-duty pick-up trucks).

*Methods to Identify Alternative Fuel Vehicles*, National Alternative Fuels Training Consortium, October 2019 (available at: http://naftc.wvu.edu/2019/10/09/methods-to-identify-alternative-fuel-vehicles/)

The ubiquity of gasoline powered vehicles has resulted in extensive gasoline vehicle data. Data for battery vehicles, fuel cell vehicles, hybrid vehicles (gas and battery) or other types of non-gasoline vehicles is very limited. Additionally, there is limited information for what happens when there is a fire, for example in an enclosed space, such as an underground parking garage. In this regard it should be noted that underground parking garages are typically designed to only vent a fire from a diesel or gasoline vehicle. Garages in general are constructed to take this into account.

The parent application (application Ser. No. 17/319,039 filed on May 12, 2021, entitled "INDICATORS TO IDENTIFY STATUS AND SAFETY OF VEHICLES,") to the present application discloses a vehicle that provides an indication of an energy source of power for the vehicle. The vehicle comprises an indicator, positioned on the vehicle at a location determined to be among a plurality of locations to most likely be intact during and after an accident. The indicator provides a predetermined indication that identifies an energy source that provides power for the vehicle. The parent application is incorporated in its entirety by reference but portions are reproduced in this specification for ease and clarity of understanding.

The present disclosure discloses a vehicle that provides an indication of status of an energy source that provides power for the vehicle. The vehicle comprises an indicator, positioned on the vehicle at a location determined to be among a plurality of locations to most likely be intact during and after an accident. The indicator provides a predetermined indication that identifies status of an energy source that provides power for the vehicle.

Various indications are described herein, ranging from a simple light staying on or flashing to a wireless communication of more detailed information, and can include a combination of various indications. Different scenarios may require or prefer one or both for example. A large parking structure where all the cars are not visible, meaning some are on different levels, would require the light and the wireless information relay for an immediate size up of the situation. Additionally smoke or fire can retard the visibility of the light, so the relay of information may be more helpful in limited visibility settings.

The visual and audible indications can separate chunks of information listed below, for example, with a solid white light for three seconds, and can be encoded in a variety of manners, examples of which are provided below, to form a type of visual or audible Morse code. This permits for less confusion when sizing up an event.

A simple, clear, and unambiguous visual symbol and or acoustical symbol is a globally tried and true method of communication of vital information quickly and efficiently. The method of sensing an event, can be "read" from the onboard diagnostics of the vehicle, the battery management system or include additional components placed at any set point on the vehicle. Additionally, any warning or warnings may be arranged to be redundant automated alerts which ensures first responders are given critical event information instantaneously across a variety of different channels and devices.

Additionally, the alerts, visual, audible or electronic, repeat in user set intervals based on the manufacturer's choices. Meaning the alerts can be repeated in 30 second intervals or every minute. When there is an accident or event, the first responder may be a firetruck, the second first responder may be an ambulance with an EMT, the third first responder may me a Hazmat crew, the fourth may be local police or highway patrols. Each level or type of responder needs to have this information. An EMT needs to safely get the patient out of the vehicle.

For example, in a Tesla model S, the battery may vent flames from the rocker panel below the passenger door. The EMT must know this to ensure that the patient extraction is safe. This type of failure or fire is not typical for a gasoline or diesel-powered vehicle. For example, the responder may determine a tow truck must pull a partially submerged vehicle out of the water first before the passenger extraction begins. Hydrogen vehicles similarly will vent the contents of their hydrogen fuel tanks in certain situations. This can present a particular danger if the vehicle is parked indoors such as in a parking garage. The systems and methods disclosed herein inform all responders about what type, make and model the car is, so the planning for the rescue is done correctly. This can save valuable minutes, hours or seconds in planning.

As an example, the warning system for a 2016 Tesla Model S, electric vehicle during an event, may produce colored lights, that flash with information, and the typical "stop" or pause function of a Morse Code type system is a three second solid white light, or no light at all for three seconds. The information preferably should be delivered in segments, not as a chunk. The first responder needs to clearly understand the information being sent, perhaps relay it to other responders, via radio or voice, type it into a laptop or mentally process it as part of the "size up" to make a plan. First responders are trained to be calm and methodical, and the first step is to "size up" the event, so how and what they are dealing with can be understood. This is vital for example, if a large vehicle that is battery powered is on fire. The PPE needs could be completely different. For a Ford F150 Lightening, the battery pack weighs 1800 pounds and is very large, and presents outsized dangers, so the first responder will need SCBA (self-contained breathing apparatus) and extra canisters. The responder will send for back up water trucks and may require non-arcing Nomex gloves for example. The systems and methods described in this application assists first responders, because they can't tell what is causing a fire under a vehicle for example. A hose may be on fire producing flames, but it may not have affected the vehicle's battery. The disclosed systems and methods can indicate if the battery is involved or not, meaning a generic vehicle component fire that does not pose an incredible risk.

The above-described system is for the first danger event that occurs on or in a vehicle. This application also addresses a secondary event. What is becoming increasingly common, is to have a spontaneous reignition of a vehicle's battery after the first event. For example, in Nashua New Hampshire in April of 2022, a Tesla caught fire, and was "put out" by the local fire department. The car was deemed to be inert and towed to a "tow yard" where the vehicle sat outdoors waiting for an insurance adjuster or plan to dismantle or repair the vehicle. Six days later the vehicle burst into flames, without warning, spontaneously and what remained was charred metal, because the fire was so intense, hot and long lasting. Lithium-Ion battery events like this can cause a damaged battery pack to spontaneously reignite for up to three weeks. This has been documented globally and has the safety issue for the public, first responders and infrastructure is that what is viewed as an inert vehicle, can suddenly and violently burst into flames, and set fire to any combustibles in the area, be it, other cars, tires, boxes, equipment etc. The "inert" vehicle may be located outside next to other vehicles at a dealership for example or indoors at a dealership or repair center. If the vehicle is outside directly next to, in front of or in back of another vehicle it could set that vehicle on fire creating a "daisy chain" fire event.

Vehicles other than cars can also pose a substantial danger. For example, riding mowers, which for commercial uses can be quite expensive. Consider for example, a distributorship or retail store. If there is a fire in the distributor facility or store, or a mower that has on board battery storage ignites, due to a fire or a spontaneous combustion event, the store personnel, and first responders need to know what mowers and lawn equipment are gasoline or battery powered. Why is this information vital? Battery fires burn hotter, can propagate from cell to cell internally, can shoot flames in all directions, and cause extensive damage, which can include toxic gas releases, etc. The on-board dangers of a battery mower event are completely different from a plug-in mower or a gasoline mower. For example, if there is a mower section at a particular retailer for example, the different types may be shown together. The rechargeable lithium-ion battery mower will typically have between 40-70% charge in the battery, while a gasoline mower will typically have no gasoline on board, while it is on display. Lithium-ion batteries are shipped and leave the factory with that amount of charge as an example. While the gasoline mower is inert in the display area, the rechargeable mower may be at 75% of its charge. Batteries may react differently in events based on their state of charge. In the above listing a $6,400.00 mower could certainly support the addition of the light or wireless transmission of its status. In the case of park maintenance, the mowers may be housed in one place at night. If there was a facility fire, knowing the power type of each mower would be essential. Moreover, lithium-ion fires require copious amounts of water, where gasoline fires may not. Lithium-ion fires cannot be suppressed using the same methods as gasoline fires. This is a very common misconception. Copper powder from handheld extinguishers can act as an arc, which can spread the fire, not suppress it. Portland Cement is a typical fire extinguishing medium. It simply covers the fire and deprives it of oxygen. It works for a wood or gasoline fire but is the worst thing for a lithium-ion fire. Why? It puts a cover over the battery which continues to burn under the cement.

The disclosed systems and methods can be particularly useful in parking lots or garages where multiple vehicles are parked together. The disclosed light and visual and/or wireless communication, provide an initial warning during the first fire or event that a reignition or ignition has occurred or is about to occur. This application introduces a whole new, novel and unique approach to vehicle safety and after event monitoring where it is increasingly possible for cars simply to catch fire while parked, or reignite days to weeks later. For the "junk yard" owner, it becomes a perpetual and endless possible area of vehicles that could ignite without warning, and in turn cause vehicles parked next to, or stacked on top of the "totaled vehicle." For vehicles parked side by side, the visual/acoustical/wireless transmission would perhaps be beneficial at the top of the vehicle, while for vehicles stacked on top of each other, a side illuminated area would be preferable. This application offers multiple points of visibility, acoustical ability and wireless transmission ability.

A similar situation holds true for trains. Electrified railways were increasingly common globally by the 1930's. To the non-train enthusiast or historian, they look incredibly similar to the Amtrak trains of today. If there is a fire on a battery powered train versus an electric train, the suppression methods could not be more different. The art of putting out a fire on the train of today and yesterday, is known art. Not complex, somewhat easy to accomplish, with almost a century of data and know how. For cargo trains that are only battery powered the dangers are amplified because of the power of the batteries required to pull a heavy train. A hydrogen powered train or truck can similarly pose a substantial danger due to the volume of hydrogen required and the venting that can occur in a danger situation.

First responders use the term "knock down", meaning how long it will take to put the fire out. They may and frequently say: "We knocked it down in 2 hours with 500 gallons of water." There are templates, guidelines, documented best practices and a century of training. In 2020 Japan introduced the lithium-ion bullet train, and the first electric freight train was used in 2021 for example. These trains have megawatt battery systems, and in many cases cannot be suppressed by water alone, depending on the capacity of the train's battery. It may be a "let it burn out" event or may require 20 times the amount of water a normal gasoline or diesel train, or electrified rail train may require to extinguish. To the average first responder, who may live in a remote town, with one railroad track which may be used once a day, it will be virtually impossible to tell the power source, especially at night, during a fire or in a fog. The light and or the information transmitted will be vital for planning the suppression. Additionally, these trains, may have hundreds of passengers on board, which need to safely exit, or in the case of the freight train, may be carrying electric vehicles to their dealer destinations. Battery fires, burn hotter, release toxic particulates, and can propagate. If the cargo is lithium-ion cars for example, it creates a potential catastrophe, like the fire on the vehicle transport ship with 4000 vehicles, which sank in 2022. Burning lithium-Ion batteries create toxic emissions, and first responders need to have the appropriate PPE and SCBA (Self-Contained Breathing Apparatus) for the suppression of these events. Concerning the public, the toxic gasses, bottle rocket effects of individual battery cells exploding (which shoot in multiple directions like bullets) and electrolytes pose great dangers if inhaled or there is chemical to skin contact. The effects of exposure to HF gas may not be immediately evident so if it is determined that an individual was in a battery powered vehicle with a burning or damaged battery pack, the detection of HF gas can help in treating the individual. The visual/acoustical/wireless options this application covers can offer a user one desired effect (the light) or a system incorporating all described in the application.

The disclosed embodiments may be better understood by way of the accompanying figures which are described below with reference to the designated alphabetical references in the figures.

Figure 2:
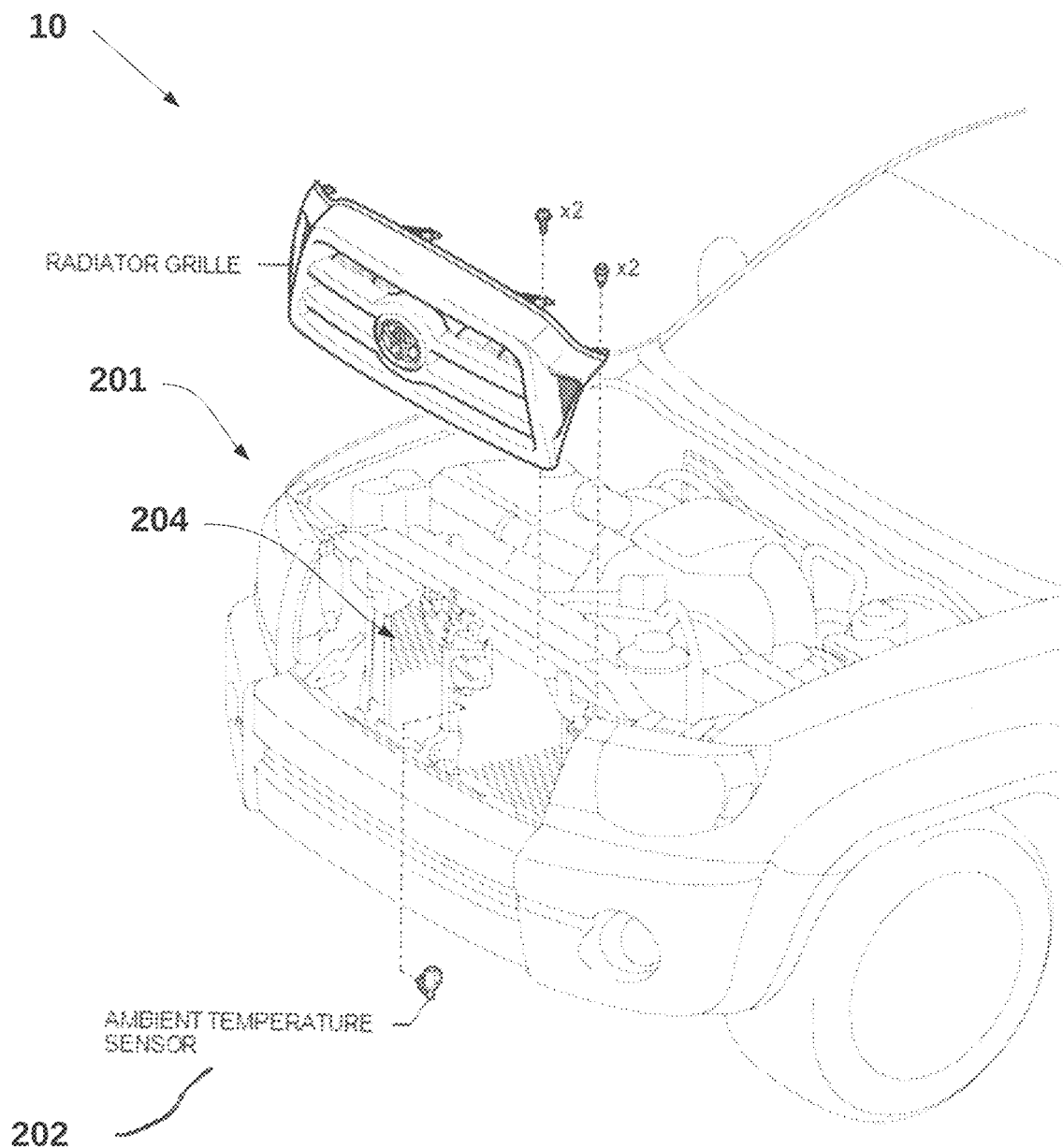
FIG. 2 is a view of a vehicle engine compartment showing an embodiment of a temperature sensor.

FIG. 1 is a view of an exemplary vehicle 10 employing an embodiment of an energy supply status indicator. The vehicle 10 has one or more energy sources to provide propulsive energy, with the energy sources including batteries, which may be located in a variety of locations including in or around the vehicle chassis, such as shown at 102, in or around the rear of the vehicle including the vehicle trunk, such as shown at 103 and/or in around the front of the vehicle including an engine compartment such as shown at 104. The vehicle 10 may also employ energy sources other than batteries, such as hydrogen fuel cells, and/or petroleum (e.g., gasoline/diesel/compressed natural gas) to power a conventional internal combustion engine. As is increasingly the case, any given model of the vehicle 10 may be equipped with one or more energy sources with no or minimal external badging to indicate the energy source(s) employed by the vehicle 10. The vehicle 10 in some embodiments may also include visual indicators 106, 107, 108 positioned proximal to the vehicle batteries to specifically identify the location of the vehicle batteries FIG. 2 shows a view of an exemplary engine compartment 201 of a vehicle 10 with an internal combustion engine and having an ambient temperature sensor 202, which can be used to detect an energy failure event. In such an embodiment, if the vehicle 10 senses a predetermined temperature (e.g., 145 F) it will initiate a potential failure warning. Vehicles are typically equipped with an ambient temperature sensor 202 and the embodiment of FIG. 1 takes advantage of employing such an existing sensor to provide a warning. The ambient temperature sensor 202 is shown as being positioned in an engine compartment housing a conventional internal combustion engine. Specifically, the sensor 202 is positioned on a radiator 204. Such a sensor 202 may be employed in other locations of the vehicle to provide temperature indication of other vehicle systems including of vehicle batteries (for example, lithium-ion battery packs can produce heat, metal particles, toxic gases when failing), electric motors and fuel storage systems such as hydrogen fuel cells. The predetermined temperature at which a failure warning is triggered will vary according to the location of the temperature sensor 202 and the temperature ranges typically experienced at that location.

Figure 3:
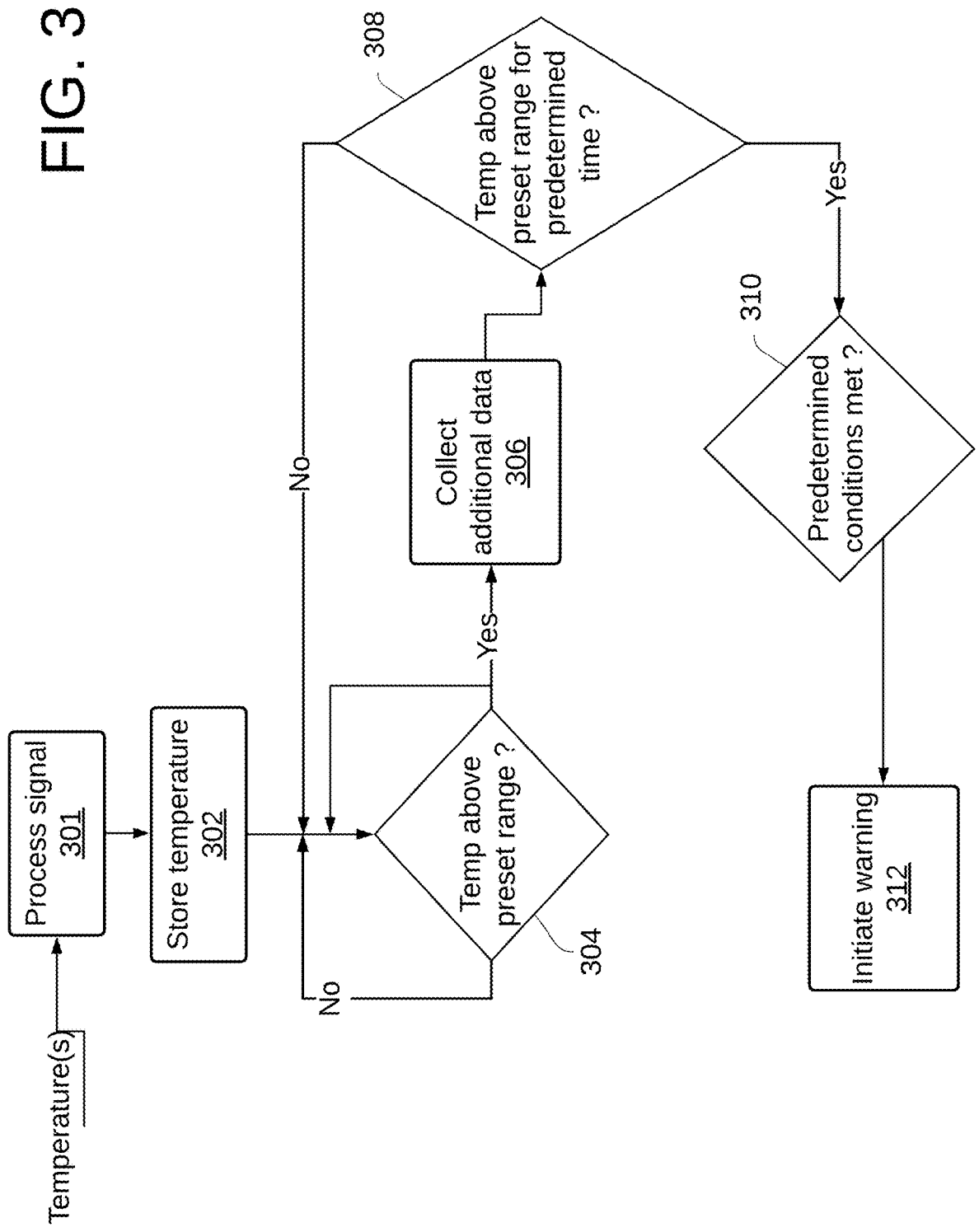
FIG. 3 is a flow diagram illustrating processing of a temperature signal generated by the temperature sensor of FIG. 2.

The temperature sensor 202 in one embodiment generates an electrical signal that is provided via an electrical wire or wiring harness to a controller that receives and processes the signal in a manner shown in the flow diagram of FIG. 3. As seen in FIG. 3, one or more temperature signals are received and processed at 301 from one or more temperature sensors 202 and stored at 302 for further processing and vehicle diagnostics. In the event that a received temperature signal is an analog signal it will be sampled at a sampling frequency. A received temperature signal may also take the form of a digital value which may undergo some conversion before storage. A received temperature signal may be filtered and/or may be averaged over a time period to remove spurious signals. Each received temperature value is compared at 304 against a preset range that is stored for the particular sensor that generates the temperature value. The comparison continues regardless of the determination at 304. In the event that the received temperature is above the corresponding preset range, then at 306 additional data is collected to determine if the received temperature indicates a failure that requires a warning or if the received temperature is a spurious value. In one embodiment the additional data will be additional temperature readings and comparisons 308 from the same temperature sensor over a predetermined period of time. In another embodiment the comparison 308, the additional data also includes temperature readings and comparisons from other temperature sensors, also over a predetermined period of time. In the event that predetermined conditions for initiating a warning are met at 310 a warning is then initiated at 312.

The term "sensor" as used herein refers to a variety of types of sensors. A temperature sensor in an engine compartment that includes an internal combustion engine may take the form of a coolant temperature sensor that is used to measure the temperature of engine coolant. Other temperature sensors may include a Negative Temperature Coefficient Thermistor (NTC Thermistor), or a Positive Temperature Coefficient Thermistor (PTC Thermistor). Temperature sensors positioned to detect the temperature inside a passenger compartment may also be employed and the signal from such temperature sensor(s) may be used for other purposes such as for climate control functions. In addition to the temperature sensors described above, sensors that may be used including IR sensors, or Hydrogen Fluoride (HF) sensors that are used for battery fire events and can detect "off gassing" and other battery events. A temperature sensor can also detect a surface temperature, like a thermostat a car has, that signals an overheat situation, or a temperature sensor, placed on the underside of the car, on any metal panel or on or in the vicinity of a battery pack or other components that may release heat when failing. The sensor may also be an HF sensor placed under the vehicle, in or on the bumper, including being integrated into a backup sensor, on the side of the vehicle or located in the shark's fin. Other sensors can include those that sense various gases that may be expelled by a defective battery.

Temperature sensors may be on all drive train components and by the electrical charging connection (port), to warn of icing or excessive heat due to overcharging or electrical spikes which can lead to component damage, failure or fires. Humidity sensors may also be located at the charging port to warn of excessive moisture, which could lead to shocks to the owner when engaging the port or to a short circuit. Flame detection sensors could be located by the battery pack, battery vent, charging port and high-power electrical cables and drive motors. Smoke detection sensors could be located by the battery venting areas, on the battery pack, at the corners of the battery pack, underneath the battery pack or on top of the battery pack. Additionally, all of the described sensors can be located as repeater sensors in the passenger cabin, the trunk and under the traditional hood areas. Multiple sensors of different types can piece together a clear picture of the out of bounds issues at hand. The number and type of sensors will vary according to the number, location and types of energy sources that a vehicle employs and also as a function of the price of the vehicle (with more expensive vehicles employing a larger number and more diverse types of sensors).

All of the described sensors can be used to detect a fire that does not involve the drivetrain components or related fuels, liquids, battery cells etc. For example, the fire may involve, for example, a cigarette and upholstery. That is a fire that is easier to remedy than one involving a powertrain because the rescue operations needed by the first responders will differ. Copious amounts of water may not be required if it is a simple fire, not one involving a battery pack.

Sensors for HF, hydrogen, electrolyte, formaldehyde, etc. can be located anywhere in the passenger areas. For example, on most BMW models there are small grilles with openings for the microphone in the headliner. This allows for the driver to speak naturally when making a call. The gas or heat sensors can be located next to, in the same grille or in a separate unit in the headliner, for easy and cost-effective integration in the vehicle. In some vehicles, existing temperature sensors that monitor the cabin's temperature so that the automatic climate control can keep the cabin at the desired heating or air conditioning preferences may be employed. Many vehicles even sense excessive particles from the vehicle being in a tunnel with multiple diesel buses and such sensors may also be employed to detect danger conditions. Such particulate type sensors alone or in conjunction with specialized sensors designed to detect gases expelled from a battery leak may be employed to ascertain just what the driver and/or passenger may be breathing and at what concentration. This proximity allows the vehicle to react with knowledge, transmit the information to first responders, call centers and perhaps passengers in the third row of a large SUV or van. In a school bus type vehicle, it could alert the rear passengers of the bus, if the leak is only in the front area of the vehicle, to exit.

The warning may be provided in a variety of ways and in any given vehicle may be provided in more than one way to ensure that all affected individuals, such as the driver, passengers, bystanders and first responders (e.g., fire, police, rescue squads) are informed of the status of the energy supply. Various embodiments of indicators to indicate the status of the energy supply of a vehicle are now described.

FIG. 4 is an illustration of a "sharks fin" type roof mounting 402 that may be used in an energy supply status indicator. The position of such a mounting 402 is advantageous in that it is typically position on the roof of a vehicle, towards the rear of the roof and in the center, roughly equidistant from each side of the vehicle. As seen in further detail in the exploded view of FIG. 4, the "shark fin" is raised, visible, and it typically has wires going from the car's electronics to it. Adding a light 404 positioned on a portion of the exterior of the shark fin 402 may be accomplished by running an additional wire to the exterior "shark fin" and having a visible opening with an LED or bulb that is powered and visible. Rarely are roofs destroyed in common car crashes. The back, front and sides are the most common areas of impact. The roof is only affected in a roll over situation or where a car would underride a truck's rear trailer. Those incidents are a miniscule fraction of all vehicular accidents. The roof is the most logical, visible and highest point of the vehicle, and can be clearly seen. Think of truck or truck trailer lights at the top of the cab and the trailer. The visual indicator in this position, has the clear advantage of being seen from any vantage point. It offers 360% coverage. Additionally, and/or alternatively, the visual indicator may be located in the third brake light area in the rear windshield of a vehicle. It should be understood that such an arrangement can limit rearward visibility. The backup battery as described herein also ensures that the sound and light components will still be functional in case of a battery fault in the main system of a car, building, garage, etc. The sharks fin shown in FIG. 4 is only an example. A vehicle may have a similar structure elsewhere on its body and may have more than one sharks fin type structure.

Figure 5A:
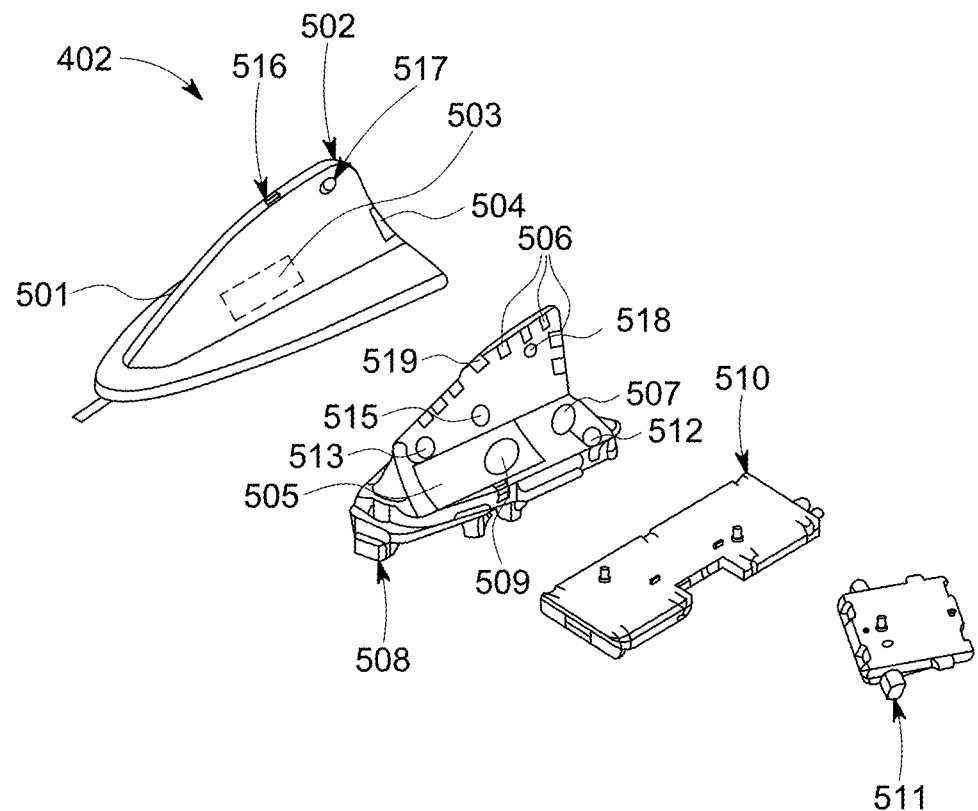
FIG. 5A is an exploded view showing various components of one embodiment of a "sharks fin" type roof mounting.

FIG. 5A is an exploded view showing various components of one embodiment of a "sharks fin" type roof mounting. The roof mounted "Shark's fin" 502 which typically houses a GPS antenna. The cover 501 of the sharks fin 502 includes a clear or opaque portion 503 that allows a visual indicator such as an LED or light panel to be visible on the exterior of the sharks fin 502. The cover 501 encloses a body portion 505 upon which are mounted various light sources and speakers to provide visual and audible indications. In one embodiment, the sharks fin 502 may have mounted thereupon, individual LEDs 506 placed for visibility on the top or sides of the sharks fin 502. In one embodiment, the sharks fin 502 may also have mounted within or upon or attached therein or thereto a speaker 507 to provide an audible indication. A wireless transceiver 508 may in certain embodiments also be incorporated into the sharks fin 502 to provide one or two way communication with a radio unit that is external to and separate from the vehicle 10. A self-contained power unit 509 may also be incorporated into the sharks fin 502 to provide primary or secondary power to electrical components in unit 502. Another source of energy such as battery 510 mounted below the body portion 505 may also be incorporated should a longer battery lifespan be required. A control unit 511 to provide control specific to the sharks fin 502 with plug in direct connection to the vehicle may also be employed. In one embodiment, the control unit 511 processes the received information and performs the actions shown in FIG. 3 and explained above. The unit 502 may also in certain embodiments employ a heat sensor 512 which detects excessive temperature in and around the unit 502 as a warning of possible ignition or reignition. Such a sensor 512 may be in addition to other sensors on the vehicle and the signals provided by such a sensor 512 can be processed in accordance with the operations shown in FIG. 3. A HF or other gas sensor 513 may also be incorporated into the unit 502 to detect "off gassing" from a battery event. In some embodiments, all or portions of the unit 502 may be illuminated with, for example, fiber optics, light guides, OLED (Organic Light Emitting Diode) panels or OLED illuminating applied "paint" such as seen generally at 514. An integrated two-way communication microphone/speaker 515 may also be incorporated into the unit 502. The microphone/speaker 515 allows a first responder to speak to the command center, if the vehicle's integrated voice system is damaged or fails.

In one embodiment, the cover 501 includes an opening 516 for an LED or light source to allow light to be projected upwards or on an upwards angle for image projection, image transfer, or "Kleig Light" effect which sends a solid or blinking pole of light upwards which can be captured by the smoke or clouds and appear to be a light column. Another opening 517 on the cover 501 allows light to be projected horizontally or at an upward or downward angle onto a wall, floor or other vertical or horizontal surface. One or more LEDs, bulbs, or fiber optic or light guide of any kind 518 project light, an image or symbol of a warning through opening 517. Other LEDs, bulbs, or fiber optic or light guide of any kind 519 project light, an image or symbol of a warning through opening 516.

Any wireless transmission from the vehicle's automatic connection to the first responder or connection to vehicle's call center can include: how many passengers are in the vehicle, by determining how many seat belts are buckled. Vehicles often have weight sensors in the seats, so if the front passenger seatbelt has been securely buckled, but the weight sensor is not detecting weight from its sensor, it is likely the vehicle is upside down or on its side. This may not be immediately apparent at night, in fog, or torrential rain at night. The vehicle or call center can determine if the ISOFIX latch is in use, meaning a child seat has been secured in the back seat. The call center can also give the age or approximate age of the owner of the vehicle, which may be helpful when planning a rescue.

In one embodiment, the alert via wireless transmission can be provided directly to a first responder's mobile phone. The alerts can also be part of the nationwide "emergency alert" system built into every smartphone sold in the USA. The system captures the phone and makes a loud alert or visual alert on the screen or both, if there is a tornado approaching, an amber alert or other such warning.

Figure 5B:
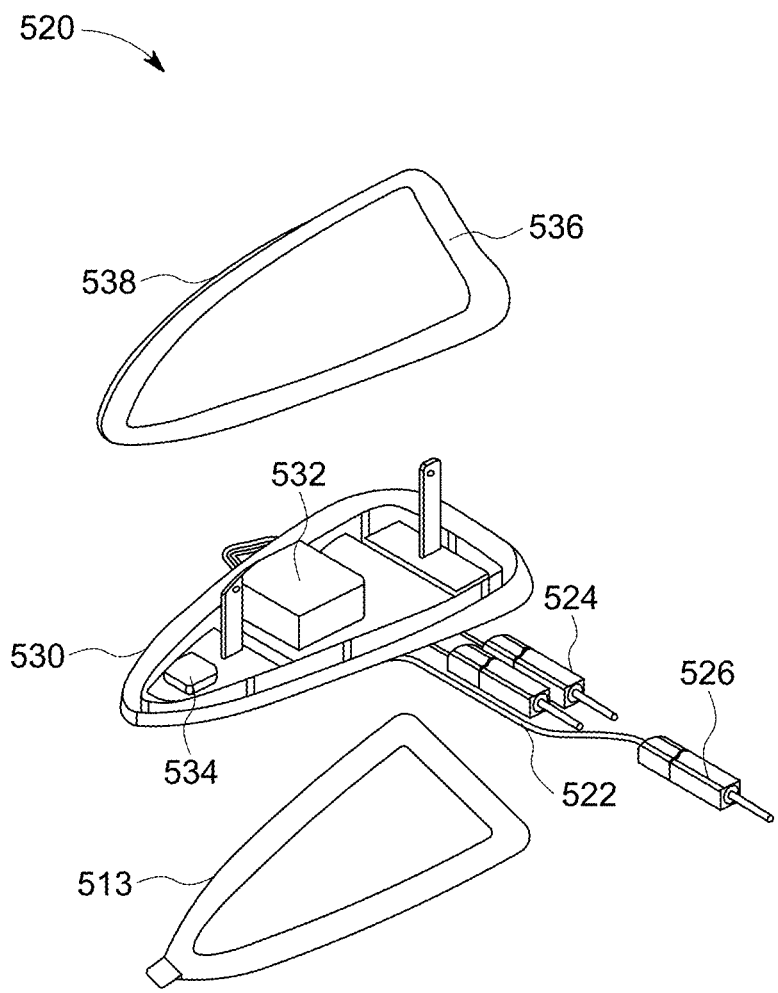
FIG. 5B is an exploded view showing various components of another embodiment of a "sharks fin" type roof mounting.

FIG. 5B is an exploded view showing various components of another embodiment 520 of a "sharks fin" type roof mounting. A plug-in connection 522 connects the sharks fin 520 to an electronic vehicle management system. Separate cables 524 and 526 control sound and visual indications respectively. The visual control cable 526 in one embodiment may be a luminescent fiber optic cable which can eliminate the need for an LED in the shark's fin 520. A fiber optic cable or light guide can transmit light from a distant illumination source located on the roof or a B or C pillar or elsewhere in or on the vehicle. For example, there may be one high powered LED, located in the trunk away from moisture and sunlight, which sends the light through a fiber optic cable or multiple cables to multiple end points. This results in one light source send a visual indication to the front, rear, B pillar, roof and also to project the indication on the wall or ground. A mount 528 for the sharks fin 520 provides physical protection to the sharks fin. A base 530 holds the electronics and other components of the sharks fin 520 which are powered by a battery 532. A speaker 534 is connected to the audio cable 526 and provides an audible indication. A cover 536 encloses the apparatus and contains an opaque area 538 that lights up to provide a visual indication.

The sharks fin embodiments shown in FIGS. 5A and 5B and described above are two examples of apparatus that may be mounted to the exterior of a vehicle. The apparatus and operation of the embodiments of FIGS. 5A and 5B may be employed in other form factors that are mounted on other areas of a vehicle. The sharks fin shape is an aerodynamic, known and aesthetically pleasing form factor but other shapes and locations may be employed to provide visual and/or audible indications.

Figure 5C:
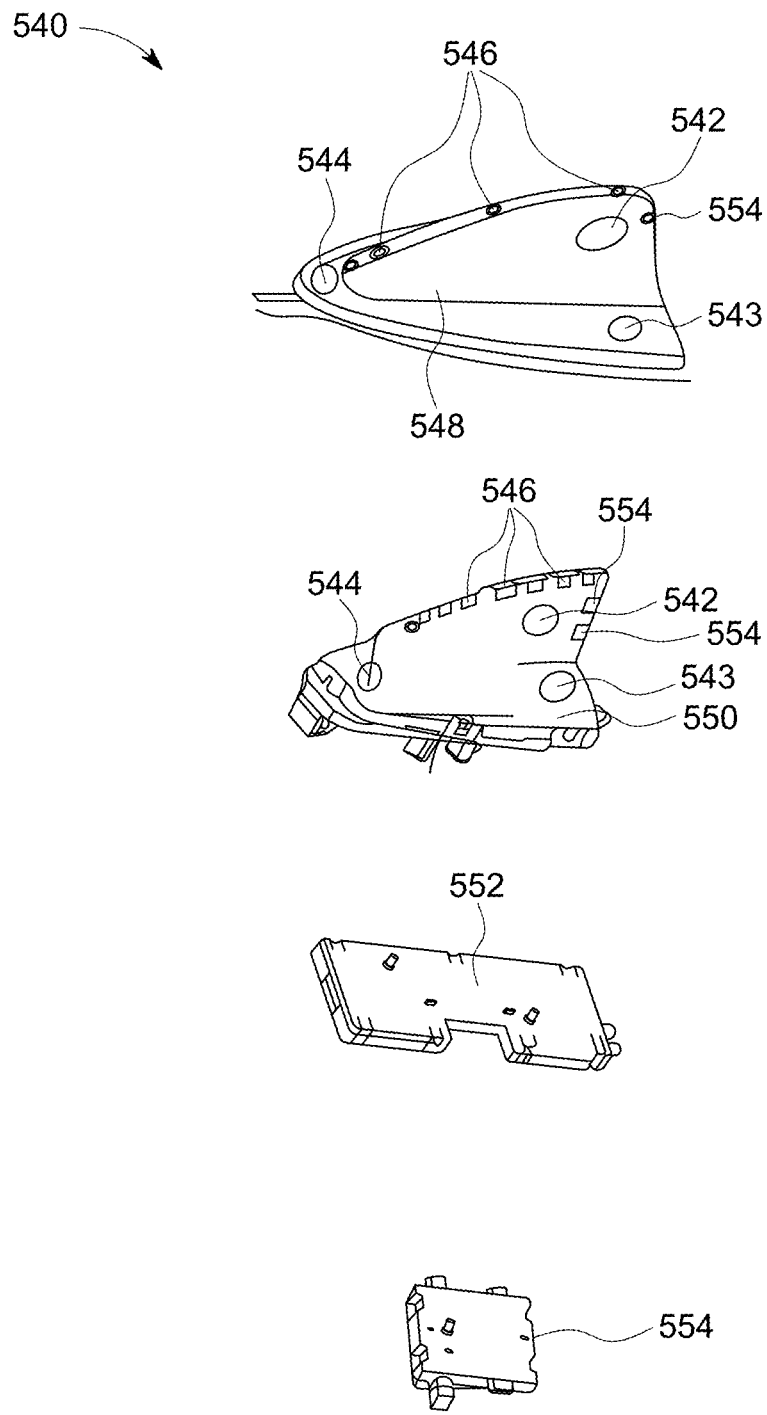
FIG. 5C illustrates another embodiment of the sharks fin that projects light in an upward direction.

FIG. 5C illustrates another embodiment of a sharks fin 542 that projects light in an upward direction. One or more LEDS (or other type of illumination), such as seen at 542, 543, 544 provide illumination to convey information about a danger condition. This area may also be an opaque or clear area where the light passes through from the LED which is below the protective and decorative sharks fin cover. This clear area becomes a light guide or window. The light may be solid, blinking, multicolored or this area is the source of an image projection shown in FIG. 5D or 5E that reaches a wall, ceiling or other area. The area around LED 542 can also project an image to the ground, a beam of light or lights. One or more additional illumination sources (such as LEDs) shown at 546 positioned along the ridge of the sharks fin are upward facing LEDs or windows to project light or an image in an upward direction. The LEDs or the covers described above are mounted within or upon housing 548 which forms the outer body of the sharks fin 540. The housing 548 encloses a frame 550 upon which the LEDs described above are mounted. A controller 552 mounted within housing 548 controls the various LEDs on the sharks fin 540 in response to temperature signals received from temperature sensors mounted in various locations on the vehicle. The controller 552 in one embodiment may operate in accordance with the flow diagram of FIG. 3. In another embodiment, the controller 552 may not be necessary in the event that temperature signals are processed by a controller located elsewhere in the vehicle. In such an instance the sharks fin 540 would receive signals from the controller located elsewhere in the vehicle that would energize the various LEDs. The sharks fin 540 also includes a battery 554 that provides power to the controller 552 to permit the controller to continue to operate in the event of loss of power from the primary power source, located elsewhere in the vehicle, for the sharks fin 540.

Figure 5D:
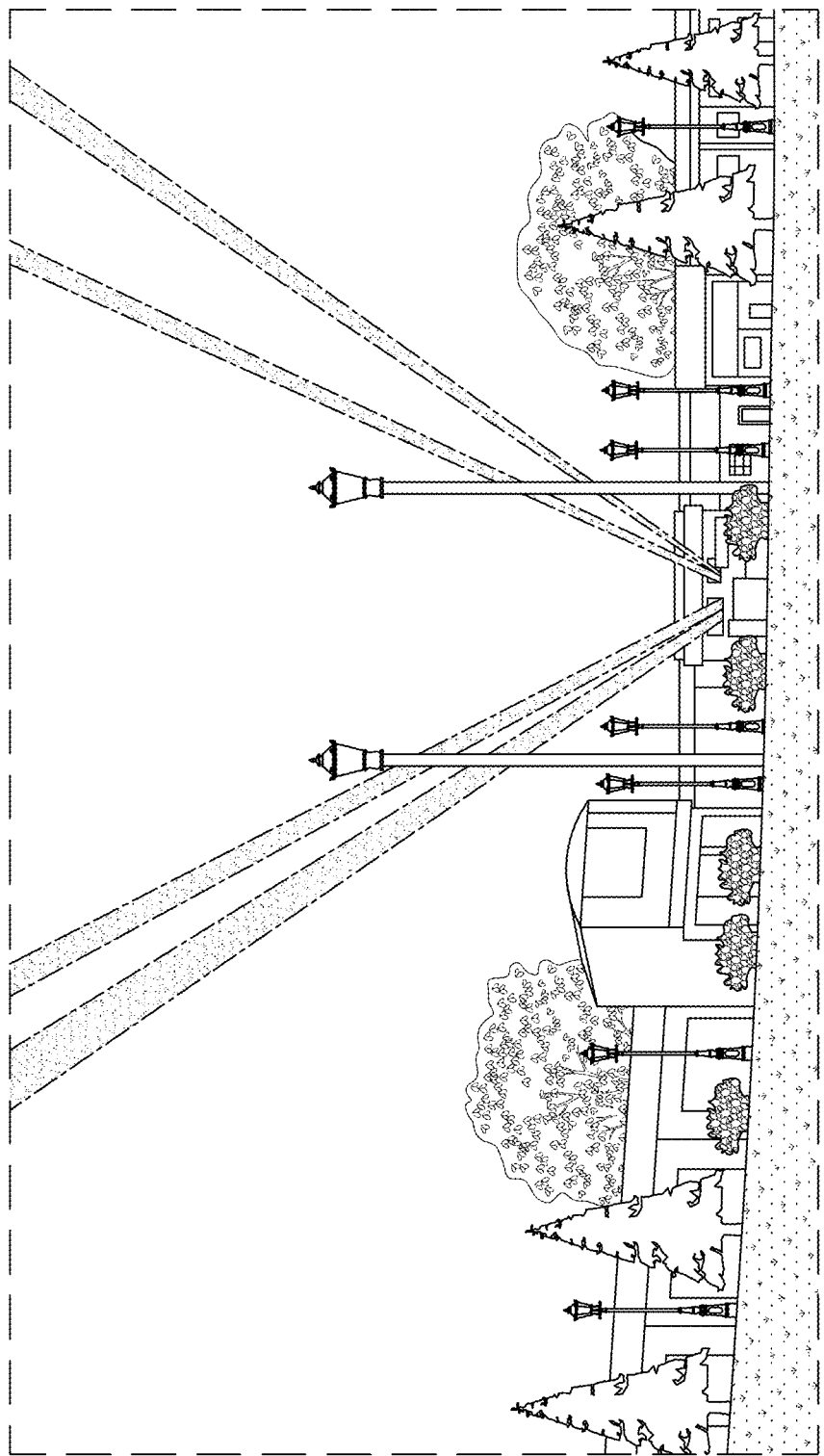
FIG. 5D illustrates a sample projection by the embodiment of FIG. 5C.

FIG. 5D illustrates a sample projection by the embodiment of FIG. 5C. In one embodiment LEDs 546 project upward with collimated beams of light provide one or more indications that can be seen from a distance. The collimated beams may be of different colors and/or may vary in intensity, for example in a flashing pattern, to provide various coded indications. In another embodiment, the LEDs 546 generated a more diffuse light such as a flood light or a spotlight. FIG. 5D illustrates a projection by a vehicle that is outdoors. A particular advantage of the upward projection is when a vehicle is indoors, such as in parking garage or tunnel where the upward projection will be visible on the interior surface of a roof or upper enclosure of the structure or floor within the structure. This is advantageous, if a larger SUV is blocking the view of a smaller electric vehicle. The first responder or attendant, simply has to scan the ceiling of an indoor garage space, to see what vehicles are present, and in distress. If, for example, five vehicles are in distress, the five light signatures will be visible if the ceiling is flat and preferably a lighter color. Having the images projected onto the ceiling, is an advantage to looking for individual cars, sharks fins, to size up an event. For example, if the garage is densely packed, and goes around corners, the viewer simply has to look up. This also presents an advantage, because the first responder, could potentially be able to keep a greater distance from an event, which may lead to a sudden burst of flames, heat or toxic aerosols.

Figure 5E:
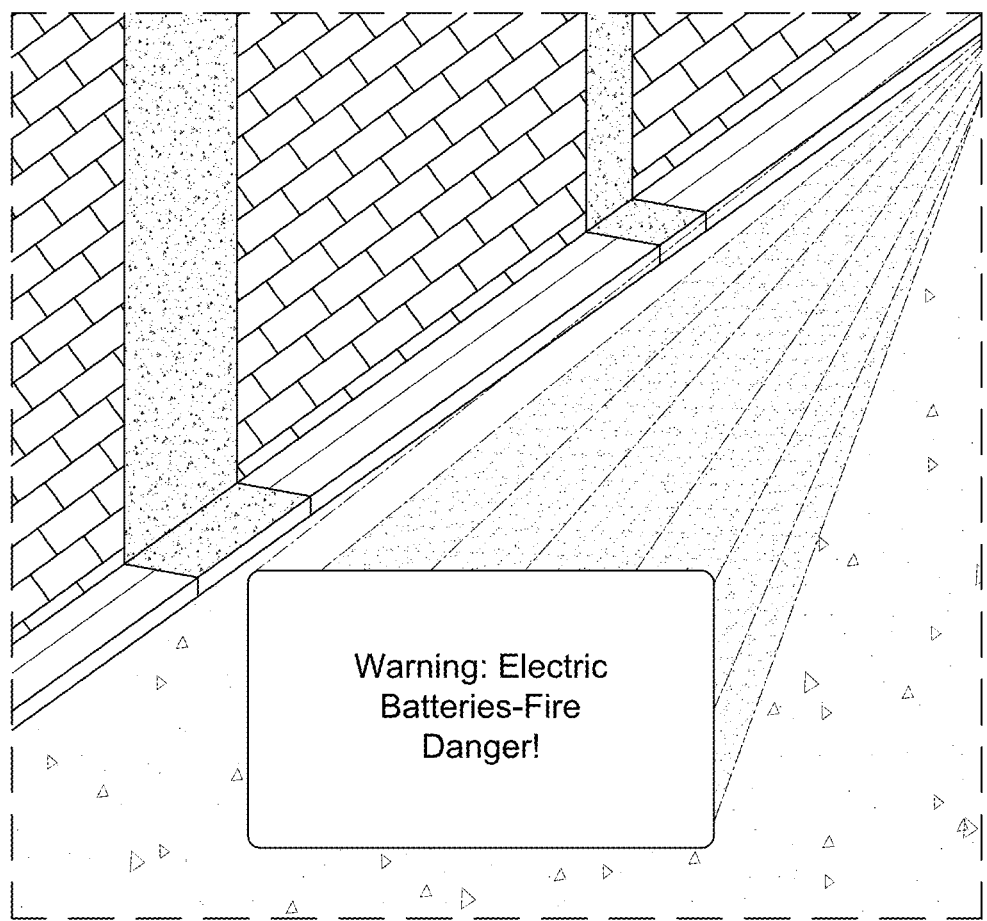
FIG. 5E illustrates another sample projection by the embodiment of FIG. 5C.

The upward pointing indication can also be visible if there is smoke in the area. The light emitting from the sharks fin, pointing upwards will illuminate the smoke it passes through, creating a "light pole" or Klieg Light effect, even if the vehicle or vehicles are in outdoor spaces. The smog, fog, mist, rain, smoke, etc. in the environment above the vehicle will capture the light, such as shown in FIG. 5D. The LED, light guide or fiber optics, can also send an image to the ceiling, floor, wall, or any surface using "image projection" or "image transfer" as shown in FIG. 5E. FIG. 5D shows how smog, clouds or weather conditions are conducive to catching the light emitting from the sharks fin or other area. The first responder can see this pattern from a distance of a half mile or more depending on the conditions. LEDs and lasers are incredibly bright, and consume little energy, so the output can be quite high concerning overall lumens produced. In another embodiment, the light pattern may take the form of a spinning effect. This would capture attention by being highly visible and unusual.

FIG. 5E illustrates another sample projection by the embodiment of FIG. 5C. In FIG. 5E, the LEDs 546 project downward onto the ground to generate various images including the textual warning shown in FIG. 5E. LEDs 554 shown in FIG. 5C will typically be better positioned to project downward as they face the rear of the vehicle where the vehicle body will pose less of an obstacle to downward projection. For a vehicle with a trunk the downward projection may be onto the vehicle trunk instead of the ground. The downward projection can be advantageous if the vehicle is parked on a residential street. If a battery vehicle is about to vent or have a fire issue, it could project "WARNING, FIRE HAZARD" OR "DO NOT APPROACH AREA" on to a sidewalk, or store's door or wall if the vehicle is parked in a shopping downtown area. It could spell out "Battery Fire" or show a flame pattern. For hydrogen vehicles it could show the words "FCEV" and "VENTING" if the car is about to empty the tank of stored hydrogen in an overheating situation. This would allow for instant information, and status of the vehicle, battery, and other vehicles in the vicinity. In one embodiment, the message blinks rapidly, is solid, changes colors at various intervals to assist colorblind individuals or sends a bright white light or other colored light between the messages in order to be stand out and be highly visible. This can be particularly important in urban environments where there can be lighting from a variety of sources including vehicle headlights, streetlights and billboards. All vehicle types would ideally have this warning because a burning battery vehicle, can cause a hydrogen vehicle to vent, causing a fireball or other fire hazard. Or a burning battery vehicle can set an adjacent battery vehicle on fire. Battery vehicles require more water to suppress a fire than gasoline vehicles do. Having the inventory of a garage can assist in the number of firetrucks and water needed to properly handle a fire or possible reignition. Another advantage is that if there are light sensors, that may turn on if an area goes from dark to light, it will automatically illuminate the parking structure, assisting in the mitigation of the event. The LEDs, OLEDs, fiber optics, light guides or luminescent materials can also create spinning patterns, flashing patterns or any light signature that is desirable. If a battery vehicle is on fire in a portion of the underside or there is smoke venting from underneath the vehicle, the sharks fin may become less visible. Having the light projected to a distant location above or to the sides of the vehicle, will be clearer to see. If the LED, laser or bulb on the sharks fin creates a rapid spinning pattern or bursts of flashes, it will be clearly of visual interest to anyone in the area, even if they are not trained to look for information from illuminated warnings for vehicles. The idea for the public to sense a dramatic difference in the vicinity and report it to a first responder, parking attendant or police personnel.

Garages in private homes or connected townhome style condominiums often have clear glass panels on their garage doors. The panels let in light. Armed with this system, the first responder, who's attention is first focused on the safety of the occupants in the house, during a fire can easily size up what is in the garage by the lights if the vehicle is in distress. Additionally, the first responder can scan for the vehicle, and connect to it, via WIFI, Bluetooth, IoT or any other means, if the garage doors have solid panels. If a single-family home has two battery vehicles in the garage, the SCBA, replacement tanks, and the amount of water needed greatly increases to suppress an event. Some vehicles park head on into spaces or garages, and some back in. The light pattern can also indicate if the vehicle is back to front or front to back. During events, you want to be able to pull the vehicle out of a garage if it is on fire or about to catch fire, or be warned for example, that HF gas is present in the garage, which may displace oxygen in a confined space. Opening the garage without this knowledge can create a fireball. Typically, SUVs have very strong tow hooks near the front bumper (like Jeep Grand Cherokees). and typically lack them in the rear. It is useful to the first responder using a chain, to know there is a large hook available to pull the vehicle out of the garage. The position of the vehicle does matter. If a hydrogen vehicle is first, in the front of a garage, and vents its entire contents rearward, it can also send a fireball directly onto first responders at the rear of the vehicle.

The lighting systems described all have back up capacity. This is advantageous if the battery vehicle has damage to the wiring, system or the high or low voltage is shut down. Battery vehicles can spontaneously reignite multiple times for up to three weeks or so after the initial fire. Many vehicles are sent to salvage yards and may not be fully intact. Meaning, they are pieces of vehicles. The self-powered, self-contained system disclosed herein would have worked for 30 days or so based on the back up battery, warning the junk yard owner of a potential or imminent fire.

Figure 6:
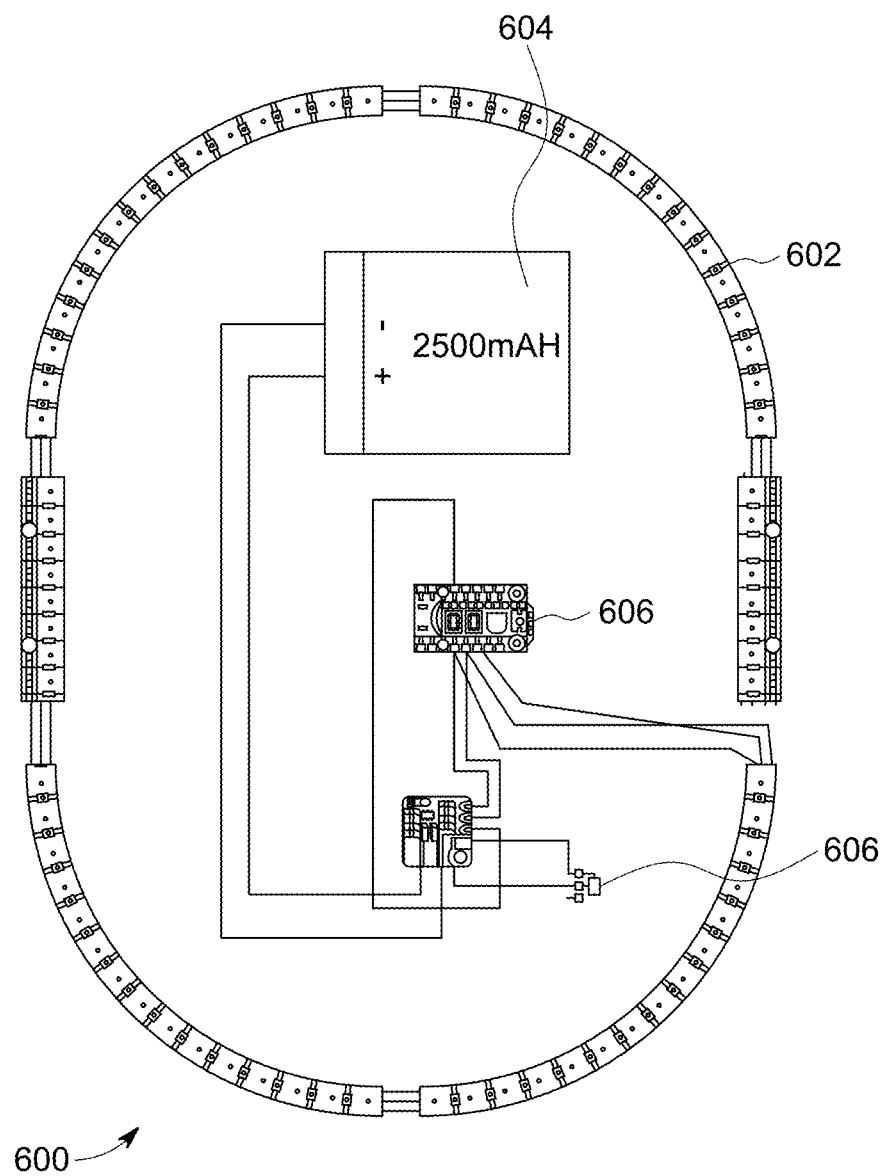
FIG. 6 is an illustration of an exemplary Light-Emitting Diode (LED) that may be employed in a status indicator.

FIG. 6 is an illustration of an exemplary Light-Emitting Diode (LED) array 600 that may be employed in a status indicator such as the sharks fin embodiments of FIGS. 5A and/or 5B. An LED "tape" 602 is positioned at the periphery containing LEDs attached in uniform areas. A battery 604 may be employed in certain embodiments to provide self-contained power and may be rechargeable. A controller 606 controls operation of the LED 600.

Figure 7:
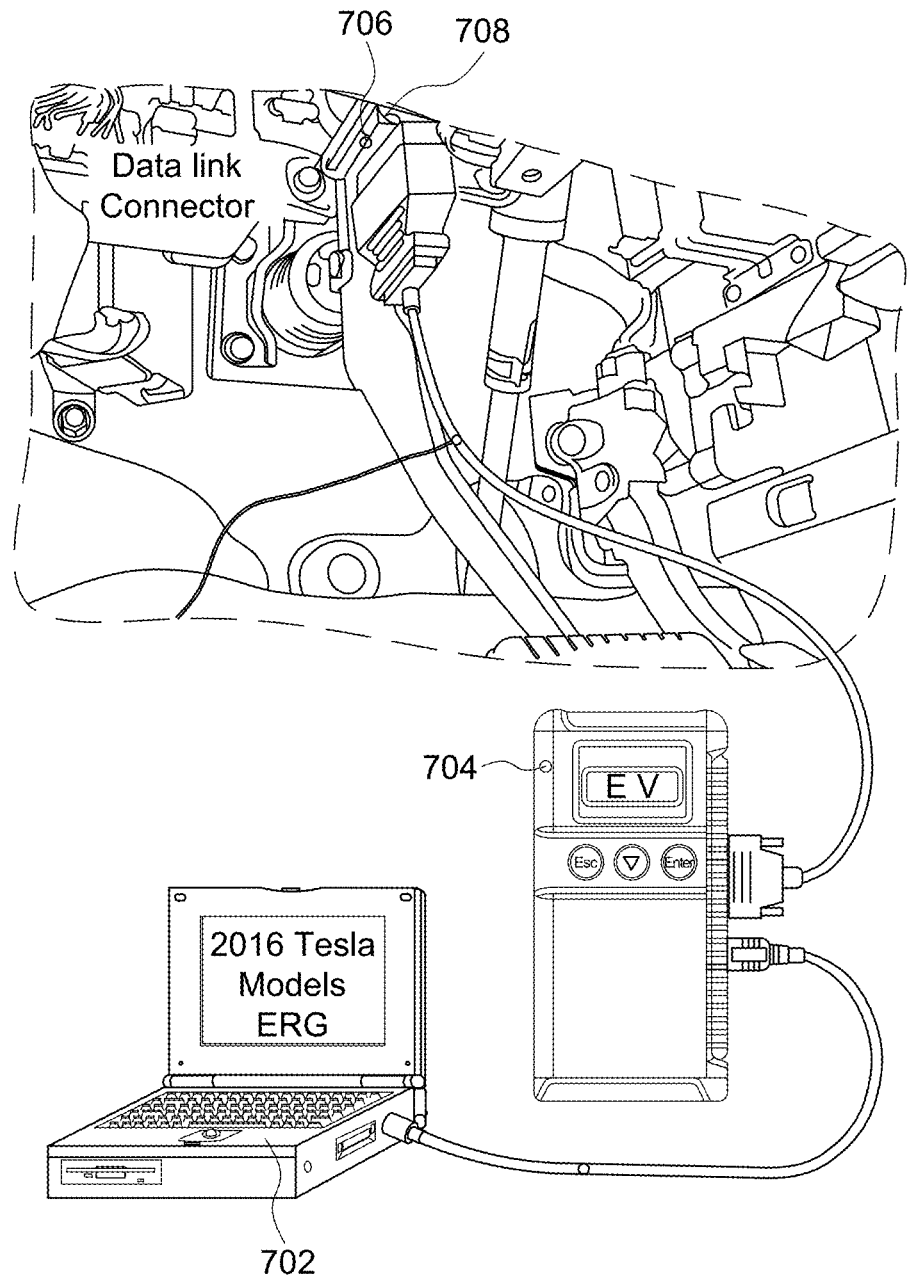
FIG. 7 is an illustration of an embodiment of an energy supply status indicator by way of a vehicle diagnostic electronic instrument interface.

FIG. 7 is an illustration of an embodiment of an energy supply status indicator by way of a vehicle diagnostic electronic instrument interface. In this embodiment the status indication is provided by way of a laptop computer 702 which can be used in conjunction with an electronic scan tool 704 for advanced diagnostics and control of the vehicle's systems. The scan tool 704 connects to the vehicle 10 by way of an OBDII port/data link connector 706 mounted to the vehicle and a data link connector 708 that provides a communication link between the OBDII port 706 and the scan tool 704. In one embodiment, upon connecting the scan tool 704 to the OBDII port 706 the OBDII system provides a message via the computer 702 identifying the energy source(s) for the vehicle 10, such as for example, that the vehicle is a pure electric vehicle, or that the vehicle has lithium-ion batteries and hydrogen fuel cells, or that the vehicle is gasoline powered and also has lithium ion batteries.

The term "lithium-ion battery" is strictly denoting one type of battery which is the most common at the time of this filing. The systems and methods disclosed herein are not limited to lithium-ion batteries and may be used with other battery technologies such as for example, nickel metal hydride, solid state, and lithium iron phosphate. New types of batteries may have their own unique characteristics and may require their own specific indications.

Figure 8A:
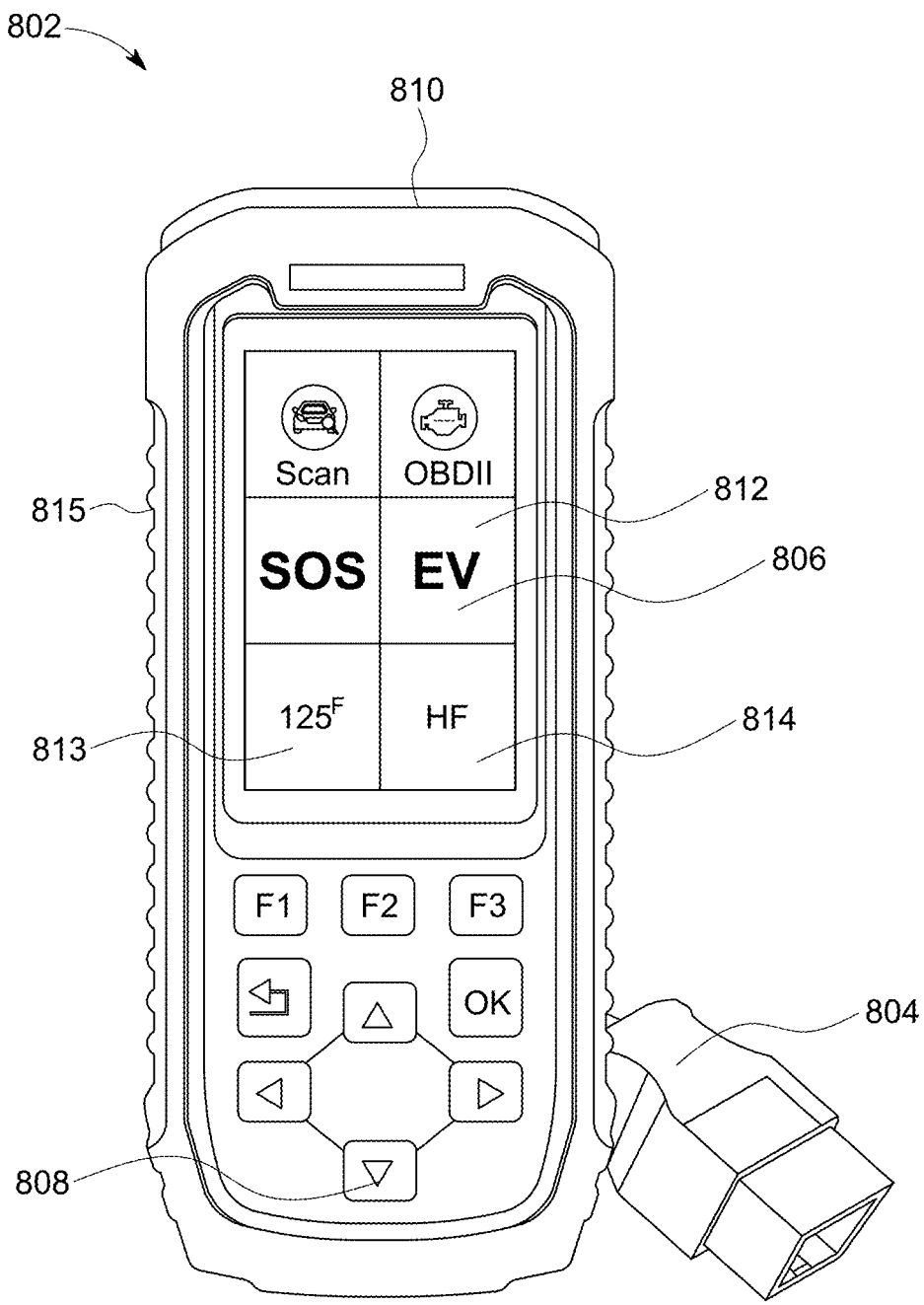
FIG. 8A is an illustration of an embodiment of an energy supply status indicator by way of a wireless vehicle diagnostic electronic instrument.

FIG. 8A is an illustration of an embodiment of an energy supply status indicator by way of a vehicle diagnostic electronic instrument 802. The instrument 802 connects to an OBDII port on a vehicle 10 by way of a connector 804. The instrument 802 includes an interactive display 806. In one embodiment, once plugged into the vehicle 10 basic information shows up on the screen 806 about the status of the vehicle, type, temperature and potential detection of toxic off gassing. The user can scroll through various screens or menus and reprogram if allowed. The user interacts with the instrument 802 by way of buttons which includes directional arrows to allow movement across images provided on screen 806 and preprogrammed function buttons (F1, F2, F3) to select specific operations. A speaker incorporated into the instrument 802 provides audible output such as, for example, alerting the user of a danger situation associated with the vehicle 10 to which the instrument 802 is connected. As seen, instrument 802 provides an identification of the energy sources in the vehicle 10 at 812 ("EV"-Electric Vehicle) a temperature indication at 813 to indicate temperature at the vehicle batteries, a detection of HF gas at 814 and at 815 a warning indication ("SOS") to alert the user of potential danger associated with the energy system of the vehicle 10.

Figure 8B:
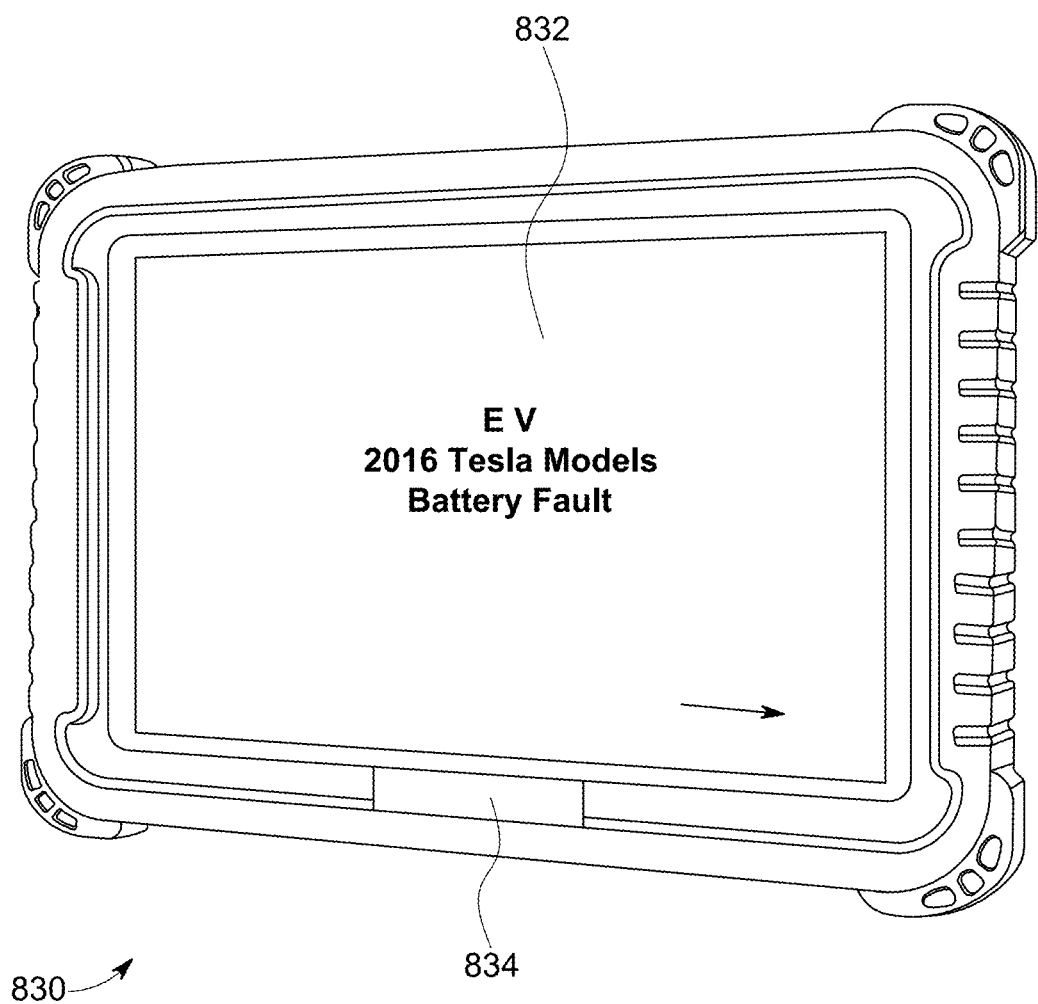
FIG. 8B is an illustration of another embodiment of an energy supply status indicator by way of a wireless vehicle diagnostic electronic instrument.

FIG. 8B is an illustration of another embodiment of an energy supply status indicator by way of a wireless vehicle diagnostic electronic instrument 830. The instrument 830 employs a touch screen interface 832 by which the user interacts to provide input and receive visual output. The instrument 832 communicates with a vehicle 10 to receive vehicle and energy system status information and to provide diagnostic requests and control signals. The instrument 832 also includes a speaker 834 to provide audible output which can include an alarm type sound to alert the user of danger, such as for example a particular noise signature that is familiar to a person, such as something similar to a fire or police siren. The audible output can also include spoken text to audibly communicate the text provided on the screen in case smoke, rain or snow, impedes the visual area 832.

Figure 9:
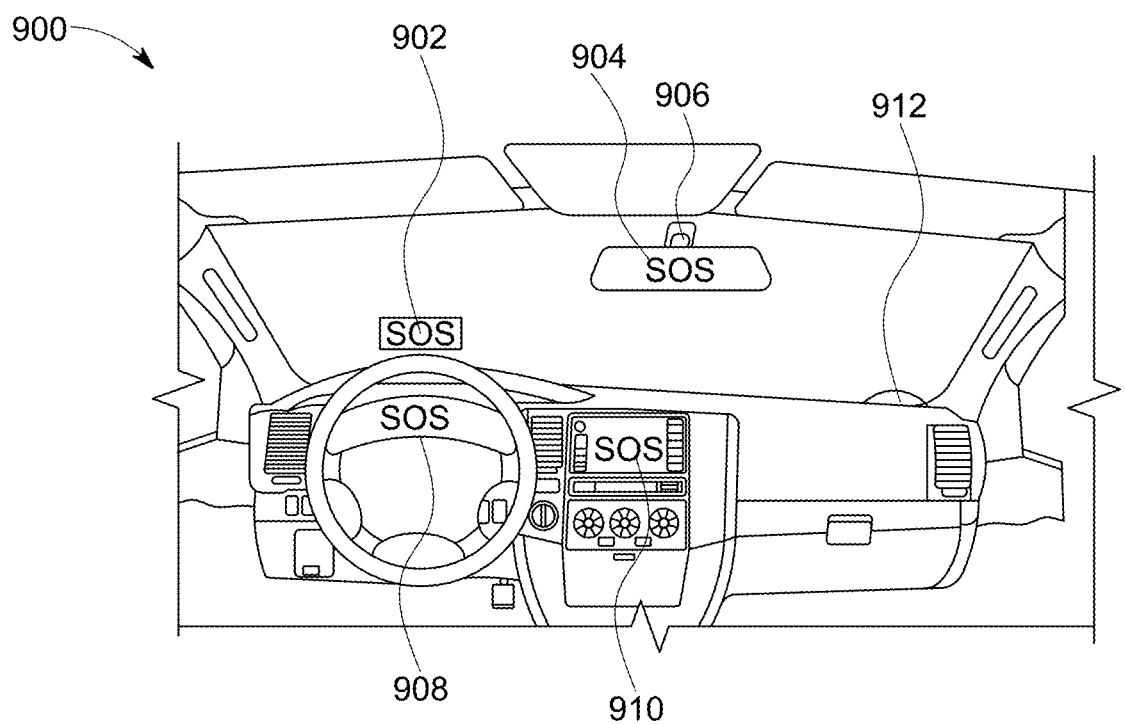
FIG. 9 is a view of an exemplary dashboard (instrument panel) that provides an energy supply status indication.

FIG. 9 is a view of an exemplary dashboard (instrument panel) 900 that provides an energy supply status indication in one or more manners to ensure that the driver and any passengers are alerted. A warning ("SOS") is provided by way of a "Head's Up" display 902 and/or by way of the rear-view mirror 904. This can be accomplished with a rear-view mirror that incorporates an LCD display to permit providing an image as an indication. Typically, such a display is used to provide an image generated by a backup camera but in an embodiment may be employed to provide a warning indication. A red LED 906 is positioned above the rear-view mirror 904 to flash a warning. This elevated position at the center of the windshield will be visible to most individuals in the vehicle. In another embodiment the LED 906 is positioned within the rear-view mirror 904. A warning 908 may also be provided in the driver's display that is positioned directly in front of the driver in the main dash area of the vehicle 10. Preferably the warning 908 as well as the other textual indications such as 902 and 904, is comprised of large text in a red or similar color that tends to attract the attention of individuals and inform them of a potentially dangerous situation. Having warnings that are highly visible also helps inform those outside of the vehicle of a potentially dangerous situation. Another warning 910 is shown in the navigation screen positioned in the center area of the dash which is typically also visible to passengers in the vehicle 10. The vehicle 10 also includes one or more speakers 912 that can provide an audible warning. In one embodiment, one or more additional camera(s) may be employed to generate a digital image of the area in the rear of the vehicle, which image is then displayed on a screen of the vehicle, which screen can include a display incorporated into the rear-view mirror of the vehicle.

Figure 10:
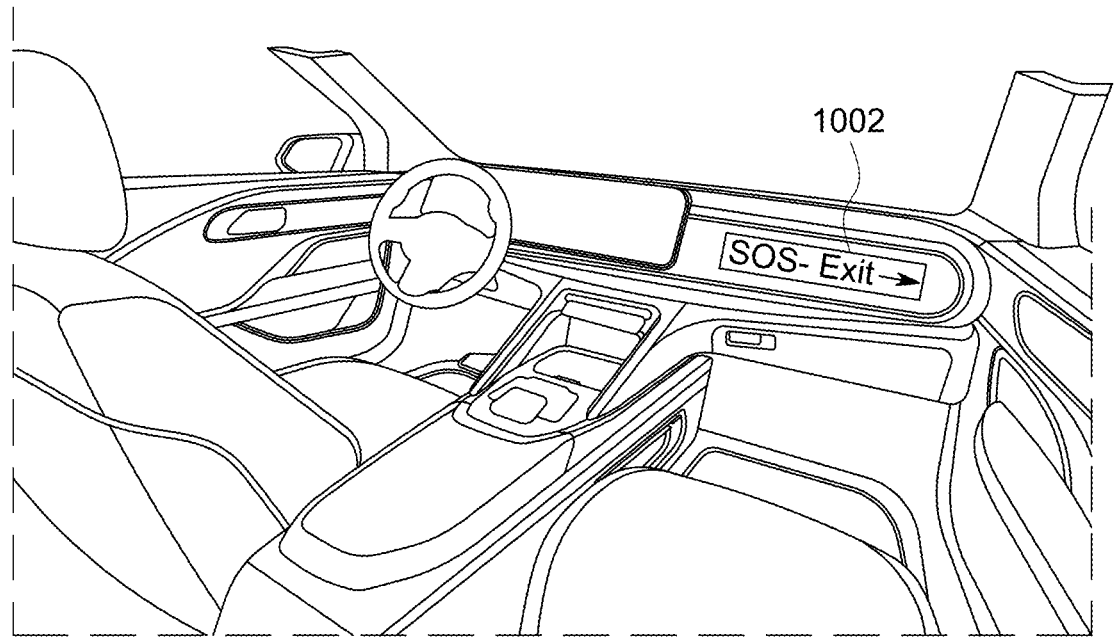
FIG. 10 is a view of an exemplary dashboard (instrument panel) that provides an energy supply status indication by way of a secondary interactive screen.

FIG. 10 is a view of an exemplary dashboard (instrument panel) that provides an energy supply status indication by way of an auxiliary display 1002 which is sometimes referred to as a secondary interactive screen. As seen, the warning provides a warning ("SOS") along with an instruction to exit the vehicle and the direction in which to exit the vehicle.

Figure 11:
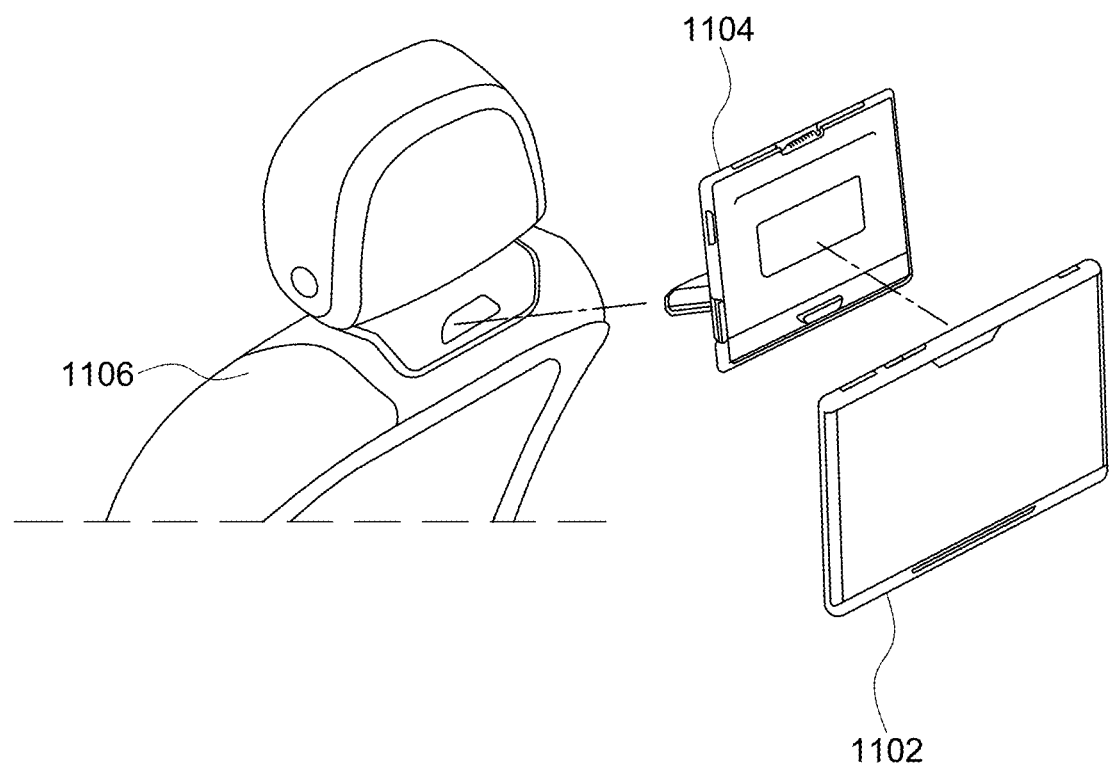
FIG. 11 is an exploded view of an embodiment of a rear-seat energy supply status indication.
Figure 12:
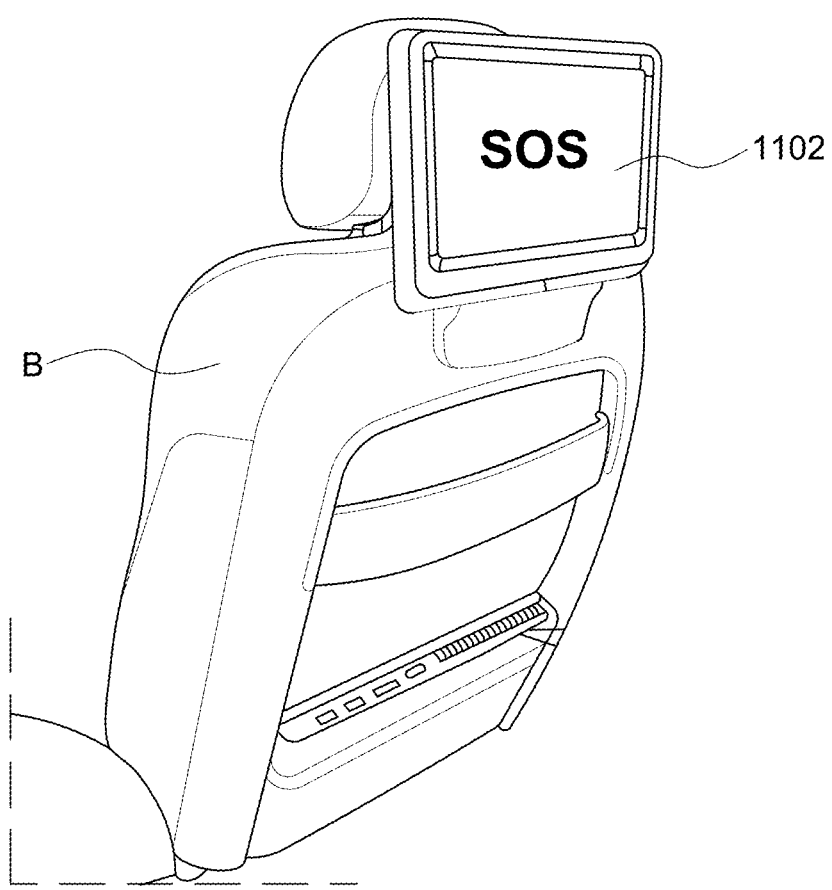
FIG. 12 is a view showing operation of an embodiment of a rear-seat energy supply status indication.

FIG. 11 is an exploded view of an embodiment of a rear-seat energy supply status indication. On vehicles that include a rear seat entertainment system a flat panel display 1102 is mounted by way of a mounting bracket 1104 to the back of the rear seat 1106. The mounting bracket 1104 also provides an electronic connection of the display 1102 to the vehicle's onboard systems to permit the information and warnings shown in FIG. 10 to be displayed on the screen 1102 as seen in FIG. 12. In one embodiment, the display 1102 is removable to permit it to be used to access vehicle diagnostics in a manner similar to the unit 830 shown in FIG. 8. In another embodiment the display 1102 is affixed or removably mounted in an armrest located in the side or center of the rear seat.

Figure 13:
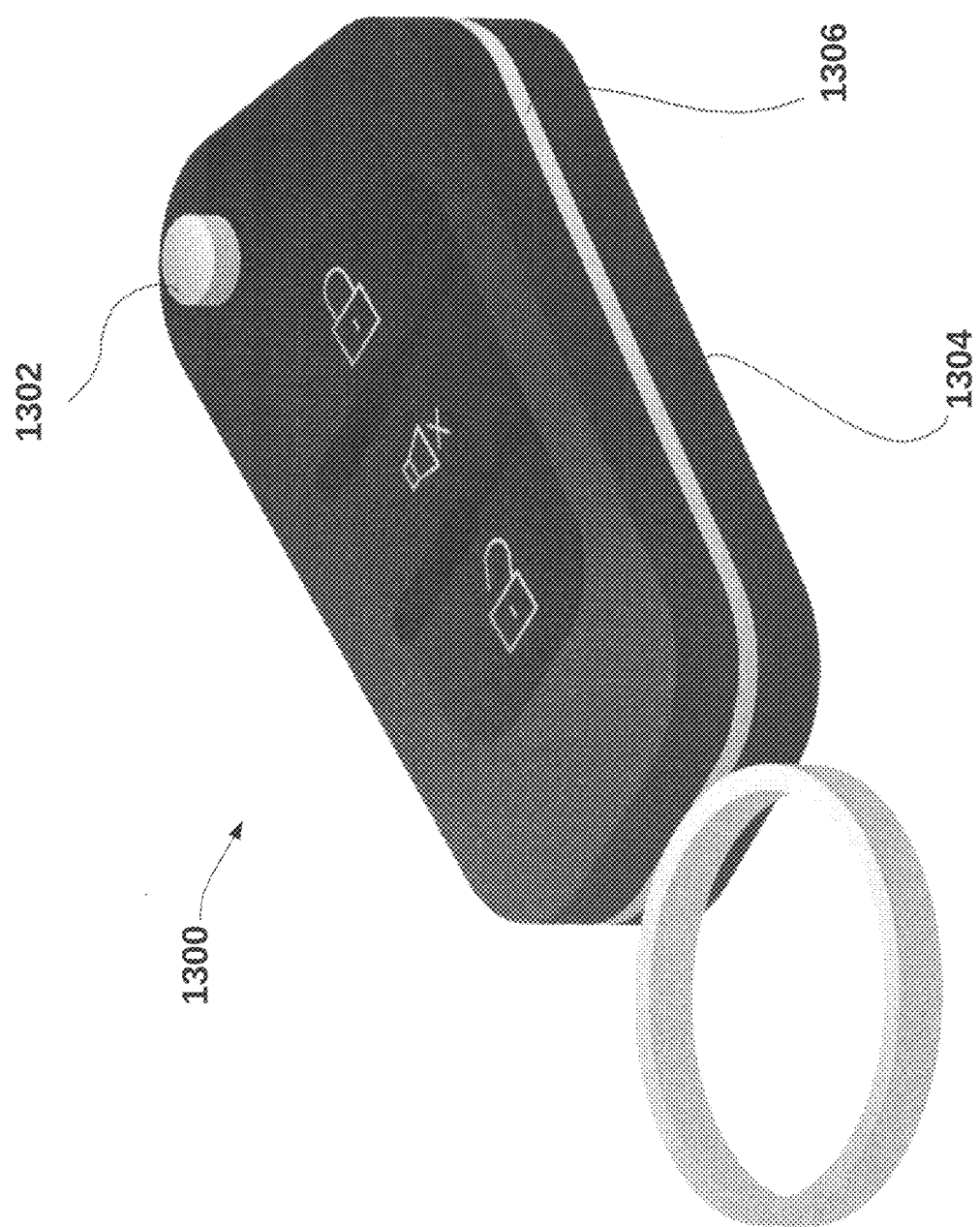
FIG. 13 shows an embodiment of a key fob that provides an energy supply status indication.

FIG. 13 shows an embodiment of a key fob 1300 that provides an energy supply status indication. Key fobs typically communicate with a vehicle to activate or control certain functions such as locking and unlocking doors, opening/closing a trunk or activating a vehicle alarm. The key fob 1300 includes a button 1302 that flips out the metal portion of a vehicle key, or alternatively if no such metal key is needed a red warning LED. The key fob 1300 also includes an area 1304 that vibrates violently when the vehicle is out of bounds and a red visual indicator 1306, that blinks or scrolls around like a tickertape warning of a vehicle failure as informed by the vehicle.

Figure 14:
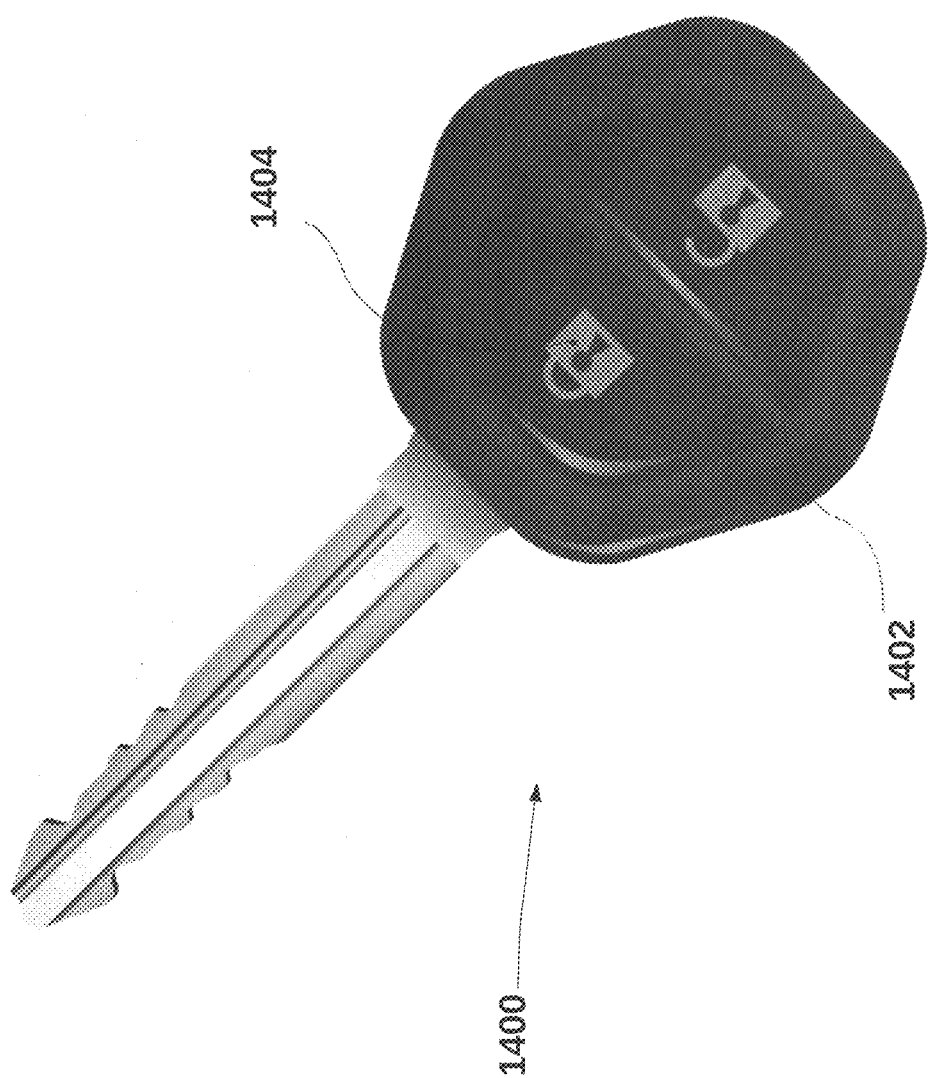
FIG. 14 shows an embodiment of a key that provides an energy supply status indication.

FIG. 14 shows an embodiment of a key 1400 that provides an energy supply status indication. The key 1400 is a less expensive alternative to the key fob 1400 and has an area 1402 that vibrates to provide a warning and an LED 1404 that provides a visual indication. The LED 1404 can be operated to blink rapidly using an existing lock function light for cost effective measures.

Figure 15:
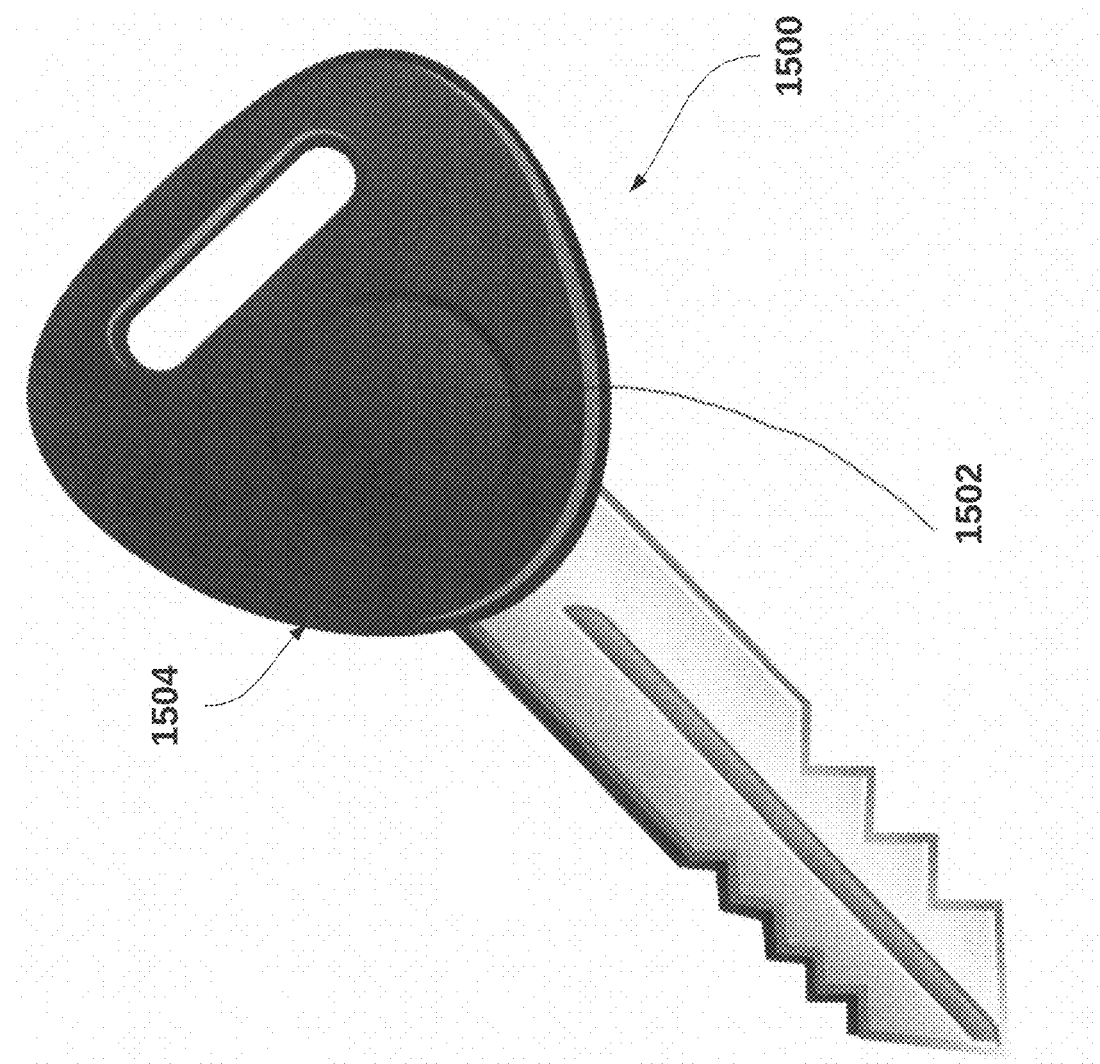
FIG. 15 shows another embodiment of a key that provides an energy supply status indication.

FIG. 15 shows another embodiment of a key 1500 that provides an energy supply status indication. The key 1500 is a less expensive alternative to the key 1400. The key 1500 includes an area 1502 that vibrates to provide an alert. As with the key 1400, the key 1500 communicates wirelessly with a vehicle in a limited manner to receive a signal from the associated vehicle, when the key is within proximity to the vehicle, where the signal causes the key 1500 to indicate a warning to the user by way of a vibration and/or a visual indication such as by way of an LED that may be positioned along the periphery 1504 of the key 1500. The outer portion 1504 may light up, to visually alert a parking garage or repair shop key area.

In the embodiments shown in FIGS. 13, 14, 15, the key or fob becomes part of the warning, in addition to any warnings on the user's computerized devices: mobile phone, smart glass, tablet, etc. The goal is to send out as many warnings to the user as possible. The warning on the key can alert the user not to approach the vehicle, which may send flames directly to them as they approach the vehicle or flames may shoot out from under the driver's door, making it impossible for the driver to exit. The key can also vibrate, in the user's pocket if it is not visible. The key communicates with the vehicle through the head unit of the vehicle, or other on-board information processing and sending systems. RFID (Radio Frequency IDentification) is one such example that is commonly used for key fobs that unlock and lock the car wirelessly. Near field communication, and smart phone recognition can also unlock the doors and be programmed to start the car or be used for other functions. As the owner approaches the vehicle, the RFID senses the key and allows the owner to unlock the vehicle.

At this point the vehicle and key communicate. If the vehicle's battery is out of bounds, the key can vibrate intensely. The key fob can be designed to only vibrate intensely during an event that poses great danger to the user, those in the vicinity and infrastructure. Vibrating mobiles commonly have a very small permanent magnet DC motor. The motor has an eccentric mass counterweight. When the out of bounds message is received by the key fob or phone, the motor gets an electric supply, which starts a rotation, and the result is a vibration. This is just one common example of how the key fob can vibrate.

Figure 16:
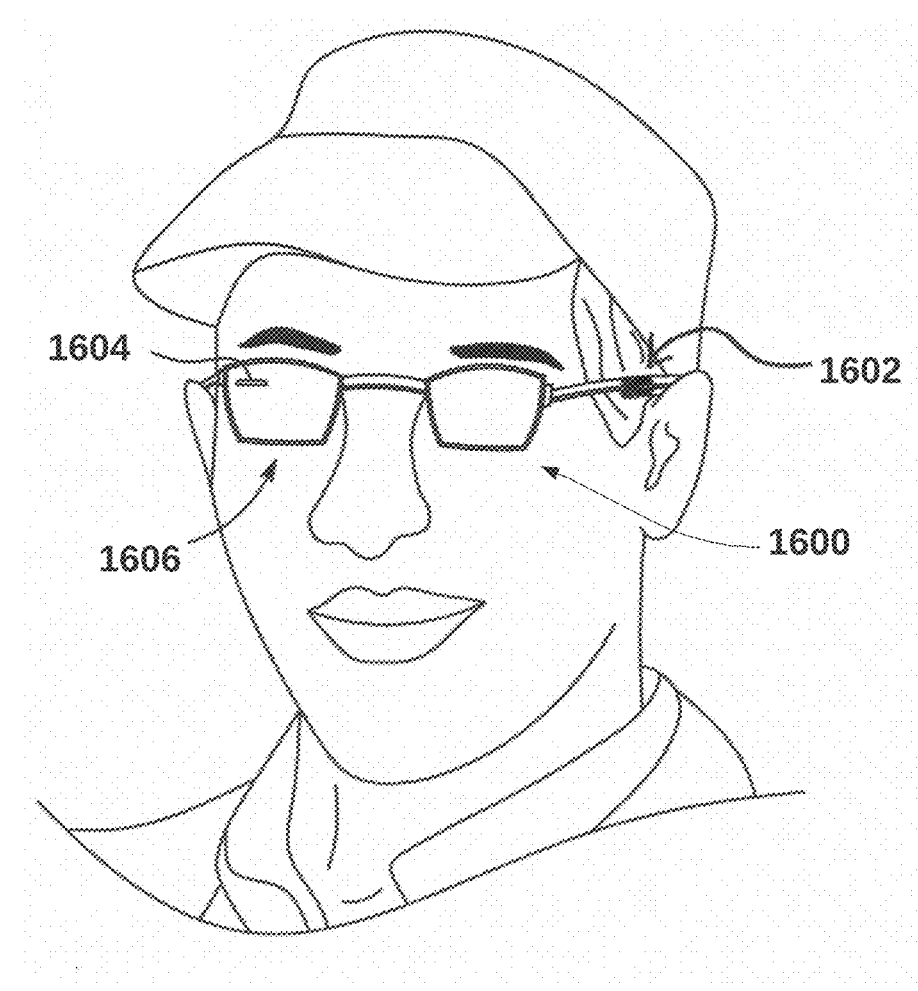
FIG. 16 is a view of a wearable computerized device in the form of eyeglasses that operates to provide an energy supply status indication.

FIG. 16 is a view of a wearable computerized device in the form of eyeglasses 1600 that operates to provide an energy supply status indication. A conventional eyeglass that incorporates computerized functions, such as "Google Glass" or the like may be modified to provide the functions described herein. Such eyeglasses include wireless communication functions which in the embodiment of FIG. 16 permit the eyeglasses 1600 to communicate with a mobile phone carried by the eyeglass wearer. In some embodiments the eyeglasses may communicate directly with a vehicle 10 to provide and receive information to/from the vehicle directly. The eyeglasses 1600 include a speaker 1602 positioned on the temple which provide spoken text as an alert, or beep in a predetermined pattern. An image 1604 may be projected onto the lens of the eyeglasses in a manner to be visible to the wearer to also provide an energy supply status indication. Such an indication may be of a variety of types but will at a minimum provide a warning to not approach the user's vehicle. The indication may also include further instructions such as to call for help, e.g., by dialing 911. A blinking red indicator 1606 is also provided in certain embodiments to provide an energy supply status indication. In the event that an emergency team is contacted via the eyeglasses 1600, such a team can send information directly to the user in the form of guidance, warnings, or directions such as commonly provided via a navigation system. The path to safety can also be directly sent to the vehicle, in a navigation style message, or to the user's smartphone. It can open up a map application, and seamlessly give the user clear directions. The emergency guidance can also be programmed to turn the flashlight feature of the user's phone on, lighting the path below, while having the path on the screen of the phone. This can be done automatically, since during emergencies it may not be easy for those seeking safety to spend time opening the alert and turning on the flashlight feature. The goal is to clear the area as soon as possible, and in the easiest way possible. In one embodiment, the eyeglasses 1600 include a camera that can capture an image of an incident and wirelessly transmit the image to a remotely located computerized device such as to a nearby responder to a vehicle service center. The eyeglasses 1600 are one example of a wearable device. Another example is a bodycam which is a computerized device that includes a camera and microphone to record video and sound and is worn on the body, such as on the torso or an arm or leg. Such a device can also incorporate LEDs and a speaker to provide an audible and/or visual indication to alert the user and those in the user's vicinity of a danger condition.

Figure 17:
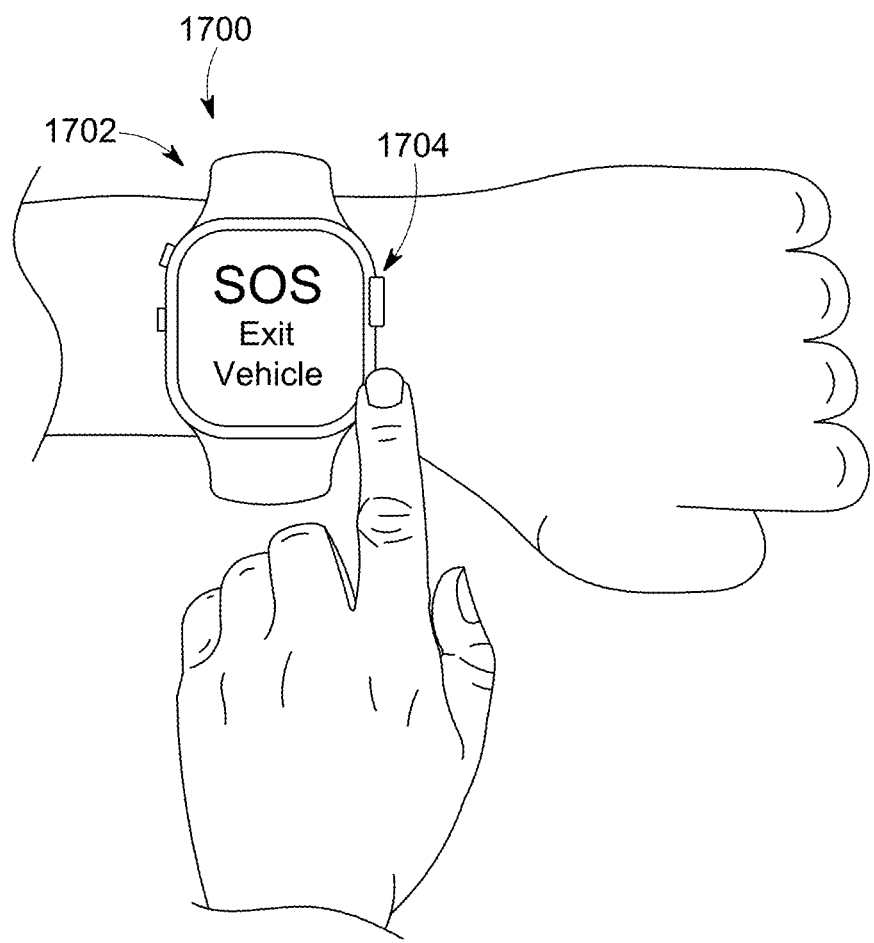
FIG. 17 is a view of a wearable computerized device in the form of a wristwatch that operates to provide an energy supply status indication.

FIG. 17 is a view of a wearable computerized device in the form of a smart watch 1700 that operates to provide an energy supply status indication. The smart watch 1700 includes a display 1702 by which user can be provided with an indication. The user can scroll through an indication (e.g., a message) by way of a dial 1704 to view further details, such as the type of malfunction (e.g., "Battery Malfunction") and directions ("Call for assistance"). As with the smart glasses, the smart watch may send/receive information via the user's smart phone or directly via its own communication capability.

Figure 18:
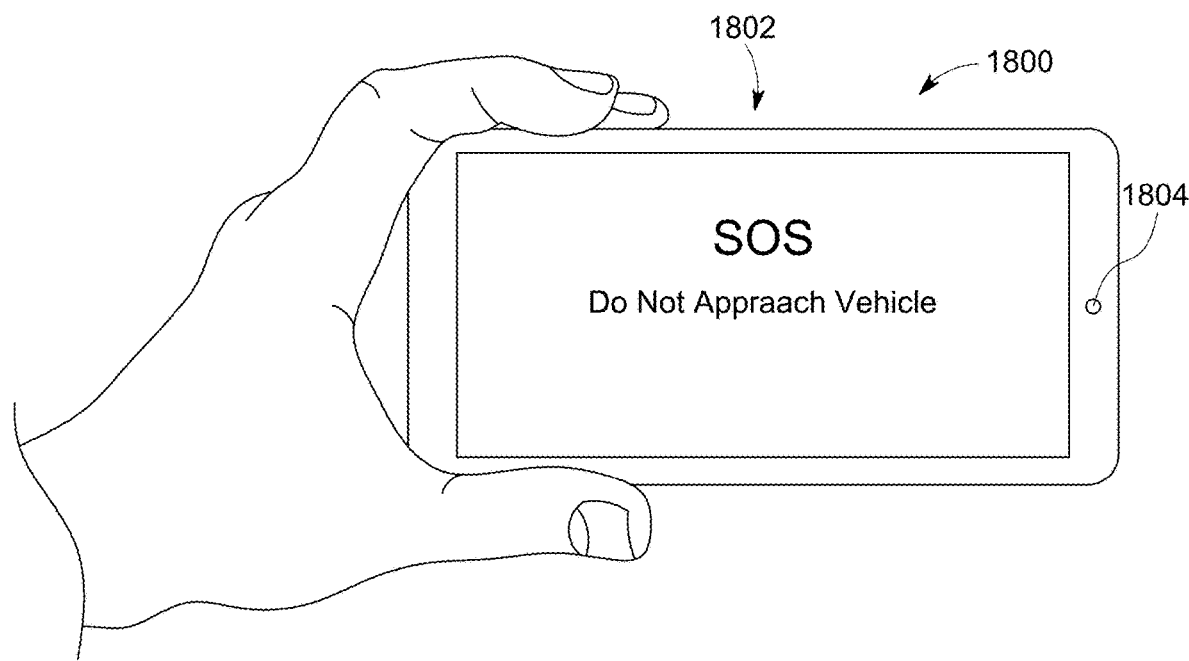
FIG. 18 is a view of a handheld computerized device in the form of a smartphone that operates to provide an energy supply status indication.

FIG. 18 is a view of a handheld computerized device in the form of a smartphone 1800 that operates to provide an energy supply status indication. The smartphone 1800 provides energy supply status indications in a manner similar to that described above for the smart watch 1700. The phone screen 1802 is used to provide a visual alert along with further information, as described above. A speaker 1804 may be used to provide various audible alerts and spoken instructions.

Figure 19:
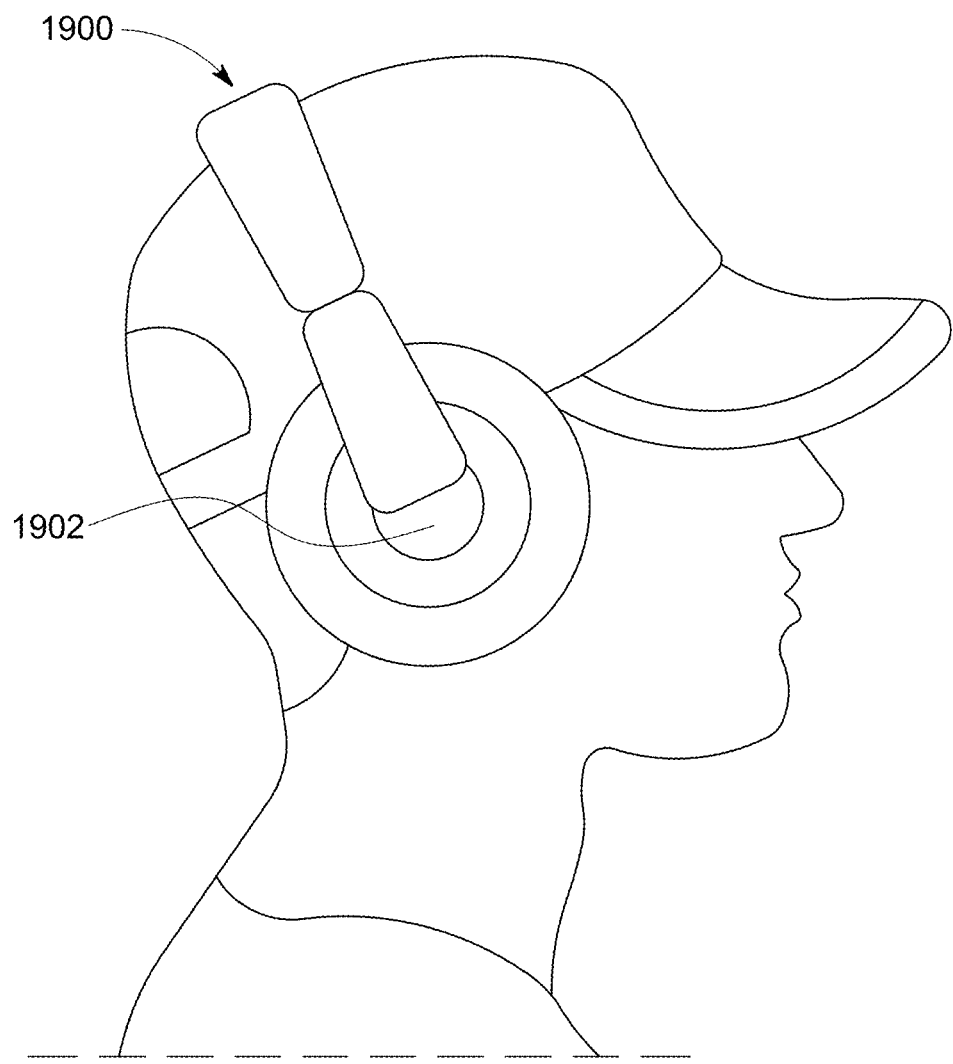
FIG. 19 is a view of a wearable computerized device in the form of headphones that operates to provide an energy supply status indication.

FIG. 19 is a view of a wearable computerized device in the form of headphones 1900 that operates to provide an energy supply status indication. The headphones 1900 will typically be connected wirelessly to a smartphone accompanying the user. An energy supply status indication can be provided audibly via the smartphone to the headphones. An LED 1902 on the headphones 1900 blinks to also provide an energy supply status indication.

Figure 20:
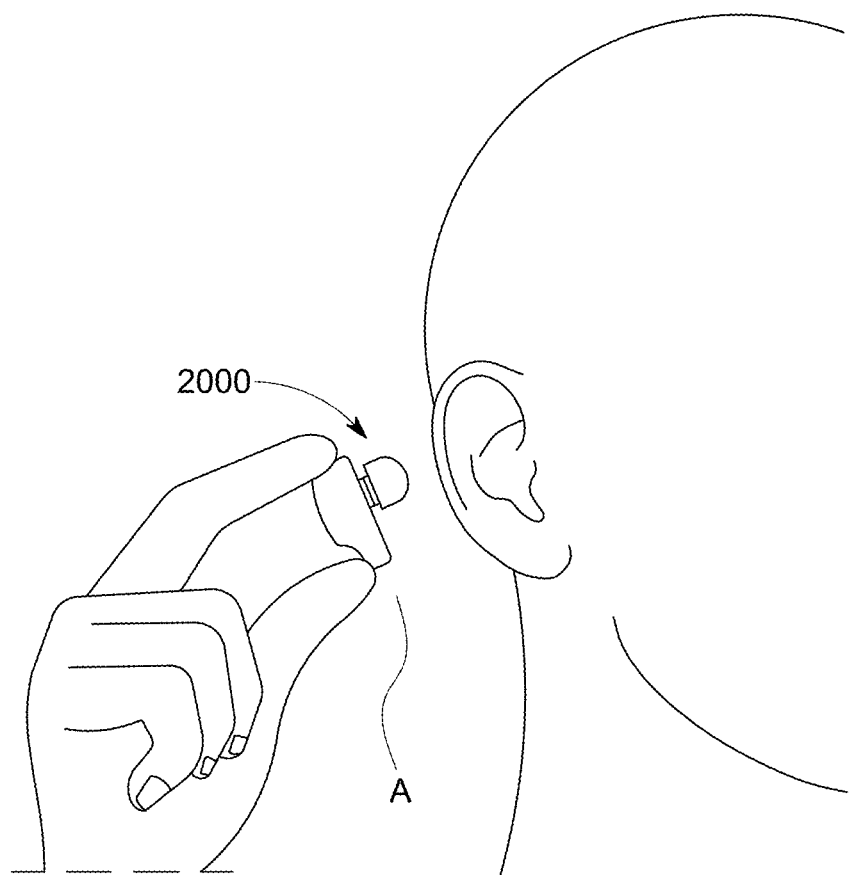
FIG. 20 is a view of a wearable computerized device in the form of earphones that operates to provide an energy supply status indication.

FIG. 20 is a view of a wearable computerized device in the form of earphones 2000 that operates in a manner similar to that described above in connection with FIG. 19 to provide an energy supply status indication. The devices 1900 and 2000 can be operated to briefly interrupt the audio being consumed by the user with the energy supply status indication.

Figure 21:
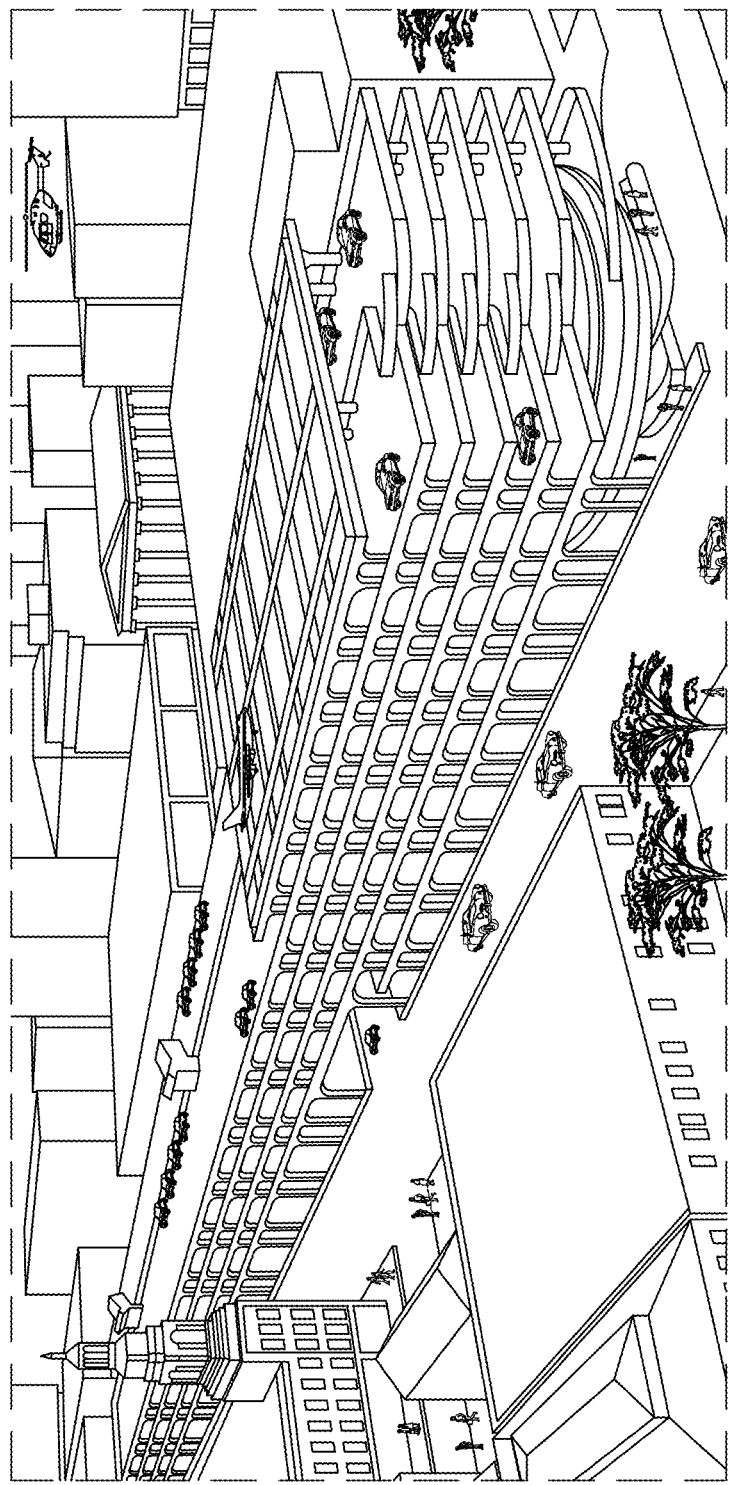
FIG. 21 is a view of a mixed-use building including an above-ground parking structure.

FIG. 21 is a view of a mixed-use building including an above-ground parking structure. The parking structure has open air parking (open on the sides with a roof), a pedestrian walkway which may have stores or other features that attract pedestrians, causing them to gather or stop to view the surroundings. Additionally, on one portion of the roof of the garage, there may be a helicopter landing area. As disclosed herein, airborne vehicles may also be powered by fuel sources other than conventional petroleum fuels and may also benefit from the devices, systems and methods disclosed herein.

In 1960 passenger vehicles were sedans, not SUV's with 1800 pound batteries that weighing up to 7,150 pounds as the Ford F150 Lightening electric pick up truck does. These wires and supports may not prevent the vehicle from falling off the floor during an event, nor will the open plan with wires contain the individual battery cells rolling out of the battery pack. The Tesla Model S Plaid has 7,920 individual battery cells which can roll out of the structure or shoot out like "bottle rockets" which has been documented in accidents. Additionally the typical sedan of the 1960's like a Chevrolet Impala weighed 3,600 pounds, while electric vehicles weight is often much greater than a gasoline vehicle, so much so, they require special reinforced tires. The F-150 Lightening's weight is almost double that of the typical 1960's sedan, causing the parking structure to potentially hold 60-75% more weight, based on the modern and future vehicles in the garage, which puts an unforeseen strain on the building, garage levels and foundation. The Marina Towers garage may have dedicated floors with electric vehicle chargers on some or all of the floors. This adds to the potential battery/structural/and electrical events. Now the structure has the unforeseen factors of increased vehicle weight, different vehicle architecture and electrical lines and charging equipment. Hydrogen vehicles vent rearwards and are designed to vent their entire contents. The hydrogen vehicle may vent into a fire situation creating a fireball. Mixing vehicle propulsion types exacerbates vehicle events. Meaning a battery vehicle fire, can ignite the hydrogen vehicle parked next to it, and then ignite a gasoline vehicle. This compounds the dangers and may cause greater loss of life and property.

Aspects of certain of the embodiments herein can be implemented employing computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The program modules may be obtained from another computer system, such as via the Internet, by downloading the program modules from the other computer system for execution on one or more different computer systems. The functionality of the program modules may be combined or split between program modules as desired in various embodiments. Computer-executable instructions for program modules may be executed within a local or distributed computing system. The computer-executable instructions, which may include data, instructions, and configuration parameters, may be provided via an article of manufacture including a computer readable medium, which provides content that represents instructions that can be executed. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

The terms "computer system" and "computing device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

Figure 22:
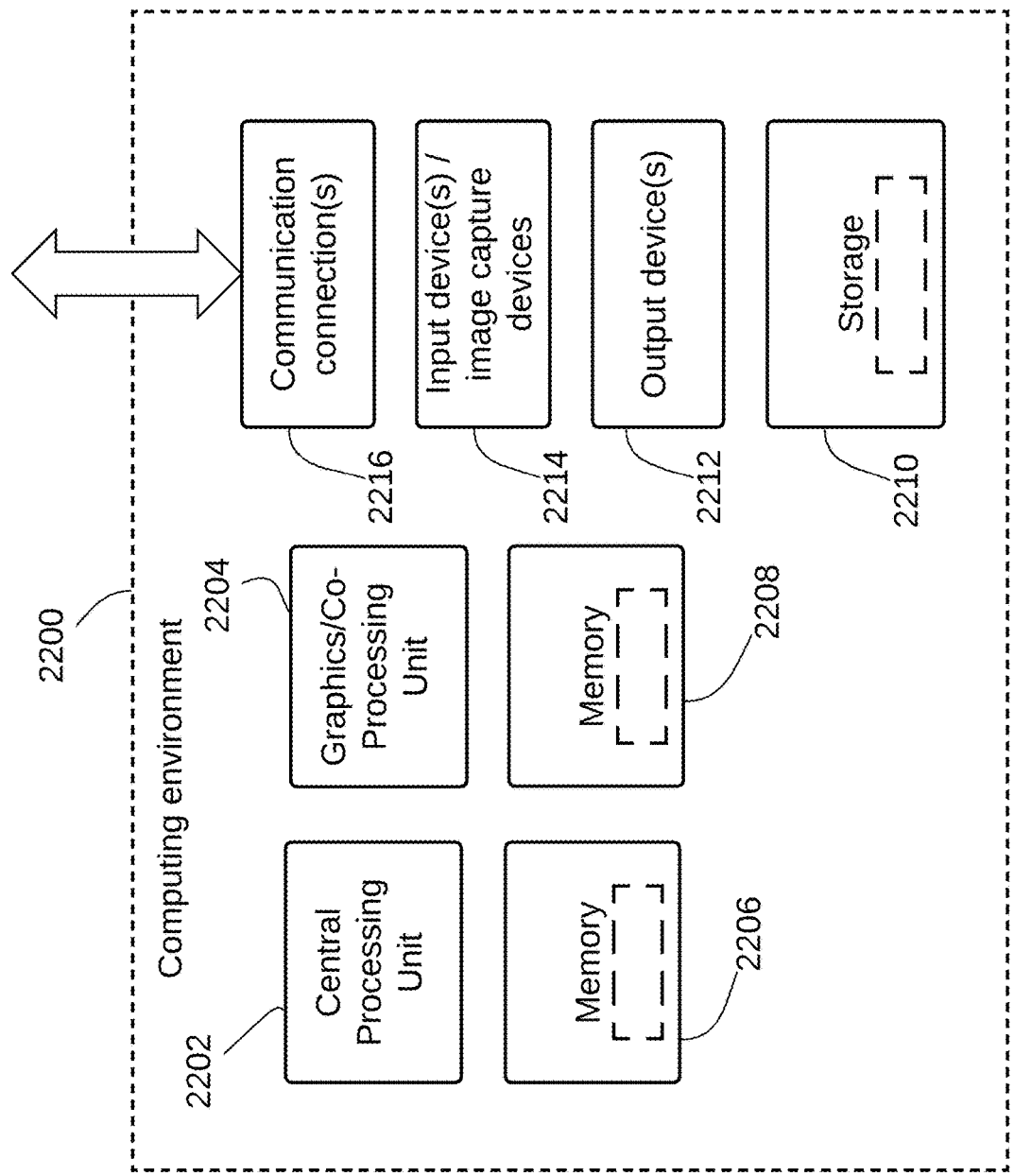
FIG. 22 is a block diagram of an exemplary computing environment that may be employed in implementing computerized aspects of the systems, methods and stored program modules described herein.

FIG. 22 is a block diagram of an exemplary computing environment that may be employed in implementing computerized aspects of the systems, methods and stored program modules described herein. FIG. 22 illustrates a block diagram of hardware that may be employed in an implementation of the embodiments disclosed herein employing computer-executable instructions. FIG. 22 depicts a generalized example of a suitable general-purpose computing system 2200 in which the described innovations may be implemented in order to improve the processing speed and efficiency with which the computing system 2200 operates to perform the functions disclosed herein. With reference to FIG. 22 the computing system 2200 includes one or more processing units 2202, 2204 and memory 2206, 2208. The processing units 2202, 2206 execute computer-executable instructions. A processing unit can be a general-purpose central processing unit (CPU), processor in an application-specific integrated circuit (ASIC) or any other type of processor. The tangible memory 2206, 2208 may be volatile memory (e.g., registers, cache, RAM), non-volatile memory (e.g., ROM, EEPROM, flash memory, etc.), or some combination of the two, accessible by the processing unit(s). The hardware components in FIG. 22 may be standard hardware components, or alternatively, some embodiments may employ specialized hardware components to further increase the operating efficiency and speed with which the system 10 operates. The various components of computing system 2200 may be rearranged in various embodiments, and some embodiments may not require nor include all of the above components, while other embodiments may include additional components, such as specialized processors and additional memory.

Computing system 2200 may have additional features such as for example, storage 2210, one or more input devices 2214, one or more output devices 2212, and one or more communication connections 2216. An interconnection mechanism (not shown) such as a bus, controller, or network interconnects the components of the computing system 2200. Typically, operating system software (not shown) provides an operating system for other software executing in the computing system 2200, and coordinates activities of the components of the computing system 2200.

The tangible storage 2210 may be removable or non-removable, and includes magnetic disks, magnetic tapes or cassettes, CD-ROMs, DVDs, or any other medium which can be used to store information in a non-transitory way, and which can be accessed within the computing system 2200. The storage 2210 stores instructions for the software implementing one or more innovations described herein.

The input device(s) 2214 may be a touch input device such as a keyboard, mouse, pen, or trackball, a voice input device, a scanning device, or another device that provides input to the computing system 2200. For video encoding, the input device(s) 2214 may be a camera, video card, TV tuner card, or similar device that accepts video input in analog or digital form, or a CD-ROM or CD-RW that reads video samples into the computing system 2200. The output device(s) 2212 may be a display, printer, speaker, CD-writer, or another device that provides output from the computing system 2200.

The communication connection(s) 2216 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The terms "system" and "computing device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

Figure 23:
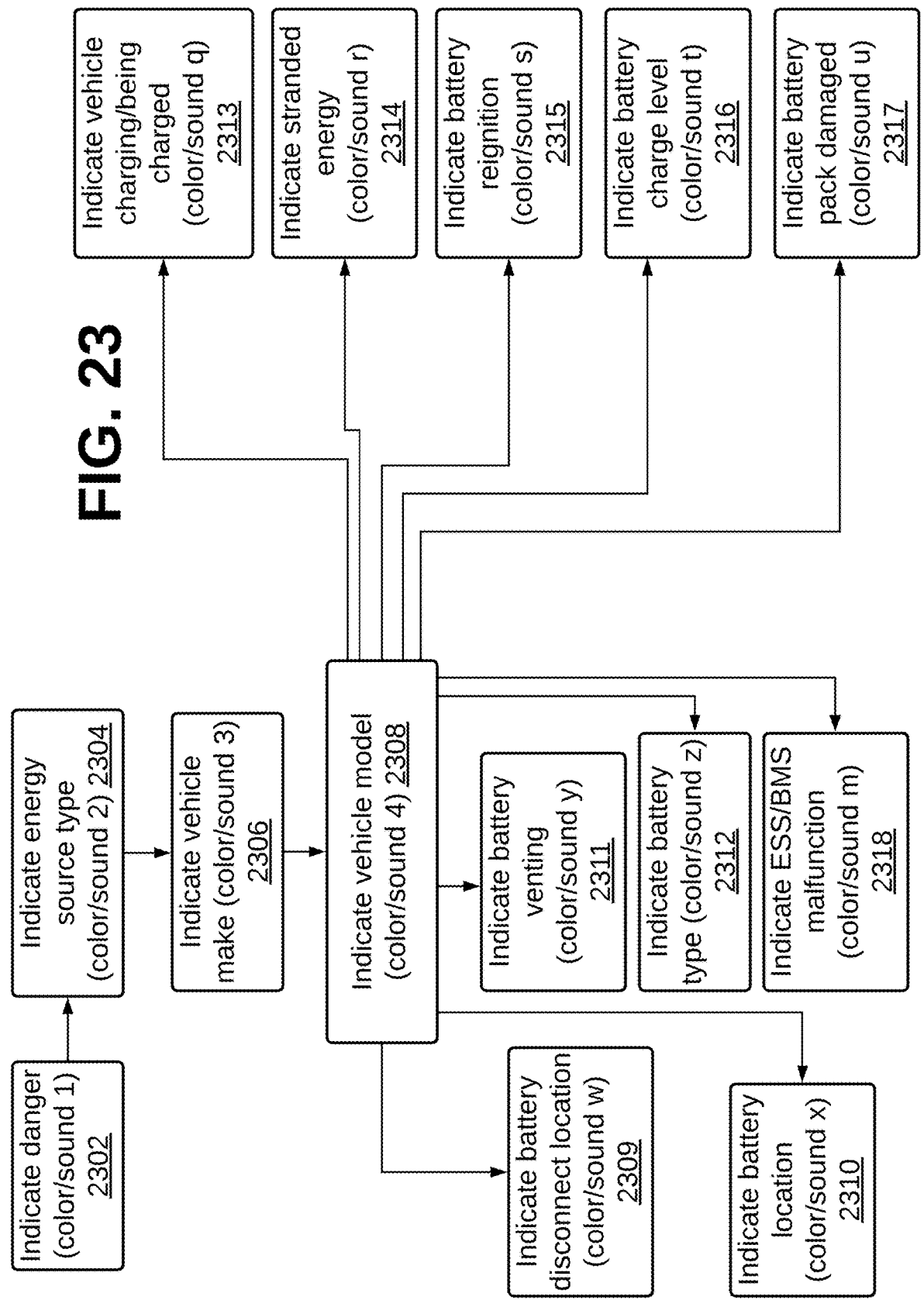
FIG. 23 is a flow diagram illustrating an embodiment of indications that may be provided.
Figure 24B:
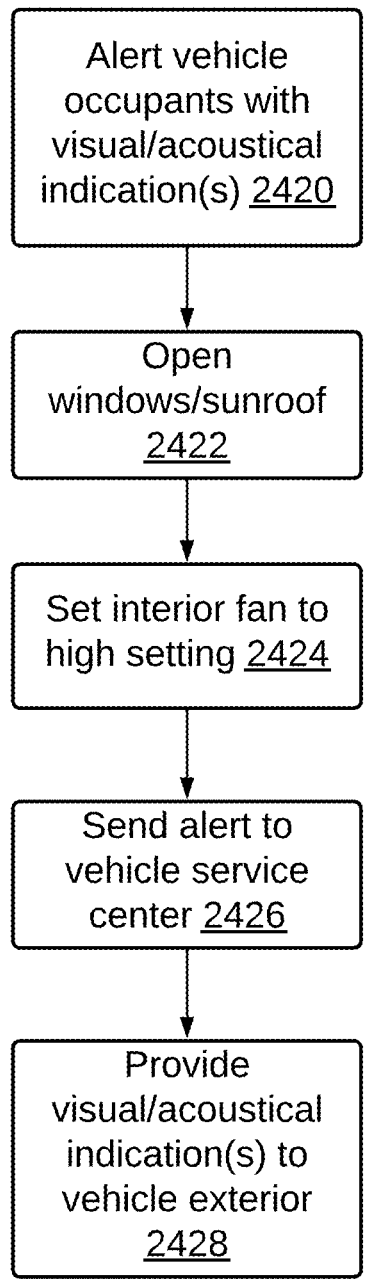
FIG. 24B is a flow diagram illustrating another embodiment of indications and other actions that may be provided.

In the indications described above, to be effective the information provided needs to be clear and unambiguous. For text-based indications the text as provided, either visually or audibly should be clear and unambiguous with priority actions being provided first, and then followed as necessary with details. The various visual, audible indications and vibrations disclosed herein in one embodiment may be combined to form a comprehensive system to alert those with visual, acoustical cognitive or other varying abilities. For indications that do not use spoken or written words, such as lights flashing, alarms, a variety of encodings may be employed. FIG. 23 is a flow diagram illustrating an embodiment of indications that may be provided. In the embodiments of FIG. 23, FIG. 24A and variants, indications are generated by programming of a controller in the vehicle and are provided by way of encoded visual and/or audible indications. The visual indication may be provided by way of a light that is capable of being illuminated as a solid light, flashing light and in different colors. The audible indication may be provided by way of one or more speakers that provide different sounds in different frequencies as a continuous sound, intermittent sound (chirps), that may increase in volume and/or frequency. In one embodiment, the indication includes the interior lights blinking or changing color, rear-view mirror displaying a message, the steering wheel and/or the front seat vibrating, and speakers providing an audible warning. The vehicle may also provide a burst of hot or cold air via the vehicles ventilation system or seats to provide an additional indication. Additionally, if toxic gas (such as HF) is detected, the vehicle's windows and/or sunroof may be opened with the vehicle's ventilation system fan being turned to maximum to clear the vehicle of toxic gases. The steering wheel, armrests and/or center console may also be vibrated. The various indications may be combined. For example, the steering wheel may be vibrated, and when the external ambient temperature is cool then it can be heated (or cooled when the external ambient temperature is warm) to alert the driver. This can cause the driver to more quickly see an indication displayed on the dash or elsewhere in the vehicle. The seats and/or the various armrests (center, left side, right side) may in some vehicles be vibrated and/or heated/cooled in contrast to the external ambient temperature to alert the driver and/or passenger(s) and cause them to notice a more detailed indication being provided on a vehicle display screen.

More specifically, many vehicles are equipped with heated steering wheels. If a dangerous situation is occurring, the addition of the steering wheel heating up would indicate to the driver there may be an issue, and they would certainly notice a wheel becoming hot, on a cold day, or their hands becoming hotter on a warm day. These steering wheel heaters are not automatically controlled, so it would be an atypical occurrence. Some vehicles are equipped with center armrests and door arm rests that heat up. The idea is that anything you can change in the cabin to get the driver's attention is the goal. Some vehicles also have heated and cooled seats. These are also manually chosen to operate, and will draw attention to the driver and passenger if the seat starts to heat or cool down, without user input. In another embodiment, the seat could heat up for 30 seconds, and then cool down for 30 seconds. It is confusing to the driver and would get their attention. Cooled seats use a fan or fans located in the bottom and rear of the seat cushions. They tend to be loud or audible, adding another layer of change. In vehicles equipped with moonroofs, the fabric that prevents sunlight from entering the cabin on warm or very sunny days, can retract, adding light to the interior. These shades are manually operated, so it will present the driver with another notification that there may be an issue. Some cars have dual sunroofs and blinds for the rear side windows and rear window. All of these blinds could open during a distress situation. An added benefit is that first responders or other parties assisting in the rescue will not have their view into the cabin restricted. Also, the ventilation system, may blast air, hot or cold in the defroster setting which would blow air on to the face of the driver or occupant, or to the foot well, or the mid-section of the driver. The blowing air can be programmed in any pattern as long as it is a deviant pattern that the driver does not recognize or would not choose manually. The stereo may pause the radio, music, etc., and any predetermined audio message may play. The side mirrors with safety options generally have an illuminated triangle in the rear facing mirror to warn that vehicles may be in their blind spot. These illuminated triangles or areas can flash, in any pattern and may be a distinct color. Some 2022 and newer vehicles have illuminated light strips (light guides, fiber optics, etc.) that produce a pleasing light at night. They look like a rope of light that goes from the instrument panel, then goes to the front and rear doors (and sometimes wrap around the rear seats) Some makers have them flash red, if the driver is about to open the door, and the safety system detects a bicyclist or another car coming. This tells the driver, there is a danger. The overhead map or reading lights may flash, illuminate, or illuminate in a different color or colors. Meaning they are usually white, so if there is a danger the interior lighting can flash with different colors, e.g., white, red, white, to cause individuals in the car to notice.

In the embodiment shown in FIG. 23, the indications are organized to provide an initial indication of danger 2302, by way of one or more visual/audible indications, followed by increasing level of detail, by way of other one or more visual audible indications, regarding the involved vehicle. This permits an initial warning of danger to a first responder to cause them to initiate whatever procedures required for a danger situation that may involve a vehicle fire. The indication 2302, which in one embodiment is determined in accordance with the operations shown in FIG. 3, may provide an indication, understood by first responders that a dangerous thermal runaway event is about to occur.

After the initial indication 2302 an energy source type indication 2304 is provided to identify the type(s) of energy source(s) of the involved vehicle. A vehicle energy type may change over time but at any given time will be fixed and the energy source type indication 2304 will typically be generated by retrieving a stored value that identifies the vehicle energy source type. This indication 2304 can cause any first responder to initiate a specific rescue/safety procedure tailored to the particular energy source. For example, a vehicle with only batteries will require a different response than an gasoline powered vehicle, a hydrogen fuel-cell vehicle, a hybrid vehicle or a diesel vehicle. Next, a more specific indication to identify the vehicle make is provided at 2306. This indication 2306 will identify the vehicle manufacturer (e.g., Ford, Chevrolet, Honda, Tesla, Porsche, Hyundai, Ferrari, etc.) and will typically be generated from a stored value that is retrieved. The next more specific indication is the vehicle model indication 2308, retrieved from a stored value, which will indicate the specific model (2018 Model S, 2022 F150 Lightning, 2019 Prius, etc.). The indications 2302, 2304, 2306 and 2308 will generally be required to be in sequence to provide an ordered and progressively more specific set of indications regarding existence of a danger condition requiring evacuation of any passengers in a particular vehicle, restriction of any other individuals from approaching the particular vehicle, and/or particular procedures to be followed with regard to the danger condition of the particular vehicle.

Vehicle propulsion types may also change. Some 2023 vehicles are dedicated EVs and some use the same platform for EV, hydrogen, gasoline and diesel. This ultimately allows a modification of the vehicle's propulsion or conversion. Meaning, the owner may replace a Lithium-Ion battery with a solid-state battery, or any other type. If the vehicle's battery needs replacing and the cost is $12,000, and the owner is not happy with "range anxiety" or having to spend time at public chargers, a viable option for these vehicles may be to replace the battery with a gasoline or diesel engine. The converse is also true. The owner may no longer wish to own a combustion engine vehicle, due to emissions or tax credits granted to zero emission vehicles and may convert the vehicle to a battery vehicle.

In the embodiment of FIG. 23, the indications beyond the initial four indications (2302, 2304, 2306, 2308) may be performed in any order, either in their entirety, some subset, or not at all. Usage of the additional indications 2309, 2310, 2311, 2312, 2313, 2314 will depend on the vehicle involved. Some vehicle manufacturers may choose to implement only some of the additional indications, and some may choose to implement none or all. The additional indications are specific to electric batteries as these are increasingly commonly deployed in various configurations. It can be important in an emergency situation, such as a crash, for an electric vehicle to disconnect and therefor isolate the vehicle battery system. Such vehicles are typically designed with a battery disconnect location where wires connecting the battery system from the rest of the vehicle can be physically disconnected and therefore isolated. The battery disconnect location indication 2309 is retrieved from a stored value and provides an indication of the location of the battery disconnect to permit easy identification of the designed battery disconnect location. It can also be important for a first responder to know where on a vehicle the batteries are located. The battery location indication 2310 is retrieved from a stored value and provides an indication of the physical location of the vehicle batteries. The indication may be by way of an encoded indication of the physical location or may be by way of visual indicators positioned proximal to the vehicle batteries to specifically identify the location of the vehicle batteries, such as shown at 106, 107, 108 in FIG. 1. For example, a vehicle may have batteries in the in the passenger compartment or located outside of it, meaning in the trunk, hood or underneath the vehicle. The first responder must clearly know where the on-board batteries are located, in order to suppress a battery event. If a battery is in the confined airless space of the cabin after an accident, the occupants must be removed immediately and ventilation to the cabin must be initiated.

Battery venting indication 2311 indicates a physical location and direction of venting of vehicle batteries. In one embodiment, this indication is generated by receiving such information from the vehicle battery management or control system (not shown) which monitors the battery system and provides information on when battery venting is imminent and the location. The battery venting location is will typically be fixed but in certain situations a battery may vent from only some of the possible venting locations. Battery type indication 2312 provides an indication of the type of batteries on the vehicle. This will be retrieved from a stored value and may be very basic or highly encoded to provide specific information about the vehicle's battery system. In some instances, the vehicle in question may be plugged into a separate electrical system in order to have its own batteries charged or to provide electrical energy to the separate electrical system, such as for example, any other electrically powered system. This can include a local power grid, a utility power grid, an external battery system that provides backup power, or any other battery powered device. The vehicle charging/being charged indication 2313 provides such an indication to permit a first responder to disconnect such other systems and/or to identify potential additional dangerous situations. The indication 2313 will typically be generated in response to a signal received from the vehicle battery management or control system.

Stranded energy indication 2314 indicates the existence of stranded energy, which is electrical energy stored by various electrical devices that are connected to one or more vehicle batteries. Typically, such electrical devices will receive or provide power from/to the vehicle batteries and can store electrical energy for certain periods of time and the indication 2314 may be generated in response to charge sensors positioned to detect electrical charge at certain of the various electrical devices connected to one or more of the vehicle batteries. Vehicle battery systems, such as lithium-ion battery systems commonly used on current electrically powered vehicles can, after an initial ignition has been put out, reignite. Such a reignition is indicated by indicator 2315 in response to periodically repeated diagnostics performed by the battery management/monitoring system. The above noted indications can be repeated, because others may arrive later at the scene or a vehicle may not be immediately visible, meaning it may be around a corner. In one embodiment, the diagnostics and associated indications are periodically repeated until the system is disabled or out of bounds conditions are no longer detected for some period of time.

In another embodiment, the audible indications may be provided by way of spoken instructions conveyed by way of one or more speakers, and such spoken instructions may be supplemented by way of the audible/visual indications described in connection with FIG. 23. In one embodiment, the visual indications may be provided in text, which eliminates the need for an encoding. In some implementations, it may be beneficial to provide redundancy by a combination of encoded indications and visual and spoken text.

By way of example, the danger indication may take the form of a solid red light for ten seconds, where the red light may be positioned in the shark's fin and/or other locations on the vehicle. In the event that a fire has been detected but the battery is not involved the indication may be different, such as a solid green light for ten seconds. This indication 2302 is then followed by the energy source type indication 2304 which may be three red blinks to indicate a purely electrically powered vehicle. This would be followed by a spacer indication to indicate the next in a series of indications regarding different aspects of the vehicle and the danger situation. The spacer indication may take the form of a solid white light for three seconds and then followed by the vehicle make indication 2306 which could be two blue blinks to indicate that the vehicle's make is Tesla. This would be followed by another spacer indication, such as a solid white light for three seconds, followed by the vehicle model indication 2308, which could be a single green flash to indicate that the Tesla vehicle is a 2016, Model S. This could then be followed by another spacer indication, solid white light for three seconds, followed by a battery type indication 2312, two orange blinks to indicate a 90 kW battery. To continue the example, the battery type indication 2312 may include more specific structural information where the 90 kW battery type is followed, with a spacer indication, by a solid blue light to indicate that the battery is composed of individual cells. Continuing further, the next indication may be a battery charge level indication 2316, two fast yellow blinks to indicate that the battery is at a 50% charge. Next, there may be an indication 2317 to indicate whether the battery pack is damaged, which indication may be in the form of two pink flashes to indicate that the battery pack is damage. Finally, there may be an indication 2318 to indicate a malfunction in the vehicle Energy Storage System (ESS) or Battery Management System (BMS), which may take a form of one long bright rapid red flash for five seconds. In one embodiment, the foregoing sequence also includes information as to whether the vehicle battery contains individual cells or not, or is a replacement battery (which may differ from the vehicle's original battery).

The sequence and selection of indications shown in FIG. 23 and explained above may be altered to provide information in various manners. In another embodiment, the visual or other indication provides an indication of the manner in which to suppress a fire, or more generally of how to address an emergency for that particular vehicle instead of the encoded identification of the vehicle. This is illustrated in the flow diagram of FIG. 24A in which the danger indication 2302 is first provided followed by a suppression indication 2402, 2403, 2404. For example, suppression indication 2402 may indicate, by way of a rapidly flashing blue light for 10 seconds to use water to suppress a fire, or suppression indication 2403 may indicate, by way of a rapidly flashing green light for ten seconds to not use water or by a rapidly flashing orange light for ten seconds to let the fire burn out. In one embodiment, the same message can be heard outside of the vehicle from the small speaker in the "shark's fin" or behind the grille or located anywhere on the vehicle, where it is deemed to be most effective, with a long range. In one embodiment, the above-described functions associated with FIGS. 23 and 24A will operate by way of backup power even if the vehicle 12 Volt system is powered down, by cut loops or any other way to disconnect the high or low voltage system.

The above-described efficient, and linear burst of information is clear, to the point and concise. That is what is needed in an emergency situation. In one embodiment the vehicle will have both visual and acoustical indicators but may have just the visual or the acoustical. Additionally, this information can be sent wirelessly by the vehicle to a computerized device separate from the vehicle. Such a separate computerized device or system may be at an associated remotely located call center. GM's Onstar® or Mercedes Mbrace are systems that activate a communication from the vehicle to a call center if an airbag goes off, or there is an event that was programmed into the system to react to. The system is passive and active in the case of Mercedes's Embrace Secure. The system comes standard with many vehicles they offer, but after five years the owner or lessor has to pay for the monitoring. These pay for play safety features do not guarantee that vital information will be transmitted to call centers, if the current owner does not keep the plan active. This application addresses the faults of the current systems, which are essentially add on components by the car maker, which require continuous revenue to them to function. This system is guaranteed, part of the vehicle and not subject to removal or failure based on a subscription plan. Much in the way, that a car has TPMS or brake lights, the above-described systems always work, and are not subject to additional monthly payments to keep the functionality intact.

The remotely located computerized device may also be a computerized device, such as a tablet or smartphone, that, for example, is carried by a first responder. In the event of a wireless transmission to a computerized device, in one embodiment, the vehicle's wireless transceiver need only emit a code that is recognizable by a software application running on the remotely located computerized device (or another computer system accessible by the remotely located computerized device). Such a code may be used by the application executing on the remotely located computerized device to automatically alert the user of the remotely located computerized device that the vehicle in question is experiencing an emergency situation, the location of the vehicle and to provide a link (such as a Uniform Resource Locator (URL) to an emergency response guide to permit rapid identification of required procedures. In one embodiment, a visually encoded indication, such as a QR or bar code, may be provided by the vehicle to a location exterior to the vehicle in the manner shown in FIG. 5D or 5E. Similar information may also be displayed on a window or mirror of the vehicle.

In one embodiment, as shown in the flow diagram of FIG. 24C, if a vehicle senses any toxic gas, such as HF, the vehicle alerts (2420) the driver and occupants—with a visual and acoustical indication or warning, opens (2422) all the windows and sunroof to clear the cabin of the gas or fumes, turns on (2424) the interior vehicle fan(s) to the high setting to force any gas out of the cabin, sends an alert (2426) to a remotely located computerized device, such as the remote vehicle center, such as Onstar® or a first responder's computer system, provides (2428) a visual, acoustical indication to one or more points inside the vehicle and the vehicle's exterior, e.g., sharks fin, rear-view mirror, side mirrors to ensure the driver sees/hears the indication and to warn individuals in the vicinity of the vehicle.

Figure 25:
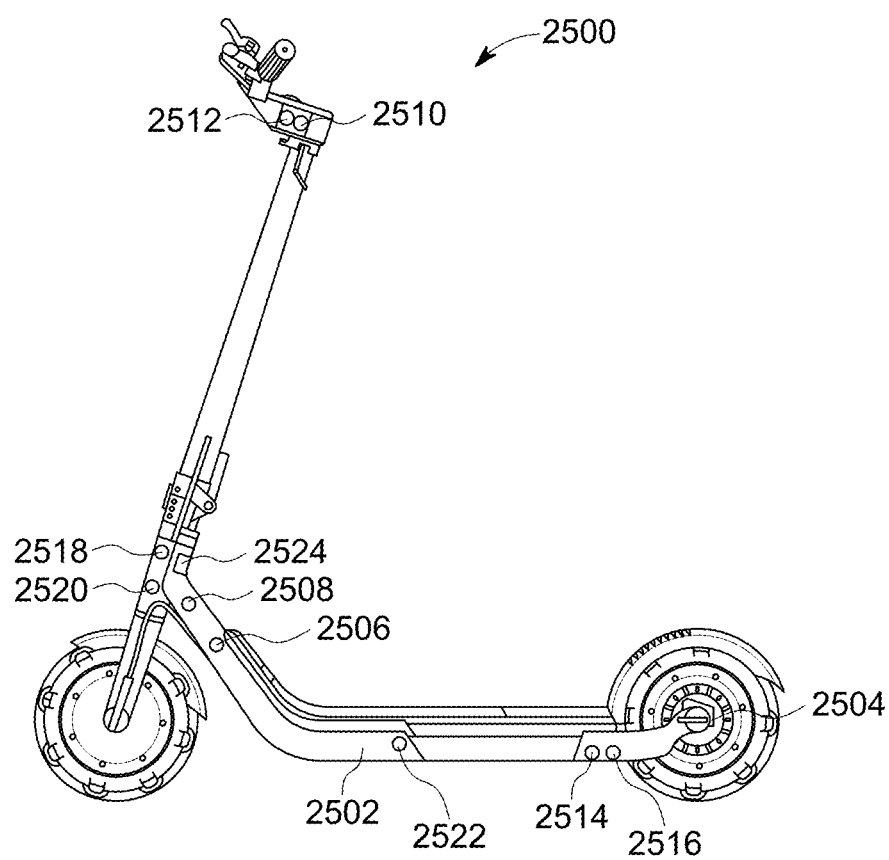
FIG. 25 illustrates a scooter type device employing an embodiment of an energy supply status indicator.

FIG. 25 illustrates a scooter type device employing an embodiment of an energy supply status indicator. The scooter 2500 has an onboard lithium-ion battery 2502 or any other type or combination thereof. A motor 2504 provides motive power. A visual indicator 2506 to warn of a potential battery failure or overheat state is positioned in a conspicuous location. In the embodiment shown, the visual indicator is positioned one a side of the scooter near the juncture of the base and the handle. In such an embodiment, another visual indicator is positioned on the opposite side so any visual indication can be seen from either side, particularly if the scooter is laying on its side. A speaker 2508 provides an acoustical alert. Another visual indicator 2510 is positioned at the upper end of the scooter handle to warn of a potential battery failure or overheat state. Another speaker 2512 is positioned on the handle to provide an acoustical alert. Another visual indicator 2514 is positioned on the base in the vicinity of the rear wheel to warn of a potential battery failure or overheat state and has a counterpart on the other side of the scooter. Another speaker 2516 is positioned to face forward at the bottom of the handle as is another visual indicator 2518. Another speaker 2520 is positioned at the center of the base facing toward one side. A charging port 2522 accepts a charging plug to charge the battery 2502. A wireless transceiver 2524 receives and transmits wirelessly (e.g., Bluetooth, cellular, WIFI) to send a distress indication to the owner's phone, smartwatch, or other digital device, and/or to a building monitoring facility. The transceiver 2524 can be built into the scooter 2500 or can take the form of a separate device mounted to the scooter.

Figure 26:
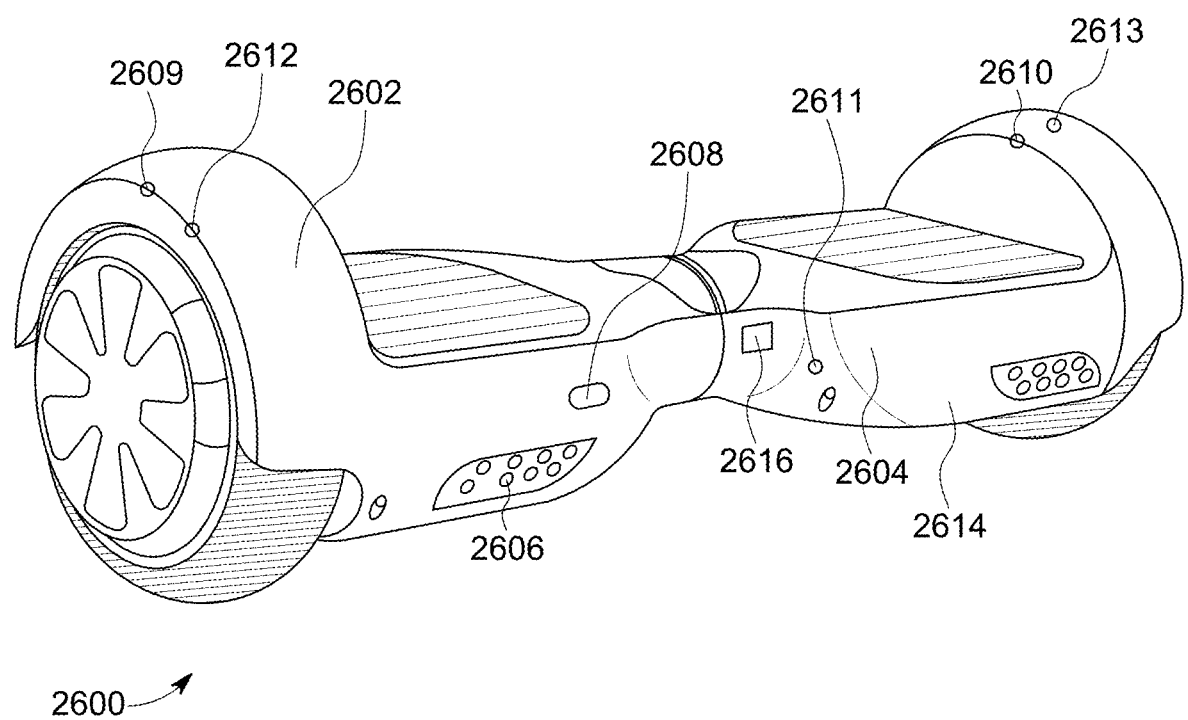
FIG. 26 illustrates a hoverboard type device employing an embodiment of an energy supply status indicator.

FIG. 26 illustrates a hoverboard type device employing an embodiment of an energy supply status indicator. The hoverboard 2600 is powered by a motor 2602 that is supplied with electrical energy by a battery 2604. Lights 2606 can be decorative or provide lighting for the rider in low light conditions. A plurality of visual indicators 2608, 2609 and 2610 are positioned respectively, on the base and on each fender to warn of a potential battery failure or overheat state. A plurality of audible indicators 2611, 2612, 2613 in the form of speakers are similarly positioned respectively, on the base and on each fender to warn of a potential battery failure or overheat state. A charging port 2614 accepts a charging plug to charge the battery 2604. A wireless transceiver 2616 receives and transmits wirelessly (e.g., Bluetooth, cellular, WIFI) to send a distress indication to the owner's phone, smartwatch, or other digital device, and/or to a building monitoring facility. The transceiver 2616 can be built into the scooter 2600 or can take the form of a separate device mounted to the scooter.

Figure 27:
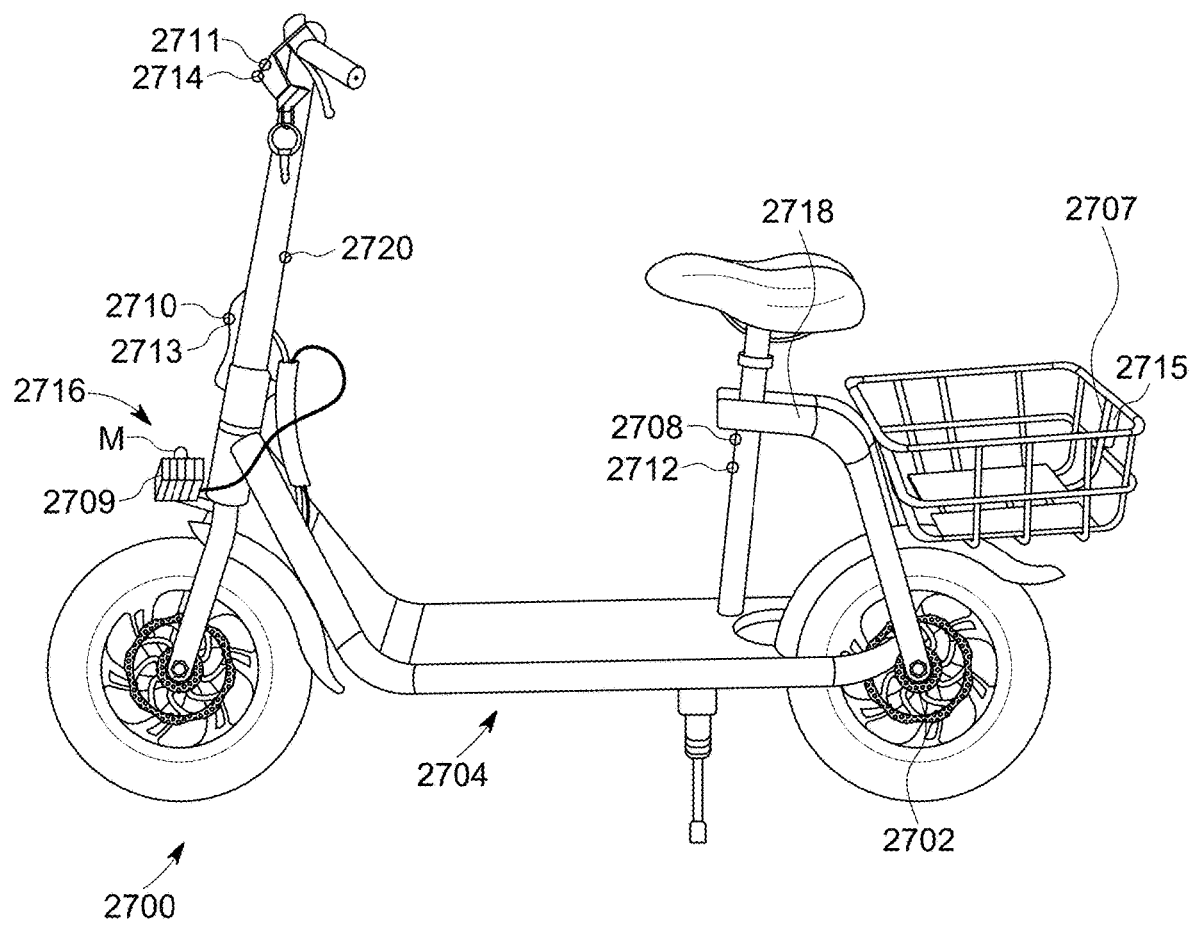
FIG. 27 illustrates another scooter type device employing an embodiment of an energy supply status indicator.

FIG. 27 illustrates another scooter type device employing an embodiment of an energy supply status indicator. The scooter 2700 is powered by a motor 2702 that is supplied with electrical energy by a battery 2704, which may be fixed to the scooter or may be removably mounted. A plurality of visual indicators 2707, 2708, 2709, 2710 and 2711 are positioned respectively, on the rear of the rear basket, on the seat post, on the front vertical post in the vicinity of the front wheel, on the front vertical post toward the center, and on the handlebar to warn of a potential battery failure or overheat state. A plurality of audible indicators 2712, 2713, 2714, 2715 and 2716 in the form of speakers are similarly positioned respectively, on the seat post, on the front vertical post toward the center, on the handlebar, on the rear of the rear basket, and on the front vertical post in the vicinity of the front wheel to warn of a potential battery failure or overheat state. A charging port 2718 accepts a charging plug to charge the battery 2704. A wireless transceiver 2720 receives and transmits wirelessly (e.g., Bluetooth, cellular, WIFI) to send a distress indication to the owner's phone, smartwatch, or other digital device, and/or to a building monitoring facility. The transceiver 2720 can be built into the scooter 2700 or can take the form of a separate device mounted to the scooter.

Figure 28:
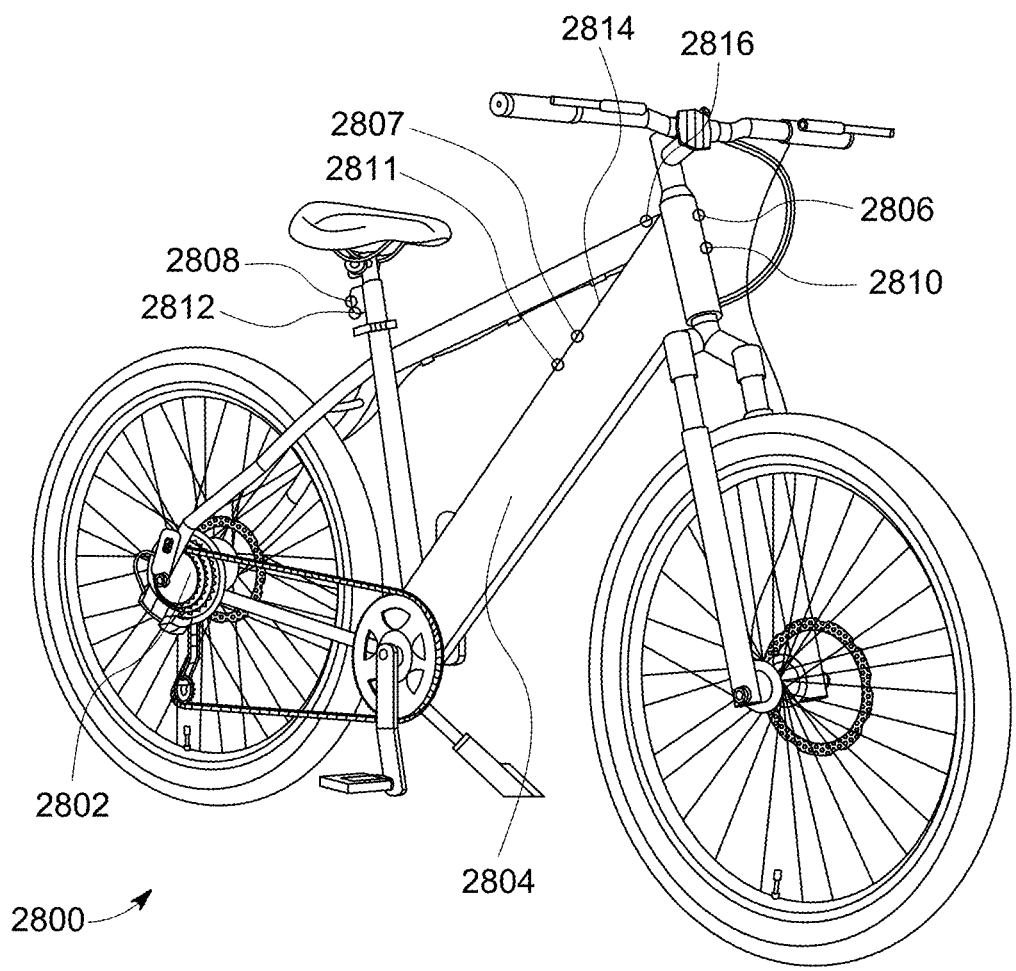
FIG. 28 illustrates a bicycle employing an embodiment of an energy supply status indicator.

FIG. 28 illustrates a bicycle employing an embodiment of an energy supply status indicator. The bicycle 2800 is powered by a motor 2802 that is supplied with electrical energy by a battery 2804, which may be fixed to the bicycle or may be removably mounted. A plurality of visual indicators 2806, 2807, and 2808 are positioned respectively, on the front post, the diagonal bar, and the seat post to warn of a potential battery failure or overheat state. A plurality of audible indicators 2810, 2811, and 2812 in the form of speakers are similarly positioned respectively, on the front post, the diagonal bar, and the seat post to warn of a potential battery failure or overheat state. A charging port 2814 accepts a charging plug to charge the battery 2804. A wireless transceiver 2816 receives and transmits wirelessly (e.g., Bluetooth, cellular, WIFI) to send a distress indication to the owner's phone, smartwatch, or other digital device, and/or to a building monitoring facility. The transceiver 2816 can be built into the scooter 2800 or can take the form of a separate device mounted to the scooter.

Figure 29:
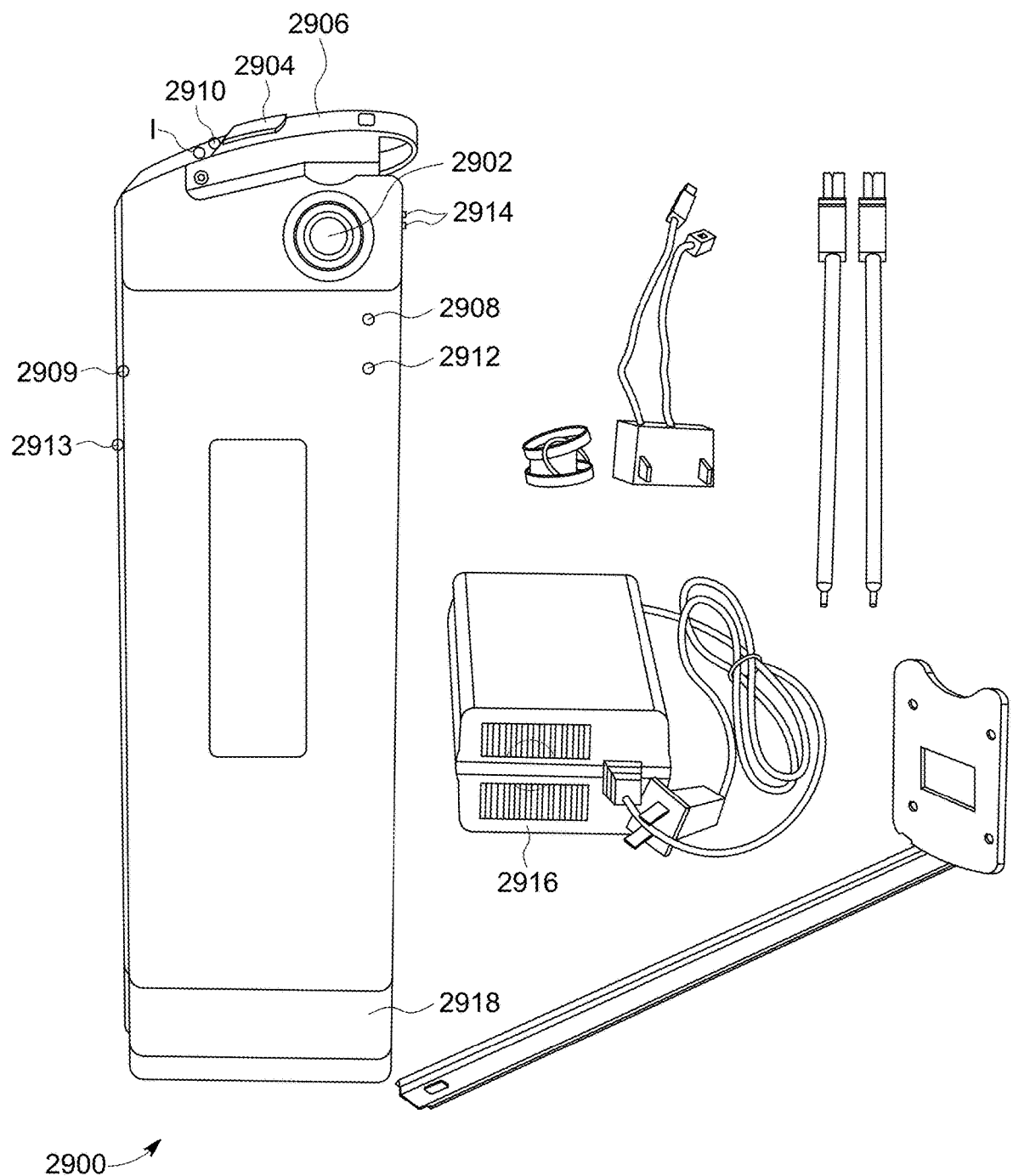
FIG. 29 illustrates an embodiment of a removable battery pack that may be used in the two-wheeled vehicles (e.g., bicycle, scooter, hoverboard) disclosed herein.

FIG. 29 illustrates an embodiment of a removable battery pack that may be used in the two-wheeled vehicles (e.g., bicycle, scooter, hoverboard) disclosed herein. The battery pack 2900 includes a lock 2902 to lock the battery to the vehicle. An integrated display 2904 provides visual output for the battery such as the state of battery charge and other functionality. A front panel surround 2906 provides physical protection for the display 2904. A plurality of visual indicators 2908, 2909, 2910 are positioned on various portions of the body of the battery pack 2900 to be visible from a variety of angles to ensure any indication is visible regardless of the orientation of a viewer with respect to the battery pack 2900. For example, indicators 2908 and 2909 are positioned on opposite sides of the body of the battery pack 2900 and indicator 2910 is positioned on the top surface of the battery pack 2900 to warn of a potential battery failure or overheat state. A plurality of audible indicators 2912, 2913 and 2914 are positioned on various portions of the body of the battery pack 2900 to be heard regardless of the orientation of a person with respect to the battery pack 2900. For example, indicators 2912 and 2913 are positioned on opposite sides of the body of the battery pack 2900 and indicator 2914 is positioned on the top surface of the battery pack 2900 to warn of a potential battery failure or overheat state. A wall charger 2916 provides electrical energy to recharge the battery pack 2900. A wireless transceiver 2918 receives and transmits wirelessly (e.g., Bluetooth, cellular, WIFI) to send a distress indication to the owner's phone, smartwatch, or other digital device, and/or to a building monitoring facility. The transceiver 2918 can be built into the battery pack 2900 or can take the form of a separate device mounted to the battery pack 2900.

Visual indications may also be provided by way of the embodiments shown in FIGS. 30-40.

Figure 30:
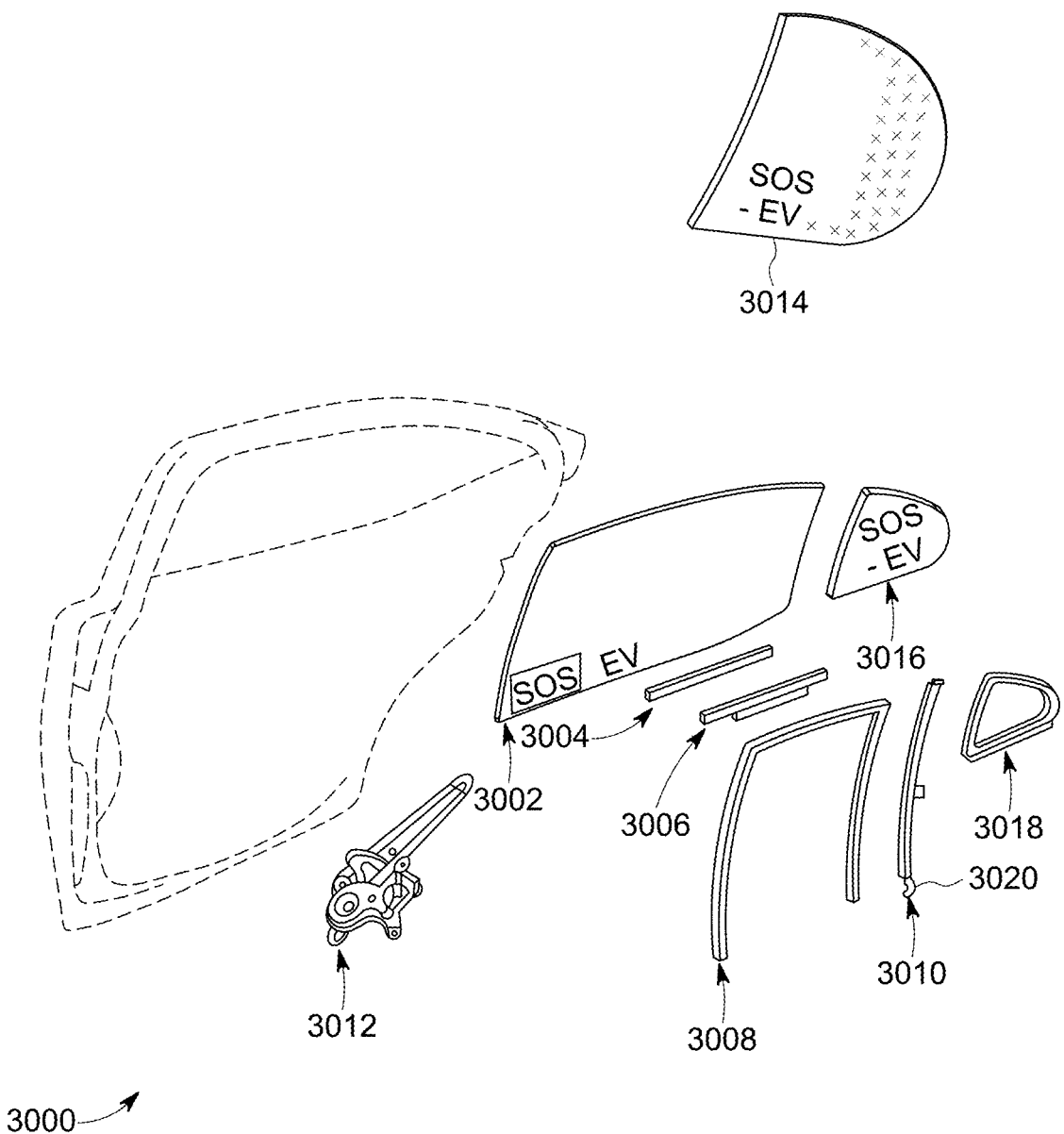
FIG. 30 is an exploded view of a rear door of an automobile.

FIG. 30 is an exploded view of a rear door 3000 of an automobile. Window 3002 of the rear door of the vehicle is formed of conventional auto glass and has mounted along the periphery of the window 3002 an LED light strip 3004 which when energized projects light across the window 3002 to cause illumination of text and/or graphics that is etched into the window 3002 to provide a visual indication. The black outline is an illuminated edge of the glass that indicates the color for the propulsion type of the automobile. If no letters or symbols are desired the LED light strip 3004 may light up in one color, e.g., green for an electric vehicle powered by lithium ion batteries or blue for a hydrogen powered vehicle for example. The LED light strip 3004 is positioned so as to illuminate the entire window, or a portion of the glass where a visual indication, shown as the letters "SOS-EV" or other symbols are invisibly etched or applied or sandwiched into the glass of the window 3002, so it cannot be seen when the LED light strip 3004 is not illuminated. Also positioned on window 3002 is LED light strip 3006 that illuminates the window in the same manner as described above for LED light strip 3004. The LED light strips 3004, 3006 may be affixed to both sides of the glass for maximum effect and visibility. In one embodiment, the window 3002 may be mounted in conjunction with a molding 3008 into which are embedded LEDs positioned to illuminate the window 3002 in its entirety.

A more detailed view of the light strips 3002/3004 may be seen at 3010 which is an illuminated strip containing LEDs or any other light producing medium. In one embodiment, power for the LED light strips 3002/3004/3010 is provided by way of window motor 3012. The LED light strips may also take the form of light guides or fiber optics. As can be seen at 3014, the fixed rear glass adjacent to the window 3002 which may have manufacturer's etchings or designs for privacy and style also has etched within a warning which can be illuminated as described above. These etchings can also be illuminated, and optionally in a color which warns and identifies. For example, green could indicate a battery vehicle, and orange flashing means battery fault possible fire call 911 and exit vehicle. The fixed glass 3014 is also seen at 3016 where the warning "SOS-EV" is sandwiched in the glass or applied on the interior or exterior portions of the glass. The "SOS-EV" can be virtually invisible, and only seen when an event occurs, or it can always be visible and discrete. This is advantageous if the vehicle has completely lost power or it is not in distress but sitting close to a vehicle that is on fire, but it is not yet involved. It will help first responders to understand what they need to prepare for, since EVs can use double the amount of water a gasoline vehicle fire may use. At 3018 can be seen the interior component that the glass is mounted in. This structure can contain one LED, OLEDs, Light Guides, fiber optics or any other light producing medium. Finally, wire 3020 provides electrical energy from the motor 3012 to the various light sources. In one embodiment, the window glass may be a metalized glass which typically appears to be silver, purple or blue, and when an LED or LEDs for example are placed above, to the side (inset into the A Pillar) or below the glass, the LEDs will illuminate, lighting up the entire metalized glass producing a glow. The colors can vary based on the manufacturer's desire. Since any glass on vehicles can be of the dual lamination type, there could be a message etched in, a film between the glass, a symbol, a line or any other light receiving marking. And, they can flash or light up in any pattern and be constantly changed by re-mapping the vehicle with a scan tool or using over the air programming.

In one embodiment, a vehicle that has heating-element wires that are applied between the two laminates of the windshield glass to assist with the demist and defrost of the windscreen is modified to add illumination from the periphery of the windshield (top, bottom, and/or sides). In such an embodiment the light from the LED is reflected in the small metal stripes and can indicate the color that the manufacturer chooses or an ISO standard they may choose to use. For example, a gasoline Range Rover would have a green illumination, a battery Range Rover, red and a hydrogen powered one could be green. The colors may change in different countries, and with the manufacturers and first responder choices.

The side glass and rear glass can also have the same LED or light guide systems to illuminate the glass. In the rear window, there are larger defroster or ice melting electric lines, which tend to be more visible. The horizontal lines can have LEDs that illuminate the portions between the lines, creating a stripe effect or can illuminate the non-striped area below and/or above the lines. The combinations are virtually limitless. Meaning a less expensive vehicle may have just a few lines, with just a few color options to indicate the power type of the vehicle.

Figure 31:
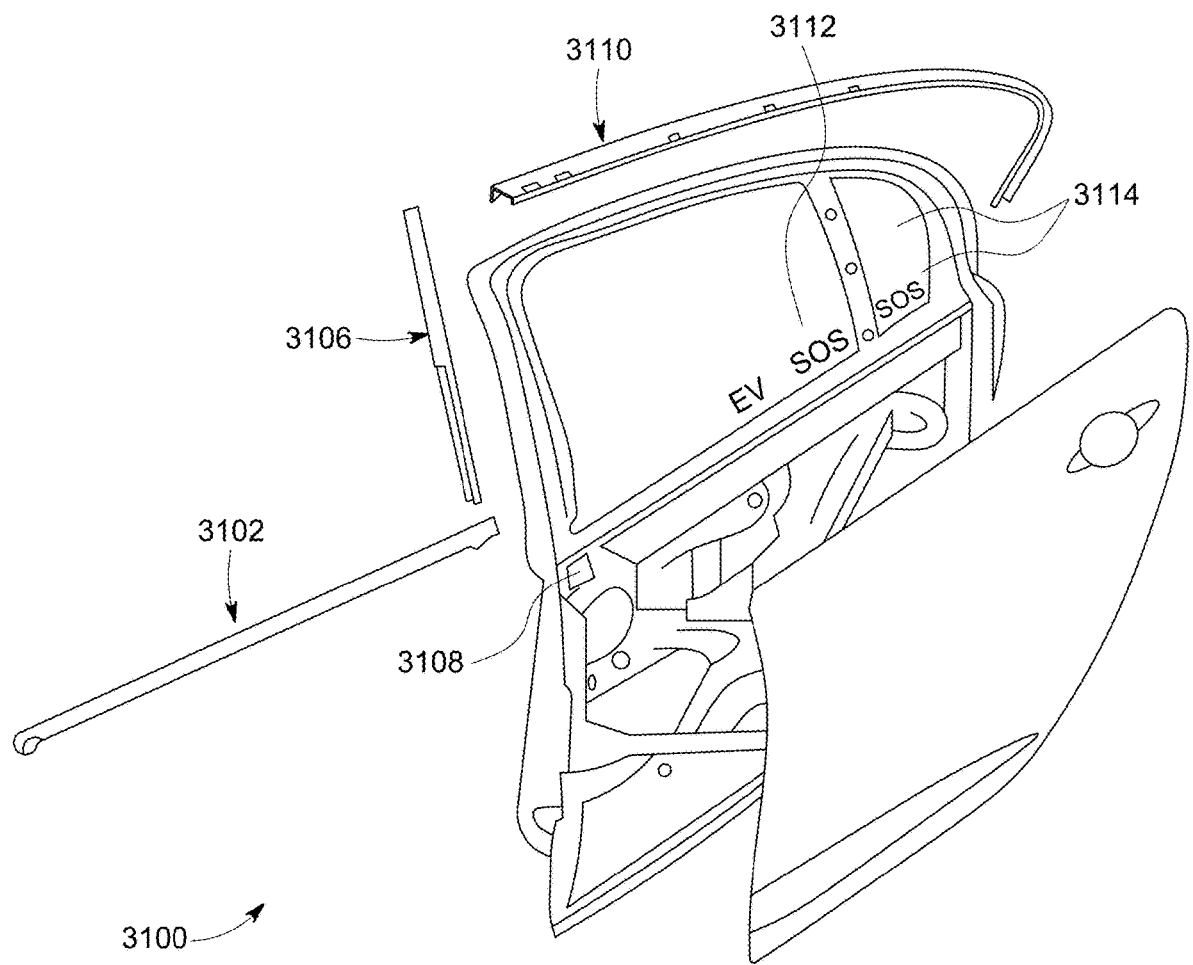
FIG. 31 shows another embodiment of a warning by way of a side window.

FIG. 31 shows another embodiment of a warning by way of a side window. LED light strip 3102 illuminates the window upwards. It illuminates the entire window, or a portion of the glass where the SOS-EV or other symbols are invisibly etched or applied or sandwiched into the glass, so it can't be seen during the cars regular state. Fixed glass 3104 has the text "SOS-EV" sandwiched in the glass or applied on the interior or exterior portions of the glass. The "SOS-EV" can be virtually invisible, and only seen when an event occurs, or it can always be visible and discreet. This is advantageous if the vehicle has completely lost power or it is not in distress but sitting close to a vehicle that is on fire, but it is not yet involved. It will help first responders to understand what they need to prepare for, since EVs can use double the amount of water a gasoline vehicle fire may use. LED light strip 3106 is positioned to illuminate the window upwards. It illuminates the entire window, or a portion of the glass where the SOS-EV or other symbols are invisibly etched or applied or sandwiched into the glass, so it can't be seen during the cars regular state. The LED/OLED/Light guide or fiber optic strips o may be on both sides of the glass for maximum effect and visibility. The vehicle may have one strip dedicated to green for hydrogen, and fast blinking orange to signal an SOS condition. Integrated power source 3108 provides electrical energy for the LEDs or the power source for the light guides or fiber optics. LED light strip 3110 is positioned at the upper edge of the window to illuminate the window downwards. It illuminates the entire window, or a portion of the glass where the SOS-EV or other symbols are invisibly etched or applied or sandwiched into the glass, so it can't be seen during the cars regular state. The LED/OLED/Light guide or fiber optic strips may be on both sides of the glass for maximum effect and visibility. The vehicle may have one strip dedicated to green for hydrogen, and fast blinking orange to signal an SOS condition. The text "SOS-EV" or other type markings 3112 is also applied on the inside, outside or sandwiched between the glass of the moveable window glass.

Figure 32:
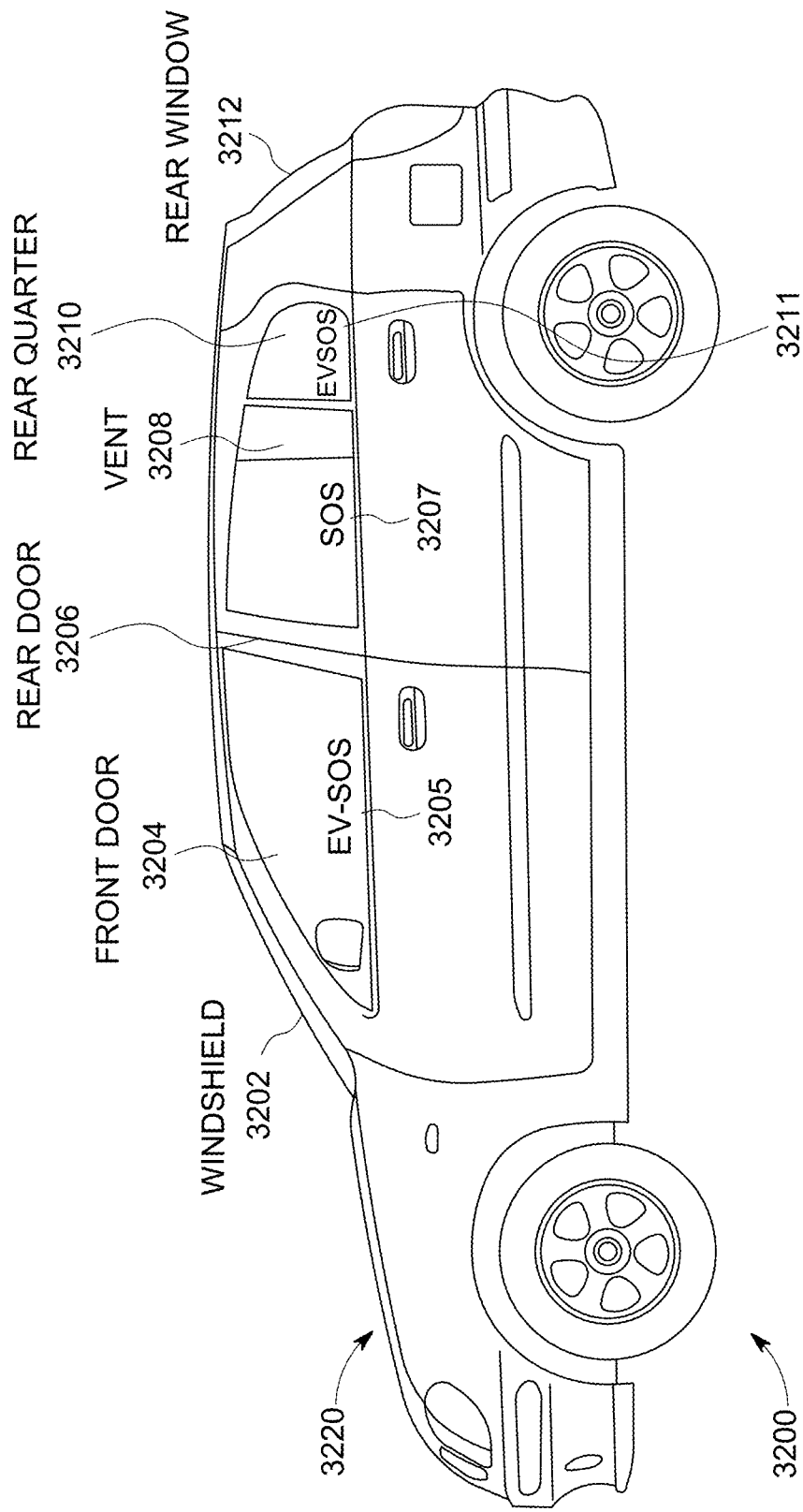
FIG. 32 shows an entire vehicle with warnings etched in various portions.

FIG. 32 shows an entire vehicle 3200 with warnings etched in various portions. The windshield 3202 may light up entirely during an event, in a color, pattern or illuminate pre-determined flashes of color, which may be bright enough to illuminate the hood of the vehicle. The front driver's side door 3204 has the text "EV-SOS" seen at 3205 etched in the glass. The etching or applied SOS EV, which can be virtually invisible or visible. The rear door 3206 also has the text "EV-SOS" seen at 3207 etched in the glass. The vent window 3208, which can also be fixed rear door glass, may also have similar etching or full illumination. The fixed rear quarter panel glass 3210, may similarly have etching or full illumination of the text "EV-SOS" seen at 3211, as may the rear window glass 3212. In such an embodiment, the hood 3220 can be a light receiving medium from the illuminated glass front windshield and may have LEDs built into the top molding that throws light down on to the hood, with colors, words or patterns. Silver cars would reflect the light to the surroundings, and white vehicles would show the words, or symbols like a marker.

Figure 33A:
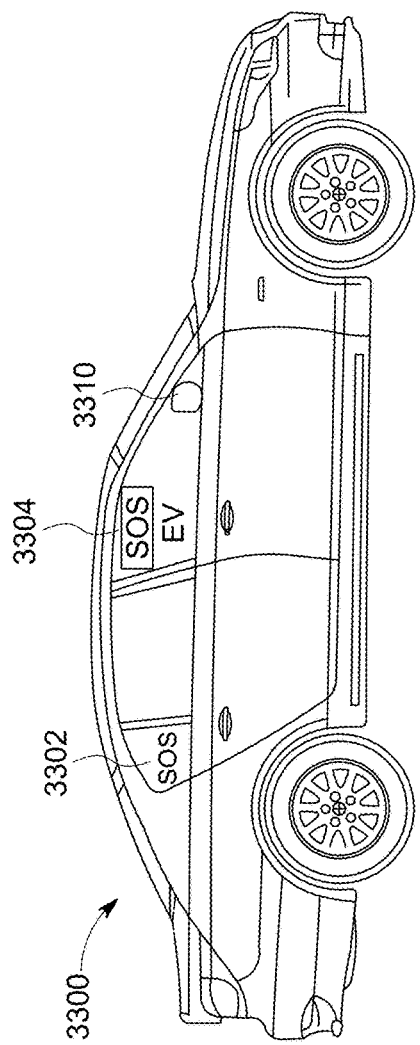
FIG. 33A, FIG. 33B and FIG. 33C show a view of respectively the right-side, rear and front of a vehicle with warnings etched into the various windows.
Figure 33C:
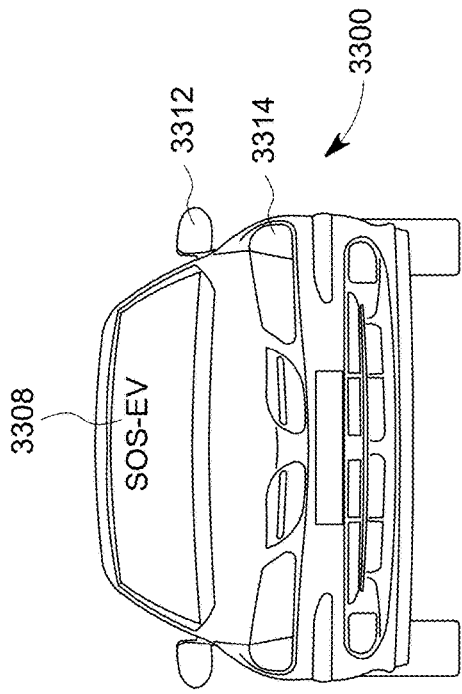
Figure 33B:
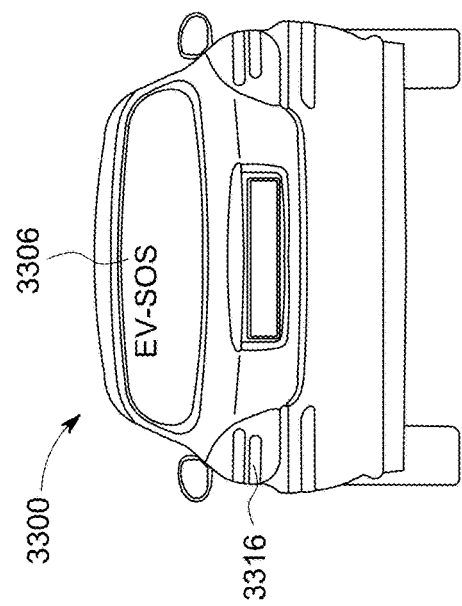

FIGS. 33A, 33B, 33C show a view of respectively the right-side, rear and front of a vehicle 3300 with warnings etched into the various windows in a manner as explained above in connection with FIG. 32. Rear door fixed glass 3302, front door window 3304, rear window 3306 and front windshield 3308 each have etching or marking with descriptive text, such as "EV-SOS" that illuminates. Additionally, side mirrors 3310, 3312 illuminate with color that signifies the propulsion type and if it is in distress. Normally, there is an illuminated yellow strip to indicate the vehicle has it's coordinating side blinker on. In the embodiment shown, the strip can light up green for EV, then flash orange for battery event, that could lead to fire, for example. The vehicle 3300 also has in the headlight housings 3314 an etching of "SOS-EV" in the clear portion. Modern headlights often have very complex LEDs and a fair amount of clear portions that blend into the design of the vehicle. These information markings can be in a dedicated area where the light does not hit it, or be illuminated from below by an LED, light guide, fiber optic, etc. The markings can be visible or invisible, depending on the manufacturer's desire, for identification that is always available, such as "EV" and when the SOS event happens that can illuminate. These markings can be made virtually invisible to the naked eye. The vehicle 3300 also has an etching of "SOS-EV" in clear portion of rear taillight housings 3316. The etching is positioned where the clear portion is for the reverse lights. Modern taillights often have very complex LEDs and a fair amount of clear portions that blend into the design of the vehicle. These information markings can be in a dedicated area where the light does not hit it, or be illuminated from below by an LED, light guide, fiber optic, etc. The markings can be visible or invisible, depending on the manufacturer's desire, for identification that is always available, such as "EV" and when the SOS event happens that can illuminate. These markings can be made virtually invisible to the naked eye. In one embodiment, the vehicle 3300 includes "Puddle Lights" or "Welcome Home" lighting. This includes an LED in the outside rear view mirrors. When it is dark, these LEDs illuminate the ground below, for a safe exit and entry to the vehicle at night. Some even image transfer, meaning a Mercedes may shine the three-pointed star on the ground. This area can house a very bright green LED and or Orange LED to indicate propulsion and battery event danger. It can simply illuminate the ground or it can produce a message on the ground: "EV_SOS" for example.

Figure 34:
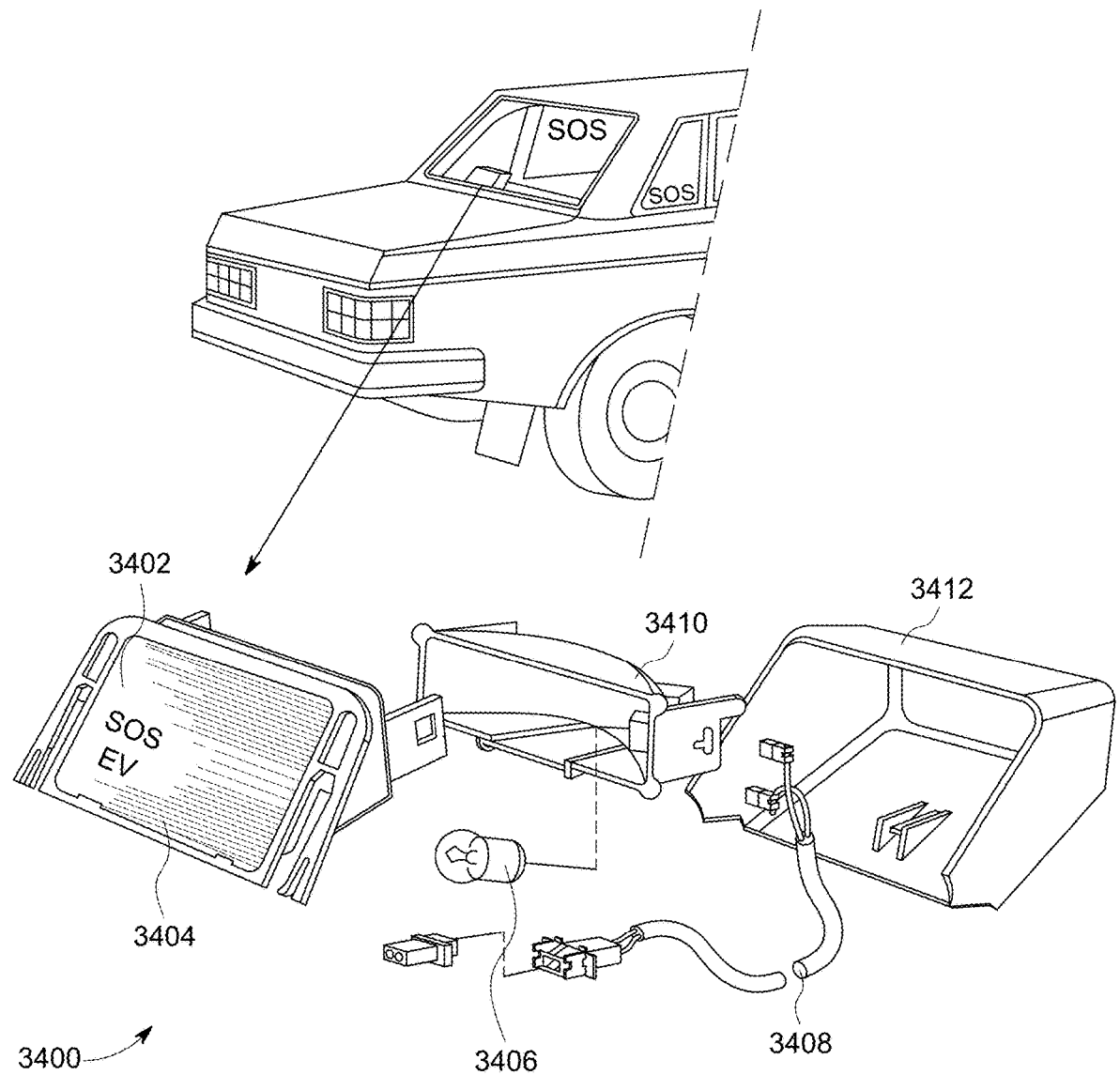
FIG. 34 shows an exploded view of a brake light with a warning indicator.

FIG. 34 shows an exploded view of a brake light 3400 with a warning indicator. The text "SOS EV" is etched or applied to the lens 3404 of third brake light unit. The embodiment shown employs an older style bulb 3406, which can be used for illumination or in another embodiment can take the form of an LED. A wire harness 3408 distributes electrical energy within the brake light 3400. Housing 3410 encapsulates the various components of the brake light 3400 to provide a sealed dustproof unit and is itself covered by interior decorative cover 3412.

Third brake lights, which have been required in the USA since 1986 are located at the top of the rear windshield, or lower portion. On convertibles, they are integrated into the upper portion of the trunk. These lights are required, and not a visually enhancing feature. They mar the look of the vehicle, but have just become invisible to an extent, because most every car on the road has them. Since they are intrusive, the outer portion, an inner portion or any part of the third brake light can have another use, to warn, and inform the first responder about the powersource and status of the vehicle. The LED can be located in the light area, in the headliner, or in any covered or uncovered area by the rear window. It can even be a focused laser type light that is hidden anywhere on the rear cargo shelf, rear cargo area, headliner or C or D Pillar. The third brake light is generally always off except for when the driver brakes. If the third brake light has a unique set of flashes, it can signal the fuel source and status to a first responder. Meaning if a vehicle is immobile after an accident and all the passengers are removed, it would be very noticeable that the 3rd brake light would come on at all, yet alone be a different color or flash pattern. The third brake light is manually operated when the driver presses on the brake pedal. If there is no driver or an unconscious driver, the third brake light may not illuminate, which would present a unique identifier, meaning something that does not routinely happen.

Figure 35:
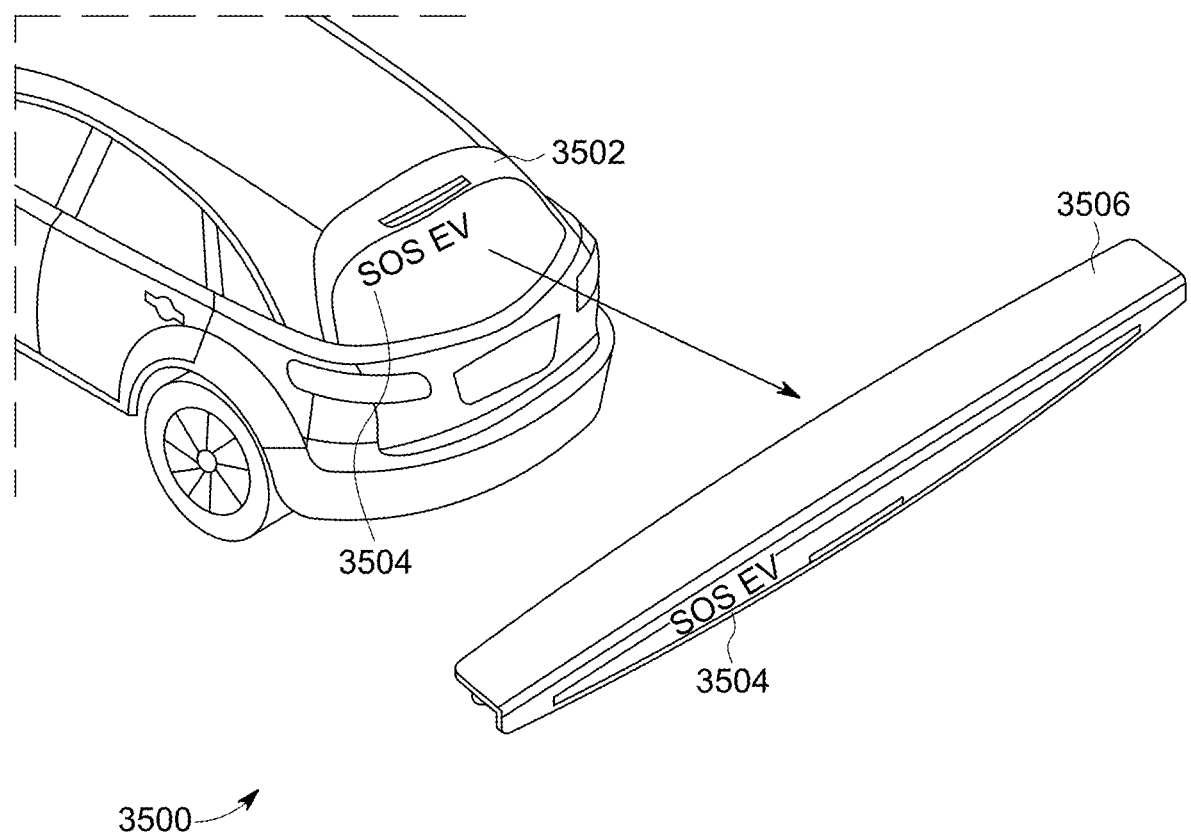
FIG. 35 shows an embodiment of a third brake light.

FIG. 35 shows another embodiment of a third brake light 3500. In this embodiment, the third brake light 3500 is flushly mounted at 3502 in the rear just above the rear glass. It includes an SOS and or EV type propulsion marking 3504. An enlarged view is seen at 3506 where the "SOS EV" marking, etching or applied letters 3504 that illuminate in a different color if there is an event and otherwise just show "EV" to be visible at all times to assist first responders to determine the type of propulsion the vehicle has. Many EVs have very limited markings at the rear. Typical SUVs have higher third brake lights, which would not be damaged in a bumper-to-bumper accident. This gives the manufacturer unlimited choices of words, symbols, etc. Additionally, a dedicated LED can throw light downwards, upwards or sideways indicating any message as described in this application, including a strobe effect, an image projection effect, etc. In one embodiment, the rear window employs metallic lines to implement a defroster. These lines become heated on demand to reduce fogging or to help melt snow. These lines are often black but may appear to be silver. In the embodiment shown, LED illumination is in the side of the glass in a hidden portion, and directs light out to the window. The light is manipulated by the lines and creates a pattern, depending on the width, or style of the defroster lines. The light may be reflected if they are silver or absorbed to some degree if they are black. In one embodiment, a dedicated LED in the third brake light unit or on the vehicle's sheet metal is employed to throw light downwards, upwards or sideways indicating any message as described in this application, including a strobe effect, an image projection effect, etc.

Figure 36:
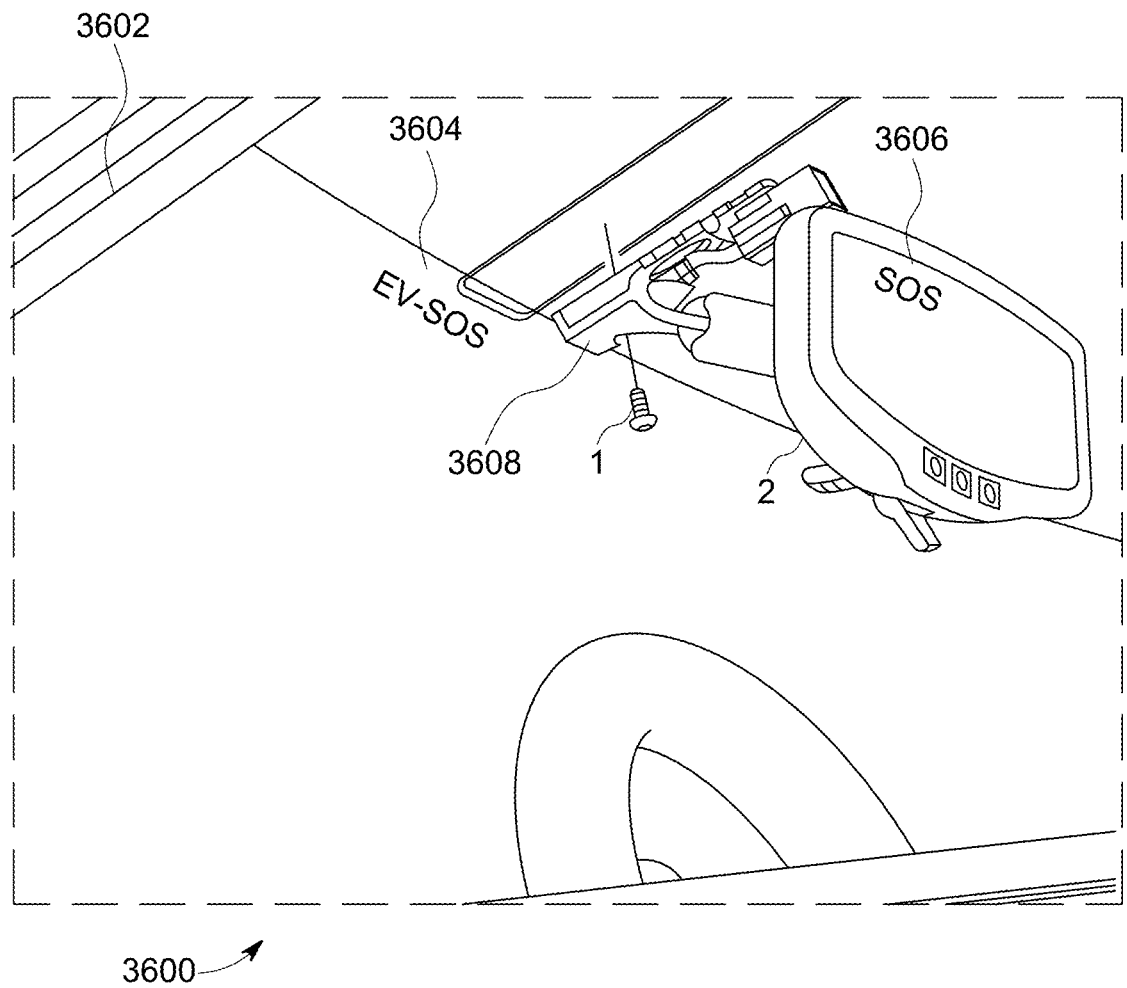
FIG. 36 shows details of an inside view of an embodiment of a windshield.

FIG. 36 shows details of an inside view of a windshield 3600 with LED strips and wires 3602 to the side of the front windshield. The windshield, is attached on the sides to the "A Pillar." There is often a fair amount of space, and designers, can choose to use what source or sources of illumination they choose. The "SOS EV" marking, etching or applied letters 3604 illuminate in a different color if there is an event, or just the EV is visible at all times to assist first responders to determine the type of propulsion the vehicle has. The interior rear view mirror 3606 has an SOS marking etched into the glass to warn passengers if the vehicle battery is in failure mode. The SOS would not be visible at any other time. Glass etching has the ability to be virtually invisible if desired. Shown generally at 3608 are the electronic components that cause the illumination.

Figure 37:
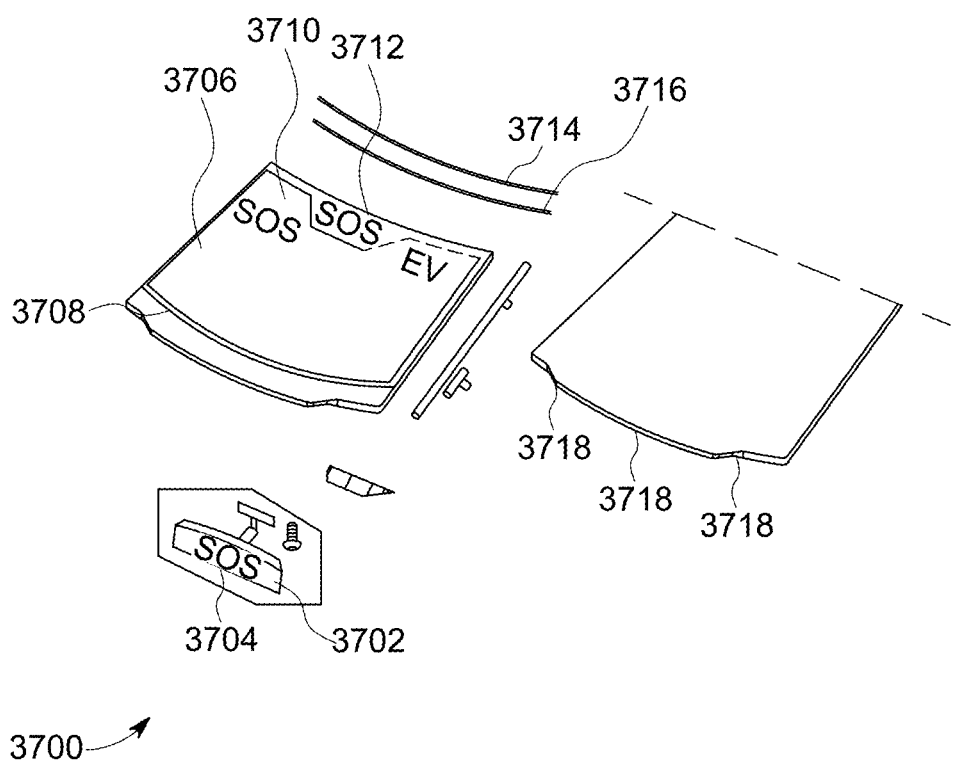
FIG. 37 shows an exploded view of a windshield assembly.

FIG. 37 shows an exploded view of a windshield assembly 3700 with an interior rear-view mirror 3702 that has etched into its glass an SOS marking 3704 to warn passengers if the battery is in failure mode. The SOS is not visible at any other time. Glass etching has the ability to be virtually invisible if desired. Front windshield glass 3706 has mounted at its periphery LED 3708, or light guide, or fiber optic line to illuminate an etched warning "SOS-EV" 3710. Shown at 3712 is an area that is partially blackened out at the top of the windshield behind and to the sides of the interior rear view mirror. This area typically has a matrix of black dots, because on very sunny days that produce glare, the roof mounted swing down visors, cannot block the sun in this area. This matrix of dots, can be illuminated with LEDs set above it in the headliner. A light guide or LED strip 3714 illuminates the windshield or a portion of. Some vehicles have metalized double laminated glass, which produces UV reflecting materials, and give the window a purple or silver glow. These powerful LEDs or light guides can illuminate the entire windshield, because of the metalized area sandwiched between the glass. A light guide or strip of LEDs 3716 illuminate a single pane of windshield glass and the SOS portion and the dot matrix portion. The LED or light guide may be mounted by attachment elements or molding that holds the front window in place. Since this would be easy to install, any vehicle can be retrofitted to have a windshield that illuminates and shows the "EV_SOS" or any other message. This retrofit can happen based on a repair, when body work is done, or if the owner wishes a safer experience for his or her vehicle and sees the value in the warnings. Attachment wires 3718 are plugged in by the roof, headliner or A Pillar that surround the windshield.

Some higher end vehicles have dual laminated glass on the sides, front and rear portions of the vehicle as optional equipment. Such a vehicle can be equipped with all external glass having dual lamination, which is for all intents and purposes two pieces of glass fused together like a sandwich. In the Mercedes the option of dual laminated glass, can also include a metallized windshield, side and rear glass windows, or metal oxide windshield or a thermic windshield. These windshields contain a thin layer of metal oxide that is applied during the laminating stage of manufacturing. This coating helps block UV rays, to protect the interior from the sun and the passengers. The glass also reflects the sun's rays and helps to keep the cabin cooler on hot days for example.

This application addresses using the metalized windshield, side glass, and rear glass in a new and novel way. That is to signal the vehicle is in distress, signal the propulsion type and coordinate the event to a color or words embedded in the windshield. The typical metalized windshields appear to be silver, purple or blue, and when an LED or LEDs for example are placed above, to the side (inset into the A Pillar) or below the glass, the LEDs will illuminate, lighting up the metalized glass producing a glow. The colors can vary based on the manufacturer's desire. Since any glass on vehicles can be of the dual lamination type, there could be a message etched in, a film between the glass, a symbol, a line or any other light receiving marking. In the case of the Range Rover and the virtually invisible windshield metal lines, it is known that micro-etchings, opaque lines, or any other light catching medium can be applied to transmit a message, saying, warning or just a color or series of colors. These patterns on the windshield, side glass or rear glass can flash the light, illuminate in sequence (meaning, there could be three etchings in the rear glass, and the first would say "Hydrogen Vehicle" then "Leak Detected" "Call 911-SOS") or randomly to get the attention of the public and first responders. These messages can be pre-programmed or changed during service visits or over the air update. The images appearing on the front, side or rear glass, or moonroof (a flat fixed or opening piece of glass, or an entire glass roof, like the that which is found in a Tesla Y. Another advantage in illuminating the glass roof is if the car, has been tilted on its side or post-crash is on its side. Additionally, if the vehicle is viewed from above, such as first responders responding to a fire in an open garage, or apartment dwellers that can see the vehicle from above on a balcony for example that has a view to a lower floor this will indicate what type the vehicle is and it's powertrain. ROROs (roll on, roll off) vehicle transportation ships, tightly pack vehicles for overseas transport. They cannot be seen from side to side but can clearly be seen from decks above.

Such embodiments assist first responders to understand the method of suppression of the fire or smoke if the vehicle is in distress. The advantages of having the front, side and rear portions show the vehicle information and status are beneficial in front to rear accidents, when the hood or rear end of the car may be damaged, but the glass remains intact.

Even non-double laminated glass can support any type of logo, word, light catching medium (words, symbols, etc). Currently all auto glass has the maker, such as Pilkington, in white letters on a corner of the glass. Owners in all likelihood have no idea they are even there. And, in some vehicles the etching of a pattern into the glass is desirable. At the top portion of many windshields where the inside rear-view mirror is affixed to the glass or a part of the roof, there is a matrix of black dots. They are there to block out harsh sunlight, because the sun visors do not cover that area when retracted down. Again, these dots and microdots are almost unnoticed to vehicle owners or drivers. In those spaces there can be other patterns or textures that capture light, such as blue for hydrogen, and then blink in any set pattern to the signal a venting situation of imminent fire. The 2023 BMW 7 Series has used etching and white designs as a selling feature. In the rear door you have the main portion of the glass which goes up and down, and then a curved area at the rear of the door, that has a half teardrop shape. It is a fixed panel. The 2023 BMW 7 Series, fixed window has a "Holy Geometry" design, that makes that glass look unique and gives the rear passengers a bit more privacy. In one embodiment, the "Holy Geometry" area can be illuminated green for battery vehicle, then flash for venting, or cell fire. The flashes and patterns are limitless and will be unique to each propulsion for the vehicle. The LED can be located in the door frame or the top portion of the interior door panel. This identification will be imperative to first responders or the public, because vehicle manufacturers like BMW and the 2023 7 Series are building vehicles that can be gasoline, diesel, hybrid, hydrogen, etc, using the same exact body. It will be impossible to tell what fuel or propulsion type the vehicle is if the rear end by the name plate is damaged or not visible, if the vehicle is parked next to a wall or it is night time, snowing heavily or excessively foggy out.

Next to these words, can be stamped the propulsion type that lights up on all glass on the vehicle. It can simply be a line that says "Hydrogen Vehicle, if in distress this will light up red" and there will be a red led aimed at the message by the window frame or mounting area. Currently many vehicles come with ERGs (Emergency Response Guides) but they are not with the vehicle, have to be downloaded and the information in them ranges from good to poor. They are also of little use if the battery has been changed to a different type or the propulsion system has changed.

The message can also appear in the third brake light, in a clear glass headlamp housing or at the rear, in the clear area for a reverse light. For example, headlights need a clear lens, so the light from the bulb or LED can illuminate the road. The clear portion can have a line, message or outline that catches light from a dedicated LED in the area of the headlight. If there is an event, the colored LED can light up the message or symbol. It would be especially noticeable in a headlight housing if the headlights were off during the day. We are only accustomed to seeing white or clear lenses for headlights and reverse lights Many newer cars have turn signal repeaters in the outside rear view mirrors facing the front and sides of the vehicle. One such example is the 2016 7 Series. It is a strip of light which is yellow that flashes in sync with the turn signal. It can also be seen from the side view of the vehicle. This strip can be programmed to become blue if the car is a hydrogen vehicle or a dedicated LED or light strip can be mounted directly below or above it. The rearview mirror sticks out from the side enhancing visibility when the vehicle is viewed from the front or rear.

In some vehicles such as convertibles there may be no fixed roof for a sharks fin. Convertibles may have a receiver/transponder module mounted on the rear trunk or may simply have all the electronics embedded at the top of the windshield or other areas. The notification at the rear third brake light, the reverse lights, the headlight module, outside rearview mirrors and windshield would present a warning, status and propulsion type message or messages that would be seen on all sides of the vehicle. Having redundant warnings or information may be vital in high-speed crashes that severely damage the front and rear of a vehicle. These type of accidents make vehicle recognition difficult to impossible. Currently the design trends are boxes and bubbles. Additionally pedestrian crash protection has changed the front ends of vehicles.

Figure 38:
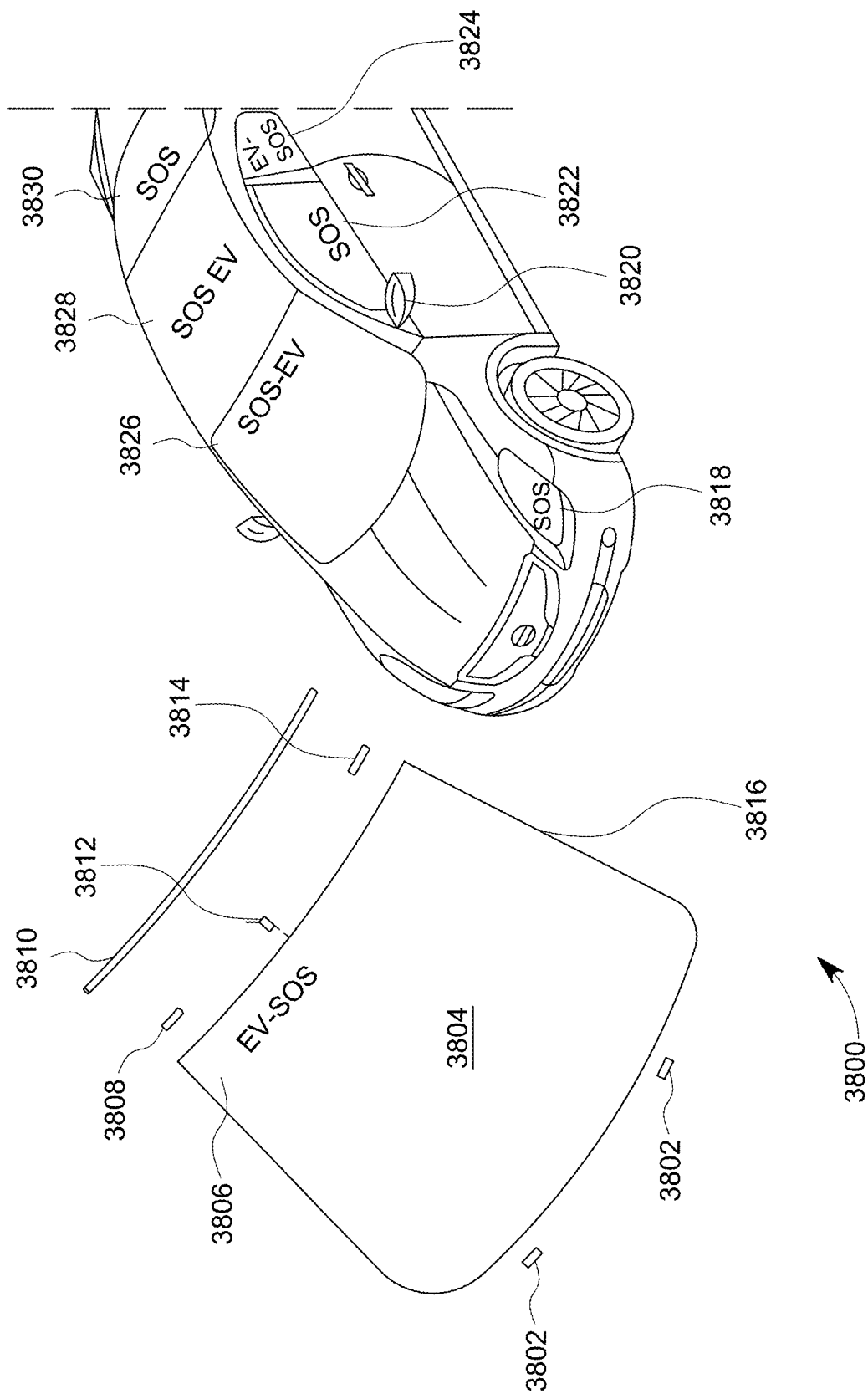
FIG. 38 illustrates an embodiment of a vehicle with dual laminated glass on the sides, front and rear portions of the vehicle.

FIG. 38 illustrates an embodiment of a vehicle of the type described above with dual laminated glass on the sides, front and rear portions of the vehicle. LEDs or light guides 3802 throw light upwards on the windshield 3804 to illuminate etched or applied "SOS EV" or similar markings 3806. LEDs or light guides 3808 throw light downwards on to the windshield to further illuminate the markings 3806. Additionally, an LED light strip 3810 that illuminates the windshield and or the propulsion and event markings. In one embodiment, a single LED 3812 illuminates the markings or windshield. A single LED may be desired if the vehicle is an entry model, or the vehicles are from a non-premium auto maker. LEDs or light guides 3814 are positioned along the upper periphery of the windshield 3804 to project light downwards on to the windshield 3804 and LEDs or light guides 3816 are positioned along the periphery of the left side (or alternatively right side) of the windshield 3804 to project light horizontally across the windshield 3804. The vehicle 3800 also includes at 3818 an etching in the clear portion of the headlight in the manner described above for 3314, and a side mirror 3820 as described above for 3310, 3312. The side windows also contain etchings and illuminations as described above for 3304, 3302 and the windshield contains an etching 3826 and illumination as described above for 3308. The vehicle 3800 further includes a full glass roof, or large glass panels, or standard type moonroofs with text such as "SOS-EV" etching or applied letters 3828. This glass area can be illuminated using the same described ways as the rear window glass or front windshield glass. The advantage of having this warning and identification in the glass on the roof, helps in recognizing a vehicle if viewed from above, like on a vehicle carrier, where they are closely packed together, and viewed from a higher deck such as a common roll on roll off ship. The message on the roof is also valuable if the vehicle is venting flames from the side of the vehicle for example, and is next to an office building or tower, that can see the car from above. It is also helpful if the vehicle is turned on to it's side. Further etchings 3830 are applied and illuminated as described above for 3306.

Additionally, the vehicle 3800 may include in its windshield front defroster metal lines. These small, virtually invisible metal lines help defrost and melt ice on the front windshield. Although advantageous, and barely visible they do interfere with EZ Pass type transponders, however when the windshield is illuminated for a propulsion indication and a battery event for example, these lines add to the visual drama, and will absorb, reflect or create may different patterns in the glass. The lines are electrically heated, and there may be an LED or light guide near the electric elements. If each line is used as a vehicle to display light in unique ways, fiber optics or light guides may be preferable. Heat can damage LEDs and having the main source of illumination away from the defroster's heat would be desirable. Or the LEDs can be simple and above the windshield as described above.

Figure 39:
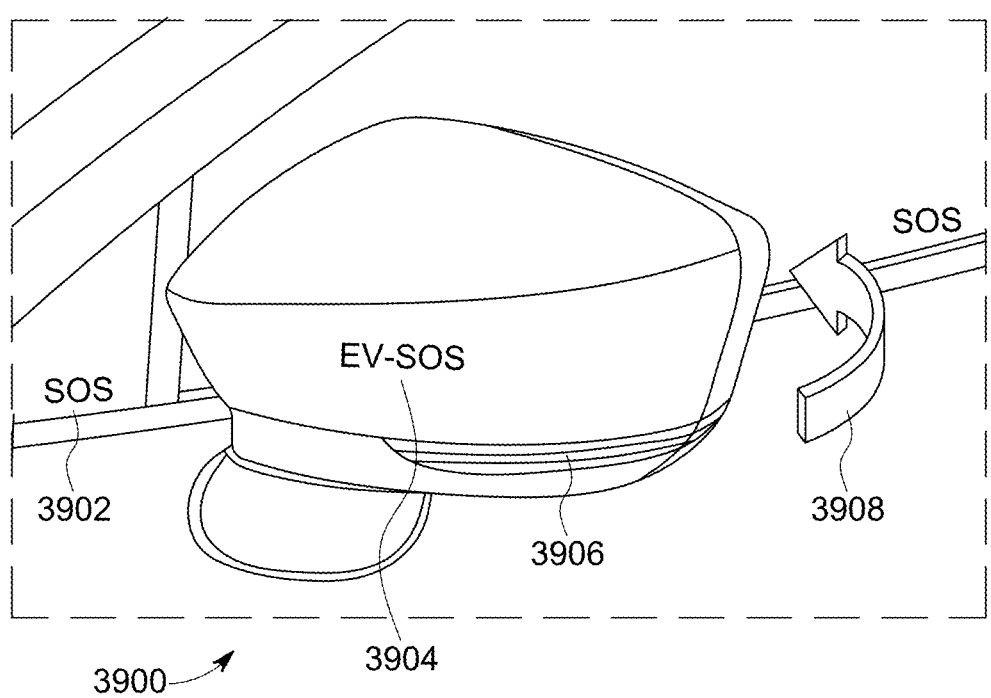
FIG. 39 shows details of an outside rear-view mirror.

FIG. 39 shows details of an outside rear-view mirror 3900 which has an etching 3902 or applied SOS which illuminates to provide a visual indication. This can be virtually invisible, be lit up from the dead area where the "EV SOS" message appears by LEDs for example, or the entire mirror or a portion could be "painted" with OLED paint. In some cars the rear-view mirror 3900, can be programmed to swing in to protect it in parking lots or from damage on the street if a bicyclist hits it for example, since it protrudes from the side. Also shown at 3902 is an etching in the fixed window portion which would illuminate during an event. The mirror 3900 includes an illuminated etching 3904 and/or LEDs on the body portion of the mirror. Further, a turn signal stripe 3906 which lights up yellow when the driver has the left turn signal on operates to illuminate in a green color, then followed by an orange color which signifies to first responders, that the vehicle is electric and in thermal runaway, if there is a battery failure. The light strip can be programmed in an infinite amount of ways. As seen at 3908, the mirror can fold in manually or electronically for protection. In its folded state the warnings may be more visible if viewed from the side of the vehicle. The owner may park his or her car next to a wall that runs the length of the car and folding the mirror in results in the indication provided at 3904 to be more easily seen.

Figure 40:
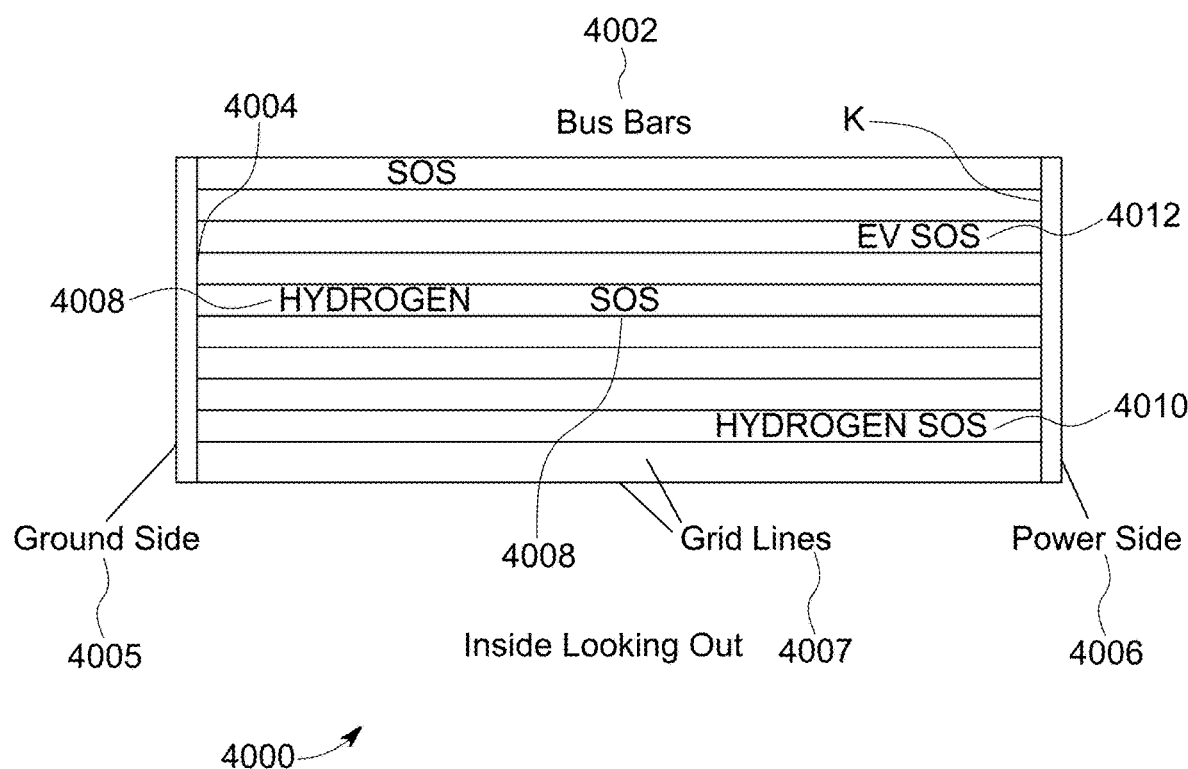
FIG. 40 shows details from an inside view of a rear window.

FIG. 40 shows details, from an inside view, of a rear window 4000 that incorporates bus bars 4002 which supply current to an electrically resistant area. A thicker portion or side portion of the applied defroster lines is shown at 4004 and the ground side of the electrically heated lines is shown at 4005 and the power side of the heated lines, that travel across the length of the window to the ground side are shown at 4006 and the grid lines 4007 heat the glass. An etching 4008 indicating the type of propulsion is positioned in between the dual laminated glass and an SOS warning that can be illuminated in an event is shown at 4008 and additional warnings/indications are positioned elsewhere on the window at 4010, 4012. These warnings/indications are illuminated in an event, along with the propulsion type of the vehicle. This may be visible, partially visible, only visible when lit, or any combination.

Head's Up displays (HUD) have become increasingly popular in the past decade. They function by having a projector encapsulated into the dashboard at the top portion between the steering wheel and the windshield. They appear to look like an empty cut out, that drops down a few inches or so, with a curved dark window. The projector behind the window, in the dropped area sends a floating image, that is height and side to side adjustable by the driver. Once the image leaves the projector, a series of mirrors direct, flip and magnify the images, so the driver can clearly see the image in his or her sightline. The image typically repeats information on the dashboard, instrument panels, or driver display. The typical images are speed, navigation functions, radio or streaming songs, and when a telephone call comes in, the number and name are announced. As the driver is on a highway for example, the navigation functions will show the next exit the driver has chosen by indicating the exit number and showing the distance to it, and the arrows for the exit. At the end of the ramp for example the next set of arrows and instructions will appear. In 2022 Cadillac Escalade and Mercedes S-Class can be equipped with heads up displays and augmented reality, or virtual reality in future models or a combination of all three or just augmented reality for example.

Passenger side screens in the instrument panel are becoming increasingly popular and they offer the passenger the ability to control the screen, see content, play games, etc. The heads up display, may also be used for the passenger who may be streaming music, and does not want to have to look at the dashboard, or may be playing an interactive video game. Having your head look down for hours can be tiring, and it is more natural to sit up right looking straight ahead. Virtual reality is a simulated experience that employs pose tracking and 3D near-eye displays to give the user an immersive feel of a virtual world. The VR display, may include the entire windshield, images on the side glass, roof dash or magically turn the entire cabin into a virtual world using one or more heads up displays or projectors. The passenger may also use a VR headset to enter the virtual world that the vehicle is displaying via Bluetooth for example.

Augmented reality is an interactive experience that combines the real world and computer-generated content. The content can span multiple sensory modalities, including but not limited to: visual, auditory, haptic, somatosensory and olfactory functions. For example, in one embodiment, if the vehicle is about to vent its battery contents or hydrogen tank contents and the passengers and driver can be in immediate danger, the somatosensory effects, such as a change in the cabin temperature, the activation of the heated or cooled seats, arm rests, or steering wheel can produce the somatosensory effects. Additionally, the seat position may change, or tilt the passenger in a novel position. The cabin may also fill with a synthesized aroma of burning paper or plastic to mimic what the driver understands accompanies a fire or "something is burning" effect which signals the occupant to move away from the perceived danger and call for help. The somatosensory noises, may contain the illusion of burning wood or simply a message that says "dangerous situation, exit the passenger cabin."

Augmented reality heads up displays, can show the described heads up functions, and overlay images that float and move to assist the driver. Meaning, if the heads up display has the typical navigation arrow or arrows, the augmented display can show a series of floating arrows, guiding the driver to the correct turn. They appear to dance in front of the driver, assisting in the turns. They can also show an image of the destination, not just the number of the house for example for easier recognition of the desired end point. The AR or VR or combination of the technologies can also show predictions, meaning, if the driver wishes to change lanes on a highway, the arrows for the proper lane change can appear to float to assist the driver of the intended path. The AR display can constantly show how many feet the car in front of it is away, show sharp curves as caution bars in red for example.

As described in this application, the immediate need for information that concerns out of bounds functions can be mimicked by the displays or be entirely in the heads up displays. Currently heads up displays have daytime visibility issues and are affected by the user wearing polarized sunglass lenses for example. Heads up, VR and AR, are still relatively new to vehicles, so it is assumed all such drawbacks will not be issues in future versions. They may even replace the on dash or displays in the cabin. The safest way to drive is to constantly be looking at the road, not down at a display. So, there may be a heads up display, with AR being controlled by a mouse type device by the driver's right hand, that does all the functions that the mouse and in cabin screens would do, without the compromise of safety as the driver constantly has to look down. Heads up displays keep the driver in an upright position, and they are able to continuously look straight ahead and see all the information in the field. Heads up displays can be used in a novel way, as described in this application, meaning they can pause the normal stream of information and flash "SOS-Exit Cabin" or any other immediate warning. They next flash can be: "Vehicle' Battery about to vent, under driver's door, exit from passenger side." for example. The messages, sounds and cues sent to the driver and all occupants is unlimited, however the heads up displays have not implemented these comprehensive warnings as described in the past. They can mimic what is displayed on the in cabin screens or have different messages and warnings, meaning the driver gets one warning and the passenger gets a different message. Meaning if the battery vehicle is about to vent it's gasses due to thermal runaway from the driver's side, it alerts the driver to exit from a different side, while the passenger's message would simply state to "exit vehicle" since their exit path is not compromised.

Figure 41:
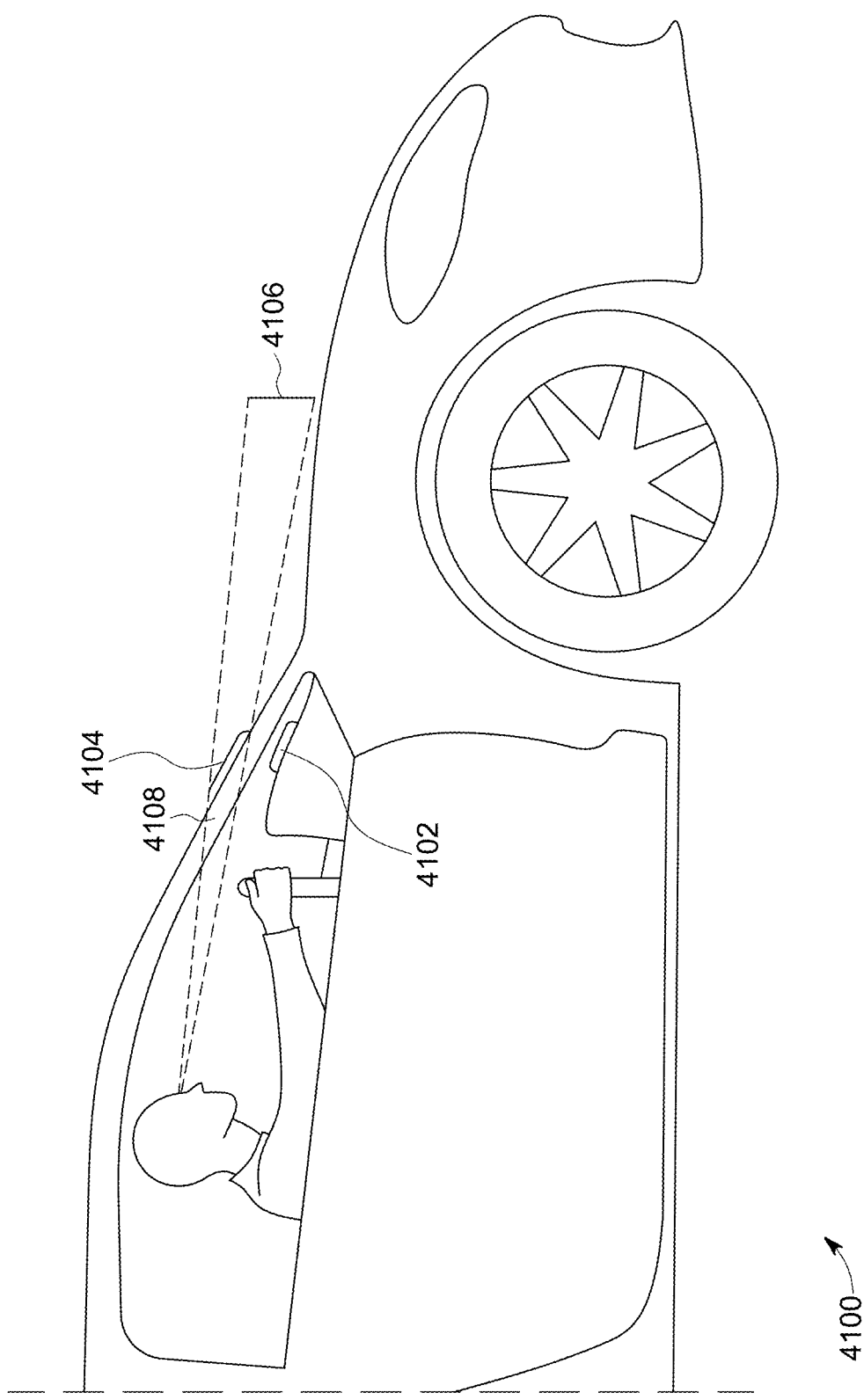
FIG. 41 is a side view of a vehicle with a heads up display.

FIG. 41 is a side view of a vehicle 4100 with a heads up display opening 4102 that sends an image to the vehicle windshield glass. The generated virtual image 4104 appears in the glass and is seen by the driver. The driver's eye path that sees the display 4106 is shown at 4108. The display 4106 appears to the driver to float above the hood or is projected beyond the front of the vehicle past the hood, or at any range. The image may be projected in what appears to be 10 feet away to two miles away for example.

Figure 42:
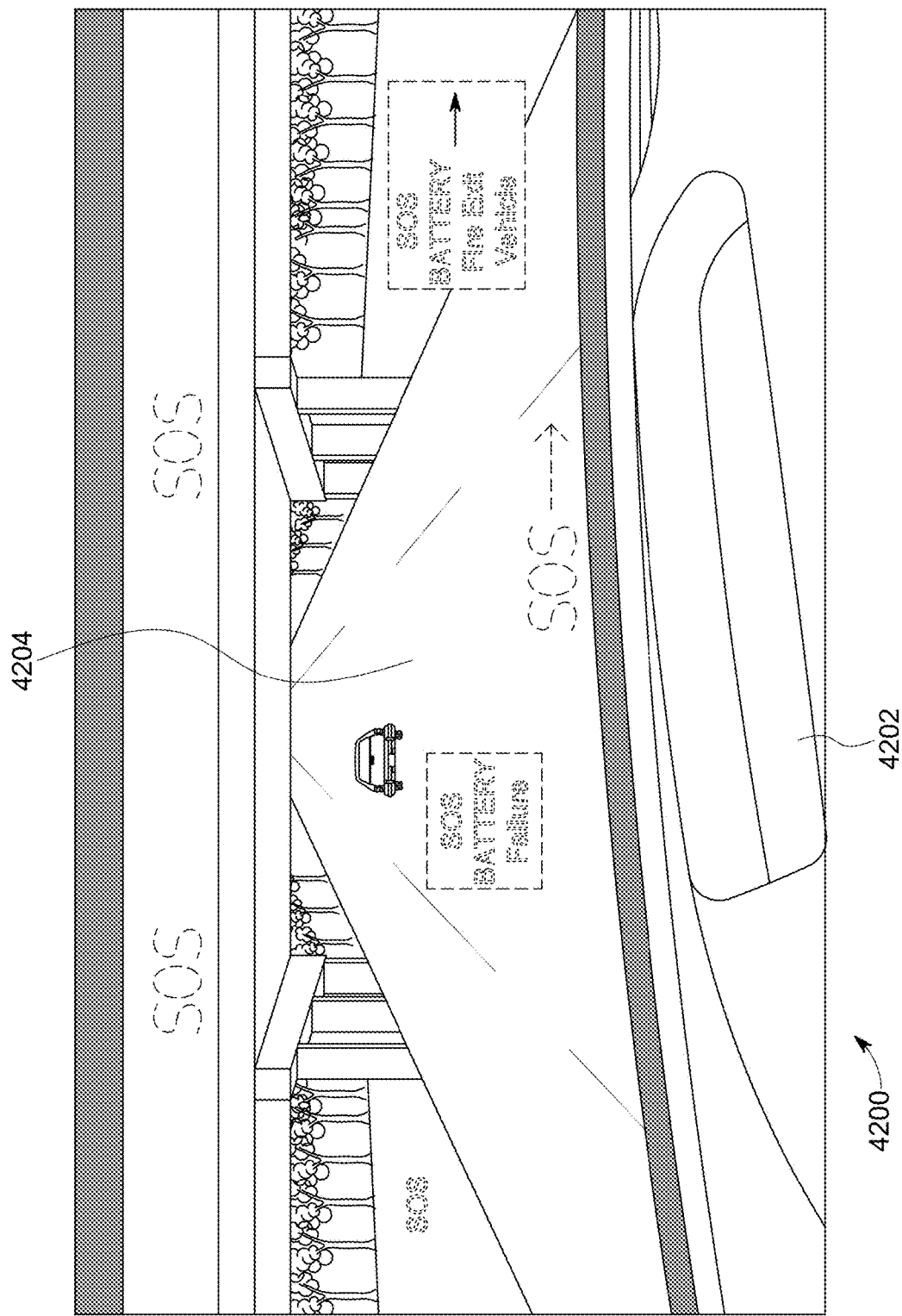
FIG. 42 shows further details of the image as seen by the driver of the system shown in FIG. 41.

Further details of the image as seen by the driver of the system shown in FIG. 41 are shown in FIG. 42. The heads up display opening is shown at 4202 and the heads up display opening in relation to the driver's position which is located between the steering wheel and the windshield is shown at 4204. A typical heads up display may show the speed of the vehicle, the posted speed limit, as a miniature version of the sign, and perhaps a music track that the driver has chosen. This image can appear to be located above the hood, a few feet in front of the vehicle or miles down the road. FIG. 42 also shows an embodiment of a heads up display that provides a warning and/or indication as explained in this application to alert the user of an emergency situation. As seen the heads up display provides a number of conspicuous alerts and warnings at various positions in the user's field of vision such as "SOS", "Battery Failure", "Battery Fire" and an instruction "Exit Vehicle" with an arrow showing the direction in which the user is to exit the vehicle. In one embodiment, these alerts and warnings are generated by a controller in the vehicle as described elsewhere herein.

The embodiment shown includes a standard messaging area with the SOS, a larger messing area with the SOS, that the other passengers might see, a light border that goes around the entire windshield by the frame or a portion thereof that can blink and change colors. Moreover, the entire windshield may be controlled to take on a red glow, which may increase in intensity, flash, etc.

The head's up display can show "SOS-Battery fault" then "Park and Exit Vehicle Immediately," followed by "DO NOT EXIT DRIVER'S DOOR, POSSIBLE FIRE BELOW DOOR, USE PASSENGER DOOR" "Battery Fault, call 911" or any other type of visual message, or symbol. It may be as simple as a red triangle or any other internationally used symbol for the market the vehicle is sold in, or ISO symbol for example. The message may be of any color, transparency, flash, blink, increase in brightness or capture a larger area or the entire windshield, which may be visible to all occupants of the vehicle. of the windshield than the traditional heads up display area. Typically, the area of heads up information takes up a relatively small portion of the driver's view, so it is not too distracting. In emergency situations, the idea is to get the attention of the driver and occupants as fast as possible. The heads up display message may cover the normal area or be of any size, including the entire windshield which would have the semi-transparent message, allowing the driver to steer to a safe place. The outer edges of the windshield glass may also illuminate, which would appear as a red bar on the outer edge of the interior glass, and the entire windshield may take on a red hue, but still be transparent, so the driver can still safely see the road ahead. It would appear as if you were wearing tinted eyeglasses, in one embodiment. The combinations, words, patterns, colors, frequency of flashing and international words or symbols are unlimited. The windshield just becomes a blank projector screen and the heads up display the projector. Lithium-ion batteries can fail and in seconds go from vapor cloud to fire, and thermal runaway, or battery packs designed to drop their modules for cooling can produce flames beneath the vehicle and toxic fumes. The minute a battery failure is detected that may lead to a fire or toxic fume emissions, the occupants, need to know, and which door or doors to use for exiting the vehicles. There are no standards for battery venting locations, and one vehicle vents from underneath the driver's door, so the driver, ideally should use the passenger door.

The signals generated by the various sensors on a vehicle and described herein can be used by a computing device such as held by a first responder to build a virtual model of a vehicle, using a generated image of the vehicle (as a ghost or semi-transparent model, which shows the outline of the vehicle, and then shows what all the sensors are reading). With this ghost image, the first responder or vehicle's call center can understand the dangers, and with 4D mapping, and specific algorithm it can predict what the next sequence of events or failures may occur. 4D mapping uses special technology to manipulate and project imagery onto specific surfaces, turning objects, vehicle components or vehicles themselves, into interactive three-dimensional displays. The process begins by taking a virtual 3D scan of the vehicle, which is similar to surround or top view cameras which are available or standard in premium vehicles and SUVS. The plethora of sensors gives the most accurate, comprehensive, and of the moment status and or failures, and the predicted outcome or outcomes. These sensors ideally would continue to function for 30 days or so, due to spontaneous reignition of a damaged battery pack. Any clues that the battery could reignite when it is "playing possum" could prevent burns, a fire, an explosion, a daisy chain fire (propagating from the failing vehicle to other vehicles or buildings, etc). As described in this application, the sensor, sensors, 3D mapping, 4D mapping information could be transmitted to the sharks fin, the key of the vehicle, a screen or plethora of screens in the vehicle, by an acoustical alert, a visual alert, a wireless alert, an alert to a phone, tablet, watch, building or Google Glass or any other type of wearable including a Jaguar Activity Key, wearable bracelet. The amount, type, location and information the sensor receives and transmits are of unlimited combinations, just as are the receiving means to get the alerts, map them, understand them and make a plan for a safe vehicle, occupant and first responder rescue.

The second part is this information sent to the car or the wearables, as described and shown in FIGS. 9, 10, 11, 12, 13, 14, 15, 16, 17, 18, 19 (sound), 20 (sound) and, 41, 42 (the messages in the heads up displays) these messages in the heads up displays can also be used at the dealership or tow yard. If an attendant is moving the car, to bring it into the shop the error or danger message can appear. Also, if a vehicle is valet parked and the car is started to bring up the ramp to the owner, the attendant, who is not the owner of the car would get all the danger messages like described in FIG. 42. Additionally, a mechanic that goes to start the EV on a Monday morning if it had a battery issue on the weekend and was unknown to the facility or repair shop would get this message. This is especially useful if the battery failure event, is not immediately detectable due to a fire or a peculiar odor. Batteries can be in pre-failure states and have no external clues. For example, a Ford F150 may have been brought into the shop, and appear to be fine, but the owner may have gone off roading and caused a small tear in the battery casing when shearing a rock. This small damage may not become an issue that is apparent for a few days for example, when the battery can then go into failure mode if the damage causes battery pack issues. The crack can spread, or the battery damage, may not be noticeable until the battery goes into full failure mode, and has cell propagation and thermal runaway. The heads up display is not just when you are driving, as it is always used for. It is for when you are sitting in the vehicle about to attempt or start it, when it is stationary warning you there is a problem and not to drive the vehicle and get help.

As described in this application, the sensor, sensors, 3D mapping, 4D mapping information can be transmitted to the sharks fin, the key of the vehicle, a screen or plethora of screens in the vehicle, by an acoustical alert, a visual alert, a wireless alert, an alert to a phone, tablet, watch, building or Google Glass or any other type of wearable including a Jaguar Activity Key, wearable bracelet. The amount, type, location and information the sensor receives and transmits are of unlimited combinations, just as are the receiving means to get the alerts, map them, understand them and make a plan for a safe vehicle, occupant and first responder rescue.

In the foregoing described vehicles, the positioning of the visual and audible indicators is provided as various examples to explain the need for conspicuous and redundant placement of the indicators to ensure perception of an indication regardless of the position of person viewing and/or hearing the indication and regardless of the position or state of the associated vehicle. For any given described vehicle, more or less indicators may be employed and in different positions than those shown and described.

While the invention has been described in connection with the disclosed embodiments, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A vehicle that provides an indication of status of an energy source that provides power for the vehicle, comprising:
   a visual indicator, positioned on the vehicle at a location determined to be among a plurality of locations to most likely be intact during and after an accident, the visual indicator providing a one or more predetermined visual colored indications that identify status of an energy source that provides power for the vehicle; and
   a controller programmed to generate the one or more predetermined visual colored indications, the controller generating a first predetermined visual colored indication in response to a danger condition to provide a warning of danger and a second predetermined visual colored indication that identifies a type of the energy source that provides power for the vehicle.

2. The vehicle set forth in claim 1 wherein the visual indicator provides an indication by color of the energy source that provides power for the vehicle, wherein the indication blinks during an accident event and remains solid after the accident event, wherein the color provides a predetermined correspondence to the energy source that provides power for the vehicle.

3. The vehicle set forth in claim 2 wherein the energy source that provides power for the vehicle comprises hydrogen and wherein the visual indicator provides a third indication by way of a third color indicator upon completion of venting of hydrogen from the vehicle.

4. The vehicle set forth in claim 1 wherein the energy source that provides power for the vehicle comprises hydrogen and wherein the visual indicator provides a third indication by way of a third color indicator that indicates initiation of venting of hydrogen from the vehicle and a fourth color indicator that indicates completion of venting of hydrogen from the vehicle.

5. The vehicle set forth in claim 1 further comprising a battery backup unit to provide electrical energy to the visual indicator in the event of loss of power to the indicator from another source of energy.

6. The vehicle set forth in claim 1 wherein the controller is further programmed to retrieve a value indicative of a manufacturer of the vehicle and to generate a third predetermined visual colored indication that identifies the manufacturer of the vehicle.

7. The vehicle set forth in claim 6 wherein the controller is further programmed to retrieve a value indicative of a model of the vehicle and to generate a fourth predetermined visual colored indication that identifies the model of the vehicle.

8. The vehicle set forth in claim 7 wherein the controller is further programmed to generate and provide the one or more predetermined visual colored indications in a sequence comprising, in order, the first predetermined visual colored indication, the second predetermined visual colored indication, the third predetermined visual colored indication and the fourth predetermined visual colored indication.

9. The vehicle set forth in claim 7 wherein the controller is further programmed to generate a fifth predetermined indication that identifies a battery disconnect location.

10. The vehicle set forth in claim 7 wherein the controller is further programmed to generate a sixth predetermined indication that identifies a battery location.

11. The vehicle set forth in claim 7 wherein the controller is further programmed to generate a seventh predetermined indication that indicates venting of a battery.

12. The vehicle set forth in claim 7 wherein the controller is further programmed to generate an eighth predetermined indication that identifies a battery type for batteries that provide energy for motive power for the vehicle.

13. The vehicle set forth in claim 7 wherein the controller is further programmed to generate a ninth predetermined indication that indicates charging of batteries that provide energy for motive power for the vehicle.

14. The vehicle set forth in claim 7 wherein the controller is further programmed to generate a tenth predetermined indication that indicates stranded charge in an electrical system of the vehicle.

15. The vehicle set forth in claim 7 wherein the controller is further programmed to generate an eleventh predetermined indication that indicates reignition of a fire within the vehicle.

16. A vehicle comprising:
   a visual indicator, positioned at an upper portion of the vehicle, the visual indicator responsive to a controller to provide one or more visual indications generated by the controller; and
   the controller programmed to generate,
      a first predetermined visual colored indication in response to a danger condition to provide a warning of danger; and
      a second predetermined visual colored indication that identifies a type of the energy source that provides power for the vehicle.

17. The vehicle set forth in claim 16 wherein the controller is further programmed to generate:
   a third predetermined visual colored indication that identifies a manufacturer of the vehicle.

18. The vehicle set forth in claim 17 wherein the controller is further programmed to generate:
   a fourth predetermined visual colored indication that identifies a model of the vehicle.

19. The vehicle set forth in claim 18 wherein the controller is further programmed to generate the first predetermined visual colored indication, the second predetermined visual colored indication, the third predetermined visual colored indication, and the fourth predetermined visual colored indication in sequence.

20. The vehicle set forth in claim 19 wherein the controller is further programmed to generate a fifth predetermined indication that identifies a battery disconnect location.

* * * * *